United States Patent [19]
Allen et al.

[11] Patent Number: 5,892,535
[45] Date of Patent: Apr. 6, 1999

[54] FLEXIBLE, CONFIGURABLE, HIERARCHICAL SYSTEM FOR DISTRIBUTING PROGRAMMING

[75] Inventors: Philip M. Allen; Joseph W. Davis, both of Duluth, Ga.; Michael J. Maslaney, Atlanta; Khanh Mai, Alpharetta; Howard L. Paulk, Cumming; Ken Thompson, Atlanta, all of Ga.

[73] Assignee: Digital Video Systems, Inc., Los Gatos, Calif.

[21] Appl. No.: 766,569

[22] Filed: Dec. 13, 1996

Related U.S. Application Data

[63] Continuation-in-part of Ser. No. 646,657, May 8, 1996.

[51] Int. Cl.[6] ........................................... H04N 7/10
[52] U.S. Cl. ..................... 348/9; 348/6; 455/4.2; 345/327
[58] Field of Search ..................... 348/6, 7, 8, 9, 348/705, 706; 455/4.1; 345/327; H04N 7/10, 7/16

[56] References Cited

U.S. PATENT DOCUMENTS

| | | | |
|---|---|---|---|
| 4,814,883 | 3/1989 | Perine et al. | 348/9 X |
| 5,200,825 | 4/1993 | Perine | 348/9 X |
| 5,424,770 | 6/1995 | Schmelzer et al. | 348/9 |
| 5,600,366 | 2/1997 | Schulman | 348/9 |

*Primary Examiner*—Nathan Flynn
*Attorney, Agent, or Firm*—Sawyer & Associates

[57] ABSTRACT

A flexible and configurable system for distributing media (or programming) to one or more distribution networks. The system includes a media server, at least one server interface unit, a first communications path coupling the media server and a server interface unit, distribution network interface unit(s), and a second communications path coupling a server interface unit and the distribution network interface unit(s). The media server stores files of encoded (e.g., compressed) media data and files of scheduling information. Each of the distribution network interface unit(s) conditions received media data for transmission over the distribution network(s) which may be analog and/or digital distribution networks.

66 Claims, 37 Drawing Sheets

| Stream Number | PID IN (Type of Data) | | PID OUT (Type of Data) | |
|---|---|---|---|---|
| 1 | XXXXXXXX000 | (Video) | 000XXXXX000 | (Video-Channel 1) |
| | XXXXXXXX001 | (Audio) | 000XXXXX001 | (Audio-Channel 1) |
| | XXXXXXXX010 | (SAP) | 000XXXXX010 | (SAP-Channel 1) |
| | XXXXXXXX011 | (Private-OSD) | 000XXXXX011 | (Private-OSD-Channel 1) |
| | XXXXXXXX100 | (Private-VBI) | 000XXXXX100 | (Private-VBI-Channel 1) |
| | XXXXXXXX101 | (Private-Stuffing) | 000XXXXX101 | (Private-Stuffing-Channel 1) |
| | ... | | ... | |
| 2 | XXXXXXXX000 | (Video) | 001XXXXX000 | (Video-Channel 2) |
| | XXXXXXXX001 | (Audio) | 001XXXXX001 | (Audio-Channel 2) |
| | XXXXXXXX010 | (SAP) | 001XXXXX010 | (SAP-Channel 2) |
| | XXXXXXXX011 | (Private-OSD) | 001XXXXX011 | (Private-OSD-Channel 2) |
| | XXXXXXXX100 | (Private-VBI) | 001XXXXX100 | (Private-VBI-Channel 2) |
| | XXXXXXXX101 | (Private-Stuffing) | 001XXXXX101 | (Private-Stuffing-Channel 2) |
| | ... | | ... | |
| 3 | XXXXXXXX000 | (Video) | 011XXXXX000 | (Video-Channel 3) |
| | XXXXXXXX001 | (Audio) | 011XXXXX001 | (Audio-Channel 3) |
| | XXXXXXXX010 | (SAP) | 011XXXXX010 | (SAP-Channel 3) |
| | XXXXXXXX011 | (Private-OSD) | 011XXXXX011 | (Private-OSD-Channel 3) |
| | XXXXXXXX100 | (Private-VBI) | 011XXXXX100 | (Private-VBI-Channel 3) |
| | XXXXXXXX101 | (Private-Stuffing) | 011XXXXX101 | (Private-Stuffing-Channel 3) |
| | ... | | ... | |
| 4 | XXXXXXXX000 | (Video) | 111XXXXX000 | (Video-Channel 8) |
| | XXXXXXXX001 | (Audio) | 111XXXXX001 | (Audio-Channel 8) |
| | XXXXXXXX010 | (SAP) | 111XXXXX010 | (SAP-Channel 8) |
| | XXXXXXXX011 | (Private-OSD) | 111XXXXX011 | (Private-OSD-Channel 8) |
| | XXXXXXXX100 | (Private-VBI) | 111XXXXX100 | (Private-VBI-Channel 8) |
| | XXXXXXXX101 | (Private-Stuffing) | 111XXXXX101 | (Private-Stuffing-Channel 8) |

FIG. 34

FLEXIBLE, CONFIGURABLE, HIERARCHICAL SYSTEM FOR DISTRIBUTING PROGRAMMING

RELATED APPLICATIONS

This invention is a continuation-in-part of U.S. patent application Ser. No. 08/646,657, entitled "MULTIPLE-SOURCE TRANSMISSION SYSTEM," filed on May 8, 1996, and commonly assigned.

BACKGROUND OF THE DISCLOSURE a. Field of the Invention

The present invention concerns a hierarchical system for providing compressed and/or non-compressed digital and/or analog video signals to be broadcast, multicast, or transmitted point-to-point, to remotely located subscribers.

b. Description of the Prior Art

Over the past decade or two and continuing to the present, "off-the-air" communication systems, such as CATV for example, have become rather ubiquitous throughout most of the developed world and permit a wide diversity of programming and other broadcast information to be disseminated directly to subscribers. Through such systems, subscribers, typically residential customers, can select from among a number of program providers that offer far more diverse content than traditional "on-the-air" broadcast television channels. Given the richness of the available programming and its relatively affordable cost, the CATV industry has experienced significant historic growth.

Traditional cable distribution systems are entirely analog in nature. In essence, various program providers transmit their programming over distinct channels, via a satellite link or other dedicated long-haul communication paths, to a "cable headend" location. As determined by the program provider, each of these signals may be transmitted in scrambled form, particularly for so-called "premium" channels, or in non-scrambled form.

As shown in FIG. 1, equipment, such as a network feed downlink 102 and a group of integrated receiver/decoders (or "IRDs") 104, at a cable headend location receives the transmitted signals that appear on a variety of different channels, and appropriately amplifies and conditions each of these signals (not shown). Then, equipment, such as a plurality of remodulators 106 and a channel combiner 108, remodulate and frequency division multiplex each of the resulting signals into a single broadband, frequency division multiplexed signal. This broadband signal is further amplified and driven (e.g., by distribution fan-out nodes 110) onto a geographically dispersed hardwired coaxial cable network for distribution to individual subscribers 112. Each subscriber 112 utilizes a converter (also commonly referred to as a "set-top box") which terminates a so-called cable "drop" in the network. Hence, the cable television headend station is often referred to as a "community antenna."

The set-top box receives the broadband signal and, based on a subscriber selection generally entered through a remote control device, selects a given cable channel for display, demultiplexes a signal for that channel from the received broadband signal, descrambles that signal, if necessary and if authorized to do so, and applies a resulting baseband video signal to an input of a television receiver (or applies an RF input to channel 3 or 4 of the television receiver) for subsequent display and/or to an input of a video cassette recorder (VCR) for recording. Newly manufactured television receivers and VCRs possess so-called "cable-ready" tuners which provide this demultiplexing function, but which do not include descrambling circuitry.

Two fundamental technical limitations of the known CATV system have tended to limit viewer choice and hence the attractiveness of cable service; namely the limited bandwidth of coaxial cable and the lack of support for back-channel communications.

First, a traditional cable system is structured, as noted above, with a single point of signal origination (i.e., the headend) for all its subscribers. That is, a traditional cable system provides a so-called "one-to-many" (or "broadcast" or "multicast") distribution. While such a system advantageously provides a greater number of channels than does on-the-air television broadcasts, the number of cable channels is still quite restricted. As a consequence of a limited number of channels, many individual subscribers increasingly find that, at one time or another, an insufficient number of different programs on different channels are then available to satisfy their current interest.

To reiterate, in a conventional analog system, the same set of multiplexed channels is transmitted from a cable headend into a coaxial cable distribution network, through which this set of multiplexed channels is "fanned-out" (i.e., "broadcast") to all subscribers in the system. Thus, the number of channels that can be simultaneously transmitted is determined, in good measure, by the bandwidth of the physical coaxial cable used in the distribution network. Coaxial cable, as with any transmission media, has a limited bandwidth. In the context of frequency multiplexed analog video signals, coaxial cable typically has a capacity to carry approximately 50–70 analog frequency division multiplexed video channels over an appreciable distance without undue signal attenuation. These systems typically utilize a frequency band of approximately 5–400 MHz or so.

As the number of frequency division multiplexed video channels increases, the highest carrier frequency applied to the cable also increases. As transmitted cable carrier frequencies increase much above several hundred megahertz, cable losses, principally due to inductive "skin effect" as well as capacitive affects, increase substantially and, accordingly, greatly attenuate the transmitted signal at these high frequencies, thus frustrating the use of additional high frequency channels.

Broadband in-line repeaters are periodically placed in series with a distribution trunk to (e.g., at distribution or fan-out nodes 110) re-amplify and re-condition the multiplexed signal that propagates down the trunk to compensate for attenuation present in that trunk. Traditionally, one method to overcome this attenuation is to simply decrease the inter-repeater spacing in the network. However, doing so, particularly given the rather wide geographic coverage of a coaxial cable network and the number of distribution trunks used therein, often entails a substantial increase in the number of repeaters and thus, cost.

In addition to the increased cost associated with increasing the number of repeaters, the potential for adverse inter-modulation and cross-modulation products is also heightened. Such inter-modulation and cross-modulation products result from system non-linearities and the presence of numerous video carriers, and thus introduce noticeable distortion into a multiplexed cable signal. In that regard, so-called "composite triple beat" products (modulation products of the general type $(2f_1 \pm f_2)$ or $(f_1+f_2 \pm f_3)$) can greatly degrade the performance of such a system. Coherent oscillators may be used to regenerate (and convert) carrier frequencies such that they are harmonically related thereby ameliorating these adverse modulation products somewhat. Nevertheless, adverse inter-modulation and cross-modulation products increase with increases in repeater output levels, as well as with increases in the number of repeaters cascaded along any distribution path in the cable network. The presence of these adverse inter-modulation and cross-modulation products effectively limits both the number of repeaters that can be cascaded and hence the length of an entire distribution path itself (i.e. an entire coaxial cable run from a headend location to a subscriber). If the number of channels were to increase, the repeater separation would have to be reduced to compensate for lowered output levels while avoiding adverse modulation products which, in turn, nevertheless increases system cost.

Hence, the above described phenomena intrinsic to analog co-axial cable distribution have effectively limited the number of channels simultaneously available in any conventional analog cable system to approximately 50–70. This limitation has been ameliorated somewhat, but only in newly constructed cable systems that utilize a low-loss optical fiber distribution network. Such low-loss optical fiber distribution networks possess an increased bandwidth (generally on the order of 1 GHz—two or three times that of a coaxial cable distribution network) over that of a traditional coaxial cable based distribution network. However, since most cable distribution networks have already been installed quite a few years ago, the vast majority of existing cable systems utilize a coaxial cable, rather than optical, based distribution network and are so limited to 50–70 simultaneous channels.

If, as often occurs, the subscriber is not interested in programming then being carried by any of the 50–70 cable channels, they will turn to other pursuits. If this occurs frequently enough, the subscriber, possibly out of repeated dissatisfaction or frustration, may terminate their cable service entirely.

Second, because traditional analog cable systems are unidirectional, the subscriber, even if they are interested in a particular program on any given cable channel, is relegated to a pre-defined broadcast schedule of a corresponding channel provider. Although the proliferation of VCRs has alleviated this concern by storing the channel broadcast for later viewing at a more convenient time, the inconvenience and complexity, as seen by many subscribers, in programming a VCR for recording and time-shifted viewing, also contributes to continued viewer frustration and dissatisfaction with cable systems.

The technical community serving the cable industry has grappled with these difficulties for some time but, as of yet, no effective global solution has been put forth in the art.

Continuing advances in digital storage technology and recent advances in video compression methods have led to a number of proposals for new video distribution systems. However, at the present time, each of these proposed systems includes serious drawbacks which preclude its current implementation on a large scale. The art has unequivocally recognized that digital signals are far less prone to noise, affects of attenuation and other adverse phenomena typically associated with analog signals and, through use of sophisticated error correction algorithms, can readily be corrected for artifacts and other transport errors. For those reasons, digital signals are routinely favored for transmitting information. Indeed, U.S. Pat. Nos. 5,400,401 (hereinafter referred to as "the Wasilewski et al patent"), 5,410,343 (hereinafter referred to as "the Coddington et al patent"), 5,412,416 (hereinafter referred to as "the Nemirofsky patent"), 5,442,389 (hereinafter referred to as "the Blahut et al patent"), and 5,508,732 (hereinafter referred to as "the Bottomly et al patent"), each discuss video distribution systems which provide digital video signals to subscribers. Unfortunately, the systems discussed in these patents require large capital outlays for providing or upgrading the infrastructure of a distribution system and also require relatively sophisticated and expensive set-top boxes. Moreover, although, at first blush, enhancing a cable system by merely converting the system from analog to digital signaling appears attractive, doing so would necessitate replacement of much of the embedded analog circuitry in that system. In view of the enormous investment made over the past few decades in embedded physical plant, both at cable head-ends and in subscriber set-top boxes, for analog signal distribution and reception equipment, converting, at one time, a cable system to handle end-to-end digital signaling is prohibitively expensive and hence totally impractical. Furthermore, such a "one-shot" conversion would disrupt service to many, if not all, current subscribers. Therefore, any solution aimed at enhancing utility, functionality and subscriber attractiveness of a cable system should maintain compatibility with the existing analog plant to the fullest extent possible. However, given the advantages of transmitting signals digitally, such a system should permit a gradual and non-disruptive migration towards an all digital system. Further, such a system should, ideally, be configurable to serve various types of network, whether they are, for example, analog co-axial cable networks or digital optical fiber networks.

Starting in the early 1990s and continuing to the present, significant developments are appearing in the art of communication and digital data processing that, if utilized, hold great promise in overcoming the technical limitations, as discussed above, inherent in traditional analog cable systems. Moreover, these developments, if properly utilized, should profoundly enhance the utility, functionality and attractiveness of existing cable systems to both present and potential subscribers while advantageously maintaining full compatibility with these existing analog systems. Furthermore, these developments should make other distribution systems more attractive.

Currently, extremely fast and sophisticated digital processors are becoming commercially available along with high capacity low-cost digital storage mechanisms. Processors are evolving, both in terms of their continually increasing sophistication and decreasing cost, to a level at which these such processors may cost-effectively function as video servers to provide digitized video data at a sufficiently rapid rate to permit its near real-time or even real-time viewing.

Moreover, the streaming of more than one video file is now feasible. Furthermore, large-capacity magnetic hard disk drives, as well as optical disk drives, with an individual capacity in excess of several gigabytes are now available at a price of less than U.S. $1000/drive. Such drives may be arranged into high capacity disk farms, having a storage capacity of hundreds of gigabytes or several terabytes. Such disk farms could well store digitized video libraries of one sort or another. With further advances in storage technology, the price of such drives is only likely to fall while their capacity continues to rise.

Unfortunately, however, a digitized video image, let alone full motion video, can generate a rather large data file, often in excess of several megabytes of bit-mapped data per frame. Since full motion NTSC (National Television Standards Committee) video requires 30 frames/second, an advertisement lasting 30 seconds to one minute, a program lasting 30 minutes or more, or a movie lasting 1–2 hours or more, will require a corresponding video file that has an enormous amount of data, particularly if stored in simple bit-mapped form. Storage of such a bit-mapped file could still prove costly even at current and anticipated near term costs per megabyte.

Fortunately, occurring along with the above mentioned development in processor and storage technology is the rather recent emergence not only of a rather robust and highly accurate compression/decompression algorithm for full motion video (and associated audio), but also of rather inexpensive integrated circuits (ICs) that encode and decode video data in accordance with this algorithm. This algorithm is the MPEG-2 standard promulgated by the Motion Picture Experts Group (MPEG) and jointly published by the International Organization for Standardization (ISO) and the International Electrotechnical Commission (IEC), in draft form on Nov. 11, 1994, as *International Standard ISO/IEC 13818* (incorporated herein by reference). By exploiting the fact that high degrees of inter-frame and intra-frame redundancies are inherent in video, the MPEG-2 algorithm advantageously yields an extremely high rate of video compression. Consequently, the MPEG-2 compression algorithm drastically reduces the file size needed to store, as well as the bandwidth needed to transmit, an item of digitized full motion video.

Although the MPEG-2 standard is known to those skilled in the art, its relevant features are briefly described below for the reader's convenience. The MPEG-2 standard focuses on the encoding and transport of video and audio data. In general, the MPEG-2 standard uses compression algorithms such that video and audio data may be more efficiently stored and communicated.

The International Organisation for Standardisation (or the Organisation Internationale De Normalisation) (hereinafter referred to as "the ISO/IEC") has produced drafts of the MPEG-2 standard for the coding of moving pictures and associated audio. This standard is set forth in four documents. The document ISO/IEC 13818-1 (systems) specifies the system coding of the specification. It defines a multiplexed structure for combining audio and video data and means of representing the timing information needed to replay synchronized audio and video sequences in real-time. The document ISO/IEC 13818-2 (video) specifies the coded representation of video data and the decoding process required to reconstruct pictures. The document ISO/IEC 13818-3 (audio) specifies the coded representation of audio data and the decoding process required to reconstruct the audio data. Lastly, the document ISO/IEC 13818-4 (conformance) specifies procedures for determining the characteristics of coded bitstreams and for testing compliance with the requirements set forth in the ISO/IEC documents 13818-1, 13818-2, and 13818-3. These four documents, hereinafter referred to, collectively, as "the MPEG-2 standard" or simply "the MPEG standard", are incorporated herein by reference.

A bit stream, multiplexed in accordance with the MPEG-2 standard, is either a "transport stream" or a "program stream". Both program and transport streams are constructed from "packetized elementary stream" (or PES) packets and packets containing other necessary information. A "packetized elementary stream" (or PES) packet is a data structure used to carry "elementary stream data". An "elementary stream" is a generic term for one of (a) coded video, (b) coded audio, or (c) other coded bit streams carried in a sequence of PES packets with one and only stream identifier (or "ID"). Both program and transport streams support multiplexing of video and audio compressed streams from one program with a common time base.

Transport streams permit one or more programs with one or more independent time bases to be combined into a single stream. Transport streams are useful in instances where data storage and/or transport means are lossy or noisy. The rate of transport streams, and their constituent packetized elementary streams (PESs) may be fixed or variable. This rate is defined by values and locations of program clock reference (or PCR) fields within the transport stream.

FIG. 21 illustrates the packetizing of compressed video data 2106 of a video sequence 2102 into a stream of PES packets 2108, and then, into a stream of transport stream packets 2112. Specifically, a video sequence 2102 includes various header information 2104 and associated compressed video data 2106. The video sequence 2102 is parsed into variable length segments, each having an associated PES packet header 2110 to form a PES packet stream 2108. The PES packet stream 2108 is then parsed into segments, each of which is provided with a transport stream header 2114 to form a transport stream 2112. Each transport stream packet of the transport stream 2112 is 188 bytes in length.

Although the syntax of the transport stream 2112 and transport stream packets is described in the MPEG-2 standard, the fields of the transport stream packet pertaining to the present invention will be described below with reference to FIG. 22 for the reader's convenience. As shown in FIG. 22, a transport stream 2112 includes one or more 188 byte transport stream packets 2200, each of the transport stream packets 2200 having a header 2114 and an associated payload 2216.

Each header 2114 includes an eight (8) bit synch byte field 2218 and a thirteen (13) bit packet identification (or PID) field 2220. The synch byte field 2218 has a value of "01000111" (or 47 hex) and identifies the start of a 188 byte transport stream packet 2200. The PID field 2220 indicates the type of data (e.g., audio, video, secondary audio program (or "SAP"), private, etc.) stored in the payload 2216 of the 188 byte transport stream packet. Throughout this application, the term "private data" is often used to refer to a transport stream packet 2200 having a PID 2220 value which identifies data in the payload 2216 of the transport stream packet 2200 as proprietary data, for special use (e.g., on-screen displays) by the system of the present invention. In such instances, "private data" should not be confused with private data which may be carried in the transport private data field 2250 of the transport stream header 2114, which may also be used to carry proprietary data. In any case, the meaning of "private data" will be apparent based on the context in which it is used. Certain PID values are reserved.

The payloads 2216 of one or more transport stream packets 2200 may carry "packetized elementary stream" (or PES) packets 2300. To reiterate, a "packetized elementary stream" (or PES) packet 2300 is a data structure used to carry "elementary stream data" and an "elementary stream" is a generic term for one of (a) coded video, (b) coded audio, or (c) other coded bit streams carried in a sequence of PES packets with one and only stream ID.

FIG. 23 is a diagram which illustrates the syntax of a PES packet 2300. As FIG. 23 shows, a PES packet 2300 includes a 24 bit start code prefix field 2302, an eight (8) bit stream identifier field 2304, a sixteen (16) bit PES packet length field 2306, an optional PES header 2308, and a payload section 2106. Each of these fields is described in the MPEG-2 standard. However, for the reader's convenience, the fields particularly relevant to the present invention are described below.

The sixteen (16) bit PES packet length field 2306 specifies the number of bytes in the PES packet 2300 following this field 2306. A value of 0 in this field 2306 indicates that the PES packet length is neither specified nor bounded. Such an unspecified and unbounded PES packet 2300 is only allowed in PES packets whose payload is a video elementary stream contained in transport stream packets. As can be deduced from the description of the PES packet length field 2306, the PES packet 2300 can be much longer (e.g., 4000 bytes) than the length of the payload 2216 of a 188 byte transport stream packet. Thus, as shown in FIG. 1, a PES packet 2300 is typically carried in consecutive payloads 2216 of a series of transport stream packets 2200. The payload 2106 of a PES packet 2300 may carry a sequence of video frames or audio frames, for example.

FIG. 24 is a block schematic showing the steps of encoding, communicating (from location 2440 to location 2450), and decoding video and audio data in accordance with the MPEG-2 standard.

As shown in FIG. 24, at a first location 2440, video data is provided to a video encoder 2402 which encodes the video data in accordance with the MPEG-2 standard (specified in the document ISO/IEC 13818-2 (video), which is incorporated herein by reference). The video encoder 2402 provides encoded video 2404 to a packetizer 2406 which packetizes the encoded video 2404. The packetized encoded video 2408 provided by the packetizer 2406 is then provided to a first input of at least one of a program stream multiplexer 2410 and a transport stream multiplexer 2412. For the purposes of understanding the present invention, it can be assumed that program streams are not generated.

Similarly, at the first location 2440, audio data is provided to an audio encoder 2414 which encodes the audio data in accordance with the MPEG-2 standard (specified in the document ISO/IEC 13818-3 (audio), which is incorporated herein by reference). The audio encoder 2414 provides encoded audio 2416 to a packetizer 2418 which packetizes the encoded audio 2416. The packetized encoded audio 2420 provided by the packetizer 2418 is then provided to a second input of at least one of the program stream multiplexer 2410 and the transport stream multiplexer 2412.

The transport stream multiplexer 2412 multiplexes the encoded audio and video packets and transmits the resulting multiplexed stream to a second location 2450 via communications means 2422. At the second location 2450, on a remote end of the communications means 2422, a transport stream demultiplexer 2424 receives the multiplexed transport stream. Based on the packet identification (or PID) number 2314 of a particular packet, the transport stream demultiplexer 2424 separates the encoded audio and video packets and provides the video packets to a video decoder 2430 via link 2428 and the audio packets to an audio decoder 2434 via link 2432. The transport stream demultiplexer 2424 also provides timing information to a clock control unit 2426. The clock control unit 2426 provides timing outputs to the both the video decoder 2430 and the audio decoder 2434 based on the timing information provided by the transport stream demultiplexer 2424. The video decoder 2430 provides video data which corresponds to the video data originally provided to the video encoder 2402. Similarly, the audio decoder 2434 provides audio data which corresponds to the audio data originally provided to the audio encoder 2414.

This ability to compress video has led some to think about video distribution systems in which a number of full or feature length movies are actually stored on extremely large DRAMs in addition to, or instead of, storage on large magnetic or optical disk drives or on magnetic tape drives. For example, U.S. Pat. No. 5,410,343 (hereinafter referred to as "the Coddington et al patent") discusses a video distribution system having a DRAM storing 15 to 25 compressed feature length movies, each occupying approximately 1.2 gigabytes. Similarly, U.S. Pat. No. 5,442,389 (hereinafter referred to as "the Blahut et al patent") discusses a video distribution system having a 206 gigabyte memory for storing over 150 full-length movies. Unfortunately, however, DRAM fabrication and storage densities have not yet advanced to the point to which systems employing such large DRAMs are feasible economically.

All digital video distribution systems which utilize the public switched telephone network (or PSTN) have also been proposed. For example, the Coddington et al patent uses an asymmetrical digital service line (ADSL) interface over a twisted pair which is frequency division multiplexed into a 4 KHz wide voice channel, an 8 Kbps reverse digital channel centered on 95 KHz, and a 1.6 Mbps video channel from 100 to 500 KHz. Similarly, U.S. Pat. No. 5,508,732 (hereinafter referred to as "the Bottomley et al patent") uses a T1 (i.e., a 1.544 Mbps) link to a subscriber to provide near video-on-demand (or NVOD). Unfortunately, the telephone system was designed to handle voice traffic (for example, 8 bit samples at 8 Khz, or 64 Kbps voice traffic) for relatively short periods of time. For example, in a typical residential area, central offices are designed based on the expectation that an average telephone customer uses the network for 3 CCs (i.e., 3 hundred call seconds) or 5 minutes per hour. The telephone system, at this point, is not designed to handle 1.544 Mbps video signals on T1 links (equivalent to 24, 64 Kbps voice channels) occupying a line for 90 minutes without interruption. Thus, substantial capital expenditures are required before the telephone network can handle the substantial additional traffic introduced by such video delivery and video-on-demand services.

Thus, although emerging new digital technology, particularly in the areas of storage density and video compression, appears to provide several sorely needed building blocks for a video delivery system, proposed systems require substantial capital expenditures to improve existing distribution networks and to provide set-top boxes with sophisticated decoding and formatting chipsets. Hence, the proposed systems offer an "all or nothing" approach that requires a capital expenditure that is, frankly, unpalatable to many in the video distribution industry.

Thus, a substantial and crucial obstacle remains: integrating these emerging new digital technologies with existing video distribution networks, such as analog cable systems, in a way that maintains full compatibility with and thereby preserves, to the fullest extent possible, the existing investment made in all the existing analog physical plant, i.e., all the existing analog set-top boxes and head-end analog signal distribution equipment.

Ideally, the infusion of this technology into a cable system should occur in a manner that not only provides enhanced cable system functionality and increased viewer choice and satisfaction but also entails relatively minor changes, if any, to the existing analog physical plant.

In that regard and even with continued use of analog program signaling to the subscriber, we expect that a flexible digital video file server system could spawn a wide variety of new services heretofore not available on traditional analog cable systems. For example, one new class of cable services, collectively referred to herein as "targeted programming", could include the provision and selective distribution of customized video programming matched to the needs of a specific target audience. Different programming would be simultaneously provided, over the same cable system, to different subscriber audiences thereon.

Such targeted programming might be advertisements of high interest to, and directed to, a certain demographic and/or geographically located class of individuals—as predefined by an advertiser. Such targeted programming might include information, such as, e.g., a textual schedule of local events with accompanying "video clips" thereof, that is to be distributed to a local community of potential attendees and/or other interested parties that are presumed to be interested—all as predefined by an event promoter. For example, the delivery of a channel having video clips of nationally released movies with an overlay or on-screen-display (or OSD) of local theaters and play-times of the movie would be attractive. In each instance, the ensuing recipients would be much smaller than all the cable subscribers at large on the system. Hence, a system having multicasting, as well as broadcasting, functionality is needed.

Another new class of cable services, collectively referred to herein as "subscriber-initiated programming" or "requested programming", could be based on so-called "near video-on-demand" (or NVOD) through which each subscriber could choose specific programming for delivery by the cable system. Here, that subscriber would be allowed, through pre-defined interactivity with the video provider, to request, from a large archival library, just what video material, e.g. a particular movie, television show or documentary, that particular subscriber wants to view. The server would then inform the subscriber of the time and channel on which that material will be played. The cable system, in conjunction with the server, would then retrieve and play the material but with only a minimal, if any, delay from the time at which the subscriber entered his or her request. If this material is to be provided in a scrambled form, the server would provide appropriate commands to authorize the set-top box serving that subscriber to de-scramble the incoming signal as required for proper viewing of the requested material.

We anticipate that by providing targeted programming, whether it is relevant advertisements or other useful information distributed to specific cable subscribers along geographic and/or demographic boundaries, or subscriber-initiated (or requested) programming, such as entertainment, or even some combination of the two, cable systems can sharply increase their attractiveness to current and future subscribers with, concomitantly, the cable industry, as a whole, eventually experiencing sharply higher market penetration and revenue growth.

Thus, a need now exists in the art for a cost-effective digital video file server system that can be readily integrated, with minimal disruption, if any, into existing analog cable systems to greatly enhance the functionality and subscriber attractiveness of such systems. Such a file server system should preserve, to the extent possible, all the existing analog physical plant, thereby maintaining compatibility with existing analog signal distribution equipment and subscriber set-top boxes currently in use. Furthermore, such a file server system should provide archival storage of a substantial amount of video material and, for purposes of economic implementation, utilize video compression, particularly, though not exclusively, the MPEG-2 standard. To enhance subscriber attractiveness, such a video file server, when integrated into an existing cable system, should be able to provide services, such as targeted programming and subscriber-initiated (or requested) programming, currently not available on conventional analog cable systems.

The advantages of digitally transmitting any data, including video data, cannot be forgotten however. Although, as discussed above, the capital expenditures for providing an all digital video distribution network are indeed staggering, we expect that such networks will, inevitably, be built. Moreover, although prohibitively expensive now, we believe that the cost of sophisticated set-top boxes will continue to decrease and will inevitably reach a point of being economically attractive. Thus, the system of the present invention must be flexible to permit a migration to all digital distribution networks.

SUMMARY OF THE INVENTION

The present invention meets the above discussed need for a flexible and configurable system for distributing programming to one or more distribution networks by providing a media server, at least one server interface unit, a first communications path coupling the media server and a server interface unit, distribution network interface unit(s), and a second communications path coupling a server interface unit and the distribution network interface unit(s). The media server includes at least one processor, program storage, input/output interfaces, storage devices for storing files of encoded media data and files of scheduling information, and a shared bus system to which the processor(s), the program storage, the input/output interfaces, and the storage devices are coupled. The server interface unit(s) includes a media data input/output interface, a media data output controller, and an internal bus system shared by the media data input/output interface and the media data output controller. The first communications path couples at least one of the input/output interfaces of the media server with the media data input/output interface of the server interface unit(s). Each of the distribution network interface unit(s) condition received media data for transmission over the distribution network(s). The second communications path couples the media data output controller(s) of the server interface unit(s) with the distribution network interface unit(s).

In a first configuration of the system of the present invention, each of the distribution network interface unit(s) condition the received media data for later modulation and transmission over an analog distribution network. More specifically, each of the distribution network interface units decodes a part of the media data to generate decoded media data and encodes the decoded media data into an analog video format. In a preferred embodiment of the first configuration of the system of the present invention, the storage devices of the media server store files of media data which has encoded in accordance with a compression standard and which includes audio packets and video packets. In this embodiment, each of the distribution network interface units includes (i) a stream demultiplexer for demultiplexing a stream of the audio and video packets, (ii) an audio decoder for receiving audio packets from the stream demultiplier and decoding compressed audio data encapsulated in the audio packets, (iii) a video decoder for receiving video packets from the stream demultiplexer and decoding compressed video data encapsulated in the video packets to form decoded video, and (iv) a video encoder for encoding the decoded video into an analog standard.

In a second configuration of the system of the present invention, each of the distribution network interface unit(s) condition the received media data for transmission over a digital distribution network. In a preferred embodiment of this second configuration, the storage devices of the media server store files of media data which has been encoded in accordance with a compression standard and which includes audio packets and video packets. Further, in the preferred embodiment of the second configuration, each of the plurality of distribution network interface unit(s) includes (i) a parser for separating streams including audio and video packets, (ii) a buffer for receiving the streams separated by the parser and buffering the streams separated by the parser, and (iii) an output multiplexer for multiplexing, at a generated rate, the streams buffered in the buffer.

In a third configuration of the system of the present invention, at least one of the distribution network interface units conditions a part of the received media data for transmission over an analog distribution network, and at least one other of the distribution network interface units conditions another part of the received media for transmission over a digital distribution network. In a preferred embodiment of this third configuration, the storage devices of the media server store files of media data which has been encoded in accordance with a compression standard and which includes audio packets and video packets. The distribution network interface unit(s) which condition part of the received media for transmission over a digital distribution network includes (i) a parser for separating streams including audio and video packets, (ii) a buffer for receiving the streams separated by the parser and buffering the streams separated by the parser, and (iii) an output multiplexer for multiplexing, at a generated rate, the streams buffered in the buffer for later modulation onto a first frequency band of an analog distribution network. The distribution network interface unit(s) which condition a part of the received media data for transmission over an analog distribution network includes (i) a stream demultiplexer for demultiplexing a stream of the audio and video packets, (ii) an audio decoder for receiving audio packets from the stream demultiplexor and decoding compressed audio data encapsulated in the audio packets, and (iii) a video decoder for receiving video packets from the stream demultiplexer and decoding compressed video data encapsulated in the video packets to form decoded video, and (iv) a video encoder for encoding the decoded video into an analog standard for later modulation onto a second frequency band of the analog distribution network.

In any of the above configurations, the media server preferably includes a plurality of video pump processes. Each of the plurality of video pump processes is associated with a unique distribution network interface unit. The video pump processes are stored in the program storage. When one of the video pump processes is executed by a processor, it receives a request for media data from a subscriber and/or an associated distribution network interface unit. It then generates, in response to the received request for media data, a query for a scheduled media file and receives the scheduled media file in response to its query. Next, the video pump process streams the media file to the associated distribution network interface unit via the first communications path, a server interface unit, and the second communications path.

Alternatively, when a video pump process is executed by a processor of the media server, it (i) receives a request for media data from a subscriber and/or an associated distribution network interface unit, (ii) generates, in response to the received request for media data, a first query for a scheduled media file, (iii) receives a media file identifier in response to its first query, from the files of scheduling information stored in the storage devices, (iv) generates a second query for a media file associated with the received media file identifier, (v) receives the scheduled media file in response to its second query, and (vi) streams the media file to the associated distribution network interface unit via the first communications path, a server interface unit, and the second communications path.

In any of the above configurations, the media server may further include a load schedule process. The load schedule process is stored in the program storage. When executed by the a processor, the load schedule process loads files of scheduling information, from an external source, to the storage devices. The external source may be a remote media server. Similarly, in any of the above configurations, the media server may further include a load media process. The load media process is stored in the program storage. When executed by a processor, the load media process loads files of compressed media, from an external source, to the storage devices. Again, the external source may be a remote media server.

In any of the above configurations, the media server further may include an inventory check process. The inventory check process is stored in the program storage. When executed by a processor, the inventory check process reads at least a part of the scheduling information stored in the storage devices and determines whether media files scheduled in an upcoming time period reside on the storage devices. If one or more of the media files scheduled in the upcoming time period do not reside on the storage devices, the inventory check process invokes the load media process to load the one or more media files.

In any of the above configurations, the media server may further include a message router process. The message router process is stored in the program storage. When executed by a processor, the message router process (i) accepts a cue tone packet, which includes server interface unit identification information and distribution network interface unit identification information and (ii) invokes one of the video pump processes based on the server interface unit and distribution network interface unit identification information. The media server may further include a server interface unit interface processes. The server interface unit interface process may be implemented by one of the input/output interfaces and forwards received cue tone packets to the message router process. The media server may further include a cue tone generation process. The cue tone generation process is stored in the program storage. When executed by a processor, the cue tone generation process queries, based on a time, the storage devices for scheduling information and receives scheduling information in response to its query. Based on the received scheduling information, the cue tone generation process then generates a cue tone packet based on the received scheduling information. The cue tone generation process then forwards the generated cue tone packet to the message router process In any of the above configurations, the system of the present invention may further include a remote media server. The remote media server preferably includes at least one processor, a program storage, input/output interfaces, storage devices for storing files of processed media, scheduling information, and system configuration information, and a shared bus system to which the processor(s), the program storage, the input/output interfaces, and the storage devices are coupled. A communications link couples at least one of the input/output interfaces of the remote media server with at least one of the input/output interface units of the media server. The communications link may be established over a public switched telephone network.

In a system including the remote media server, the remote media server may further include a load media process, a media pre-processing process, and a store media process. Each of these processes may be stored in the program storage of the remote media server. When executed by a processor of the remote media server, the load media process accepts files of encoded media from an off-site facility. When executed by a processor of the remote media server, the media pre-processing process (i) accepts files of encoded media from the load media process, (ii) verifies that the media file complies with a compression standard, and (iii) remaps packet identifiers to correspond to conventions used in at least one of the distribution network interface units. When executed by a processor of the remote media server, the store media process (i) receives files of preprocessed media from the media preprocessing process and (ii) stores the received files of preprocessed media to the storage devices of the remote media server. In a system which does not include a remote media server, the media server may further include the load media process, the media pre-processing process, and the store media process.

In a preferred embodiment of the system of the present invention, each of the server interface unit(s) further include a control data input/output interface coupled with the internal bus system, and a control data controller coupled with the internal bus system.

BRIEF DESCRIPTION OF THE DRAWINGS

FIG. 34 illustrates a table for PID remapping of multiple channels of transport streams.

DETAILED DESCRIPTION

In the following, an initial configuration, for use with an analog distribution network, of the system of the present invention will first be discussed. Specifically, the function, high level structure, and high level operation of the initial configuration will be described, the details of the devices which may be used to construct the initial configuration will then be described, and finally the detailed operation of the initial configuration will be described. Similarly, a hybrid configuration and a second configuration, for use with an analog and digital hybrid network, respectively, of the present invention will be discussed. Again, the function, high level structure, and high level operation of the hybrid and second configurations will be described, the details of the devices which may be used to construct the hybrid and second configurations will then be described, and finally the detailed operation of the hybrid and second configurations will be described.

§1. FUNCTION OF INITIAL CONFIGURATION

Figure 1:
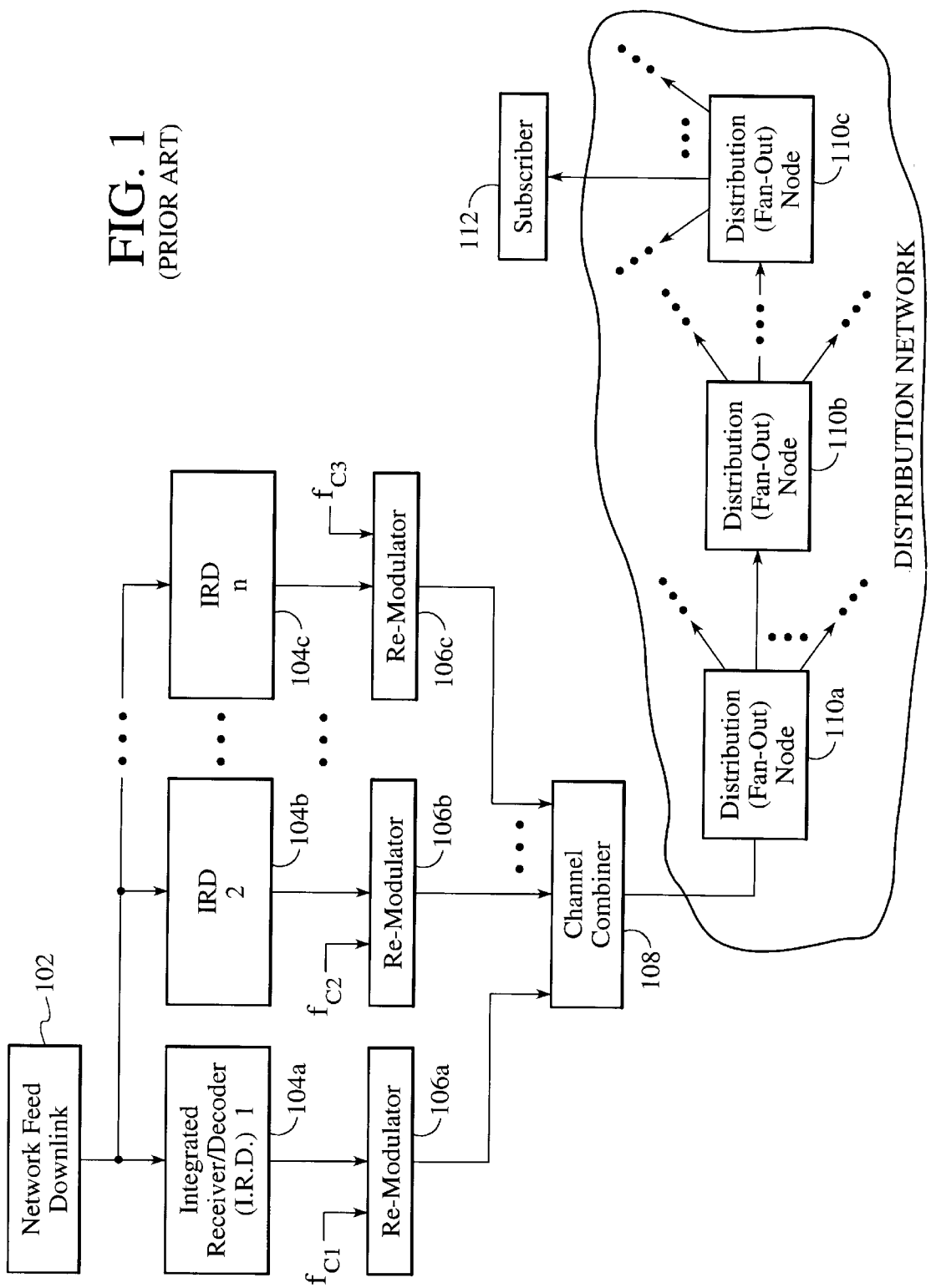
FIG. 1 is a high level block diagram of a conventional CATV head-end station and analog distribution network.

The system of the present invention may be initially configured for use with an analog distribution network, such as a co-axial cable distribution network discussed above with reference to FIG. 1.

The system should facilitate ad (or other media) insertion functionality. That is, the system should permit either of (a) national video programming, or (b) local video programming, to be selectively applied to the analog distribution network. More specifically, the local video programming may be stored as compressed (e.g., MPEG-2, General Instrument's VIDEO CYPHER-2, etc. encoded) video streams, transmitted as a transport stream of compressed video streams to a number (i.e., one or more) of distribution network interfaces, decoded by a targeted one of the distribution network interfaces, encoded into a standard video format (e.g., NTSC or PAL), modulated with a particular carrier frequency, combined with other video signals modulated at other carrier frequencies to form a frequency division multiplexed broadband signal, and multicast or broadcast to a number of subscribers over the analog (e.g., co-axial cable) distribution network. The local video programming may be a "break" including one or more commercial advertisements (or "spots").

The system should also facilitate video compositing functionality. That is, the system should permit locally stored video, graphical, and/or textual data to be combined, with, or overlayed on, a national video feed (or locally provided video). For example, locally stored video, graphical, and/or textual data may include local theaters and play times of certain movies while the national video feed may include trailers of the movies. The locally stored video, graphical, and/or textual data should be transmitted in accordance with a stored schedule which is based on the sequence of movie trailers of the national video feed such that the video, graphical, and/or textual data conveys information corresponding to the specific movie trailer with which it is overlayed.

Finally, the system should facilitate near video-on-demand (or "NVOD") functionality. That is, the system should permit a subscriber to order a particular movie. Scheduling of popular movies is determined based on customer orders, scheduling minimum requirements, and the location(s) at which the movies are stored. If the movie is currently scheduled to start, the customer is given a choice of available start times. When the requested movie is not currently scheduled, the scheduling system is queried for open channel availability and a channel, if available, then may be assigned to the movie for subscriber viewing. If all channels are in use, the customer is given the next available start time.

§2. HIGH LEVEL DESCRIPTION OF THE STRUCTURE OF THE INITIAL CONFIGURATION

Figure 2:
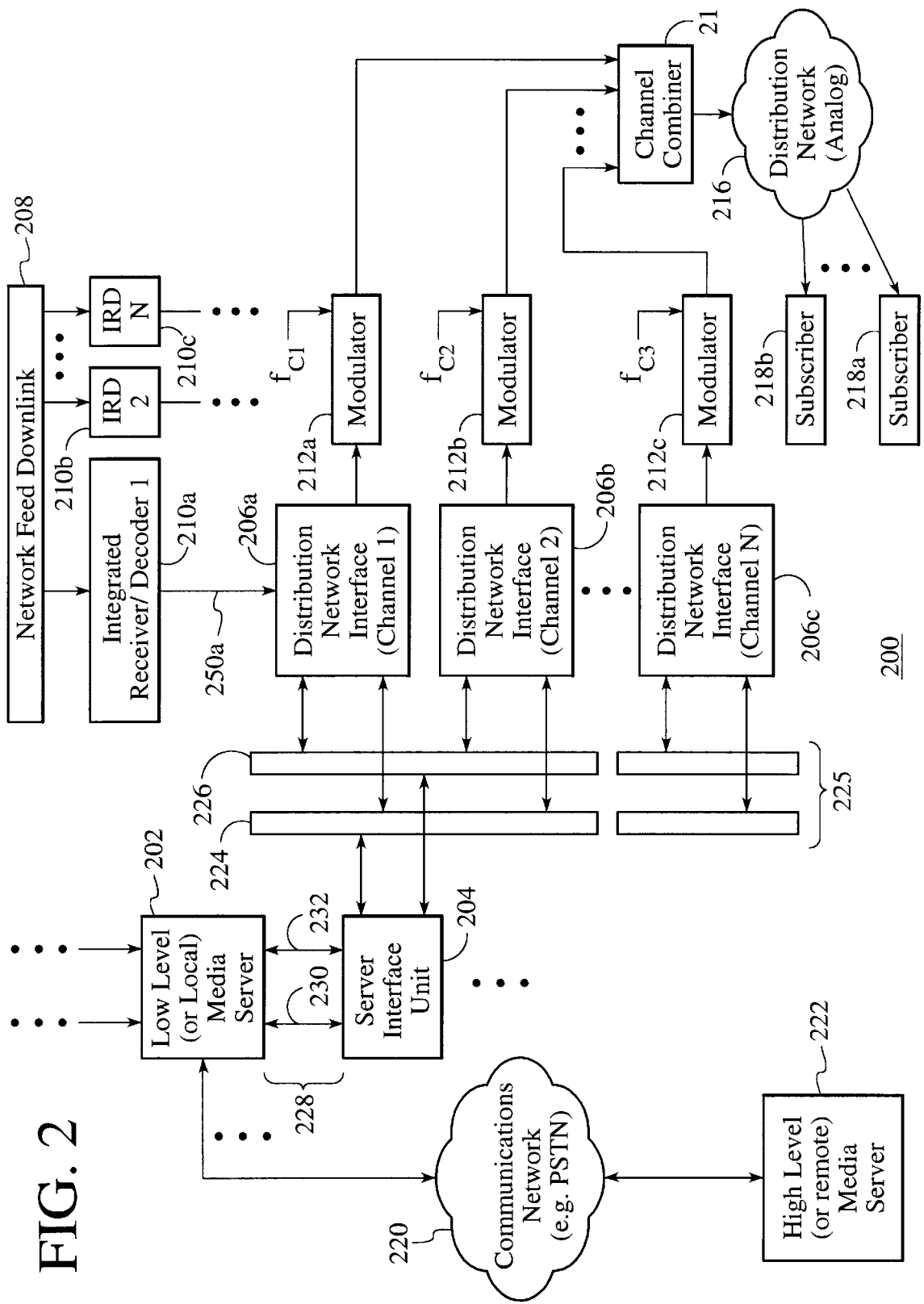
FIG. 2 is a high level block diagram of an initial configuration, for use with an analog distribution network, of the system of the present invention.

FIG. 2 is a high level block diagram of the initial configuration 200 of the system of the present invention in conjunction with an analog (e.g., co-axial cable) distribution network 216. In the most basic arrangement, the system includes a local media server 202, one or more server interface units 204, a plurality (e.g., eight) distribution network interface units 206 assigned to each of the one or more server interface units 204, a first communications means 228 for permitting the communication of data between the local server 202 and the one or more server interface units 204, and a second communications means 225 for permitting the communication of data between the server interface unit(s) 204 and its associated distribution network interface units 206. In one version of the system of the present invention, a server interface unit 204 may have only one (1) associated distribution network interface unit 206.

The system may further include an optional remote media server 222 which may communicate with one or more local media server(s) 202 via a communications network 220, such as the public switched telephone network (or "PSTN") for example.

The channels of a national video feed are received by a network feed downlink 208, such as a satellite dish and receiver for example, decoded by integrated receiver/decoders 210, and provided to corresponding distribution network interface units 206.

Briefly stated, the local media server 202 stores files of compressed (e.g., MPEG-2, VIDEO CYPHER-2, Dolby, etc. encoded) media (e.g. video programming) as well as scheduling information. Upon request, the local media server 202 retrieves file(s) of compressed media (e.g. video), multiplexes the files (onto an MPEG-2 transport stream (or another stream of packets) for example), and communicates the files to an appropriate one of the distribution network interface units 206 via the first communications means 228, a server interface unit 204, and the second communications means 225.

The server interface unit 204 buffers the files of compressed media (e.g. video), communicates the buffered files of compressed media data to appropriate ones of the distribution network interface units 206 upon request via the second communications network 225, and communicates control data to the local media server 202 via the first communications means 225.

Each of the distribution network interface units 206 demultiplexes the files of compressed media data to separate the data into video, audio, and other types of packets, decodes the compressed video data, formats the decoded video data into a standard format (e.g., NTSC or PAL) and synchronizes the decoded video with a channel of a national video feed, provides the formatted, decoded, and synchronized video to a first input of a switch, provides a channel of a national video feed to a second input of the switch, selectively switches the switch such that either the formatted and decoded video or the national video channel is output from the switch, decodes cue tones found in the channel of the national feed, and communicates the decoded cue tones to the local media server 202. Each of the distribution network interface units 206 also generates and feeds back control data to its server interface unit 204.

A switch for analog audio data is also provided and operates with the analog video switch.

For each distribution network interface unit 206, the analog video data output from the switch is provided to a modulator 212, associated with the distribution network interface unit 206. Each of the modulators 212 modulates the analog video data at a unique carrier frequency. The outputs of the modulators 212 are provided to a channel combiner 214 which outputs a broadband signal in which a plurality of video signals are frequency division multiplexed. The output of the channel combiner 214 is broadcast or multicast to a plurality of subscribers 218 via an analog distribution network 216, such as a co-axial cable distribution network for example.

The optional remote media server 222 provides additional storage for compressed media data and scheduling data. The remote media server 222 may transmit this data to the local media server 202, or to other local media servers, via a third communications means 220, such as the public switched telephone network (or "PSTN") for example.

§3. HIGH LEVEL EXAMPLES OF OPERATION

Examples of services supported by the initial configuration of the system of the present invention are discussed briefly below. A more thorough description of these services as supported by an exemplary architecture of the initial configuration will be provided later.

§3.1 AD INSERTION

The initial configuration of the system of the present invention can support ad insertion. To reiterate, when performing ad insertion, the system should permit either of (a) national video (and audio) programming, or (b) local video (and audio) programming, to be selectively applied to the analog distribution network 216. The local video programming may be stored as compressed (e.g., MPEG-2, VIDEO CYPHER-2, etc. encoded) video streams. The local video programming may include a "break" including one or more commercial advertisements (or "spots").

Conventional subscriber systems, such as cable television systems, are typically arranged to provide viewer programs according to a pre-determined time schedule. The integrated receiver-decoder (IRD) located at the headend provides the video, audio, and cue tone signals for each national network source. The national network programmers provide certain intervals—designated breaks—during each program for use by the local cable programmer. For instance, it is common to set aside approximately four minutes in each half-hour for local insertion of commercial advertisements (ad-insertion) particularly relevant to the local subscribers of the given system. The time of occurrence of each break is generally indicated by the cue tone signal delivered as part of the national network feed signal. Accordingly, it is necessary to provide the local cable programmer with the capability of alternately selecting multiple sources of program information to thereby substitute local advertisements in place of national advertisements, in consonance with the cue tone indications, at the discretion of the local programmer.

One conventional technique for ad-insertion is characterized by a combination of a cue tone detector, controller, switching equipment for both video and audio, and tape players which hold the local advertising material. The different cue tones that may be transmitted in the television program feed include: (1) a pre-roll period (to allow the videotape player to attain operating speed; (2) a transfer-to-ad signal (the beginning of the advertisement transmission interval); and (3) a return signal (to return to the transmission from the national network source). A cue tone typically consists of four (4) standard dual-tone multi-frequency (DTMF) signals. A standard DTMF signal has one (1) of 16 values. Thus, a cue tone may represent one (1) of 65,536 (i.e., $16^4$) possible values.

In one typical operational sequence, the series of cue tones detected by the cue tone detector serve as inputs to the controller. The controller activates a local tape player, which has a mounted tape containing the desired advertisement, in response to the pre-roll cue tone. The switching equipment, when notified by the controller of the transfer-to-ad cue tone, then switches the subscriber system from the incoming national video and audio signals to the output of the local tape player for the duration of the advertisement. Finally, the switching equipment returns the subscriber system to the incoming national network feed upon receipt of the return cue tone.

In another possible operational sequence, only the pre-roll cue tone may be required. In this scenario, the local cable programmer knows that for the given cable channel the pre-roll time is a fixed time duration; immediately following this interval, the switch to the local advertisement is effected. It is also known to the local programmer that each break is of a fixed duration, so switching back to the national feed will occur after this fixed duration. Thus, only the pre-roll cue tone is utilized during this operational sequence; the transfer-to-ad and return cue tones need not be sent, or if they are sent, may be ignored (or used for error checking if desired).

Figure 3:
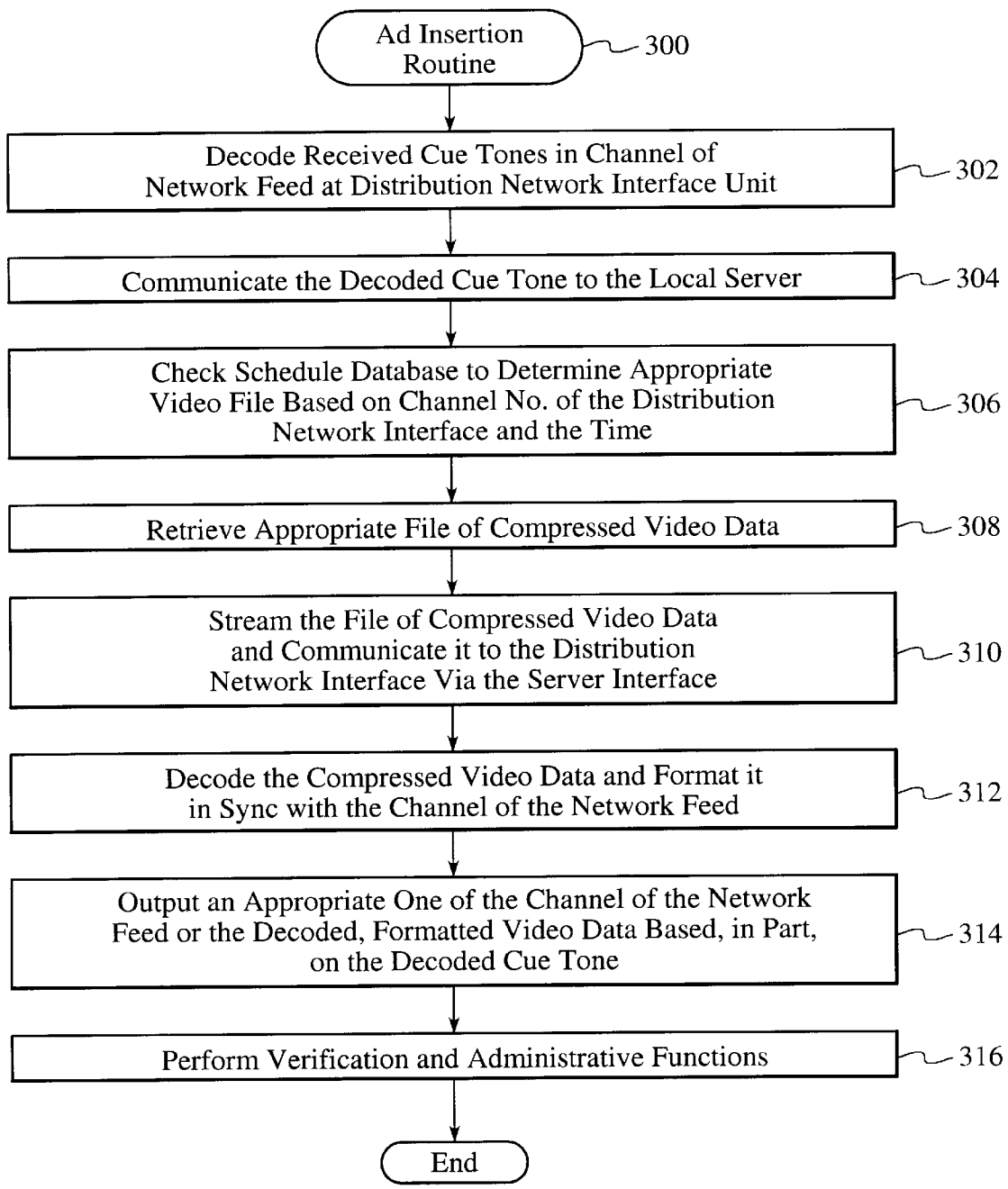
FIG. 3 is a flow diagram of the operation of an ad insertion function as supported by the initial configuration of the system of the present invention.

FIG. 3 is a high level flow diagram of the ad insertion routine 300 as performed by the initial configuration of the system of the present invention. First, as shown in step 302, a distribution network interface unit 206 receives a channel of a network feed. As discussed above with respect to conventional ad insertion systems, each channel of the network feed will include cue tones. The distribution network interface unit 206 decodes the cue tones. Next, as shown in step 304, the distribution network interface unit 206 communicates the decoded cue tone to the local media server 202.

At the local media server 202, as shown in step 306, the local media server 202 checks a resident schedule database to determine an appropriate file of compressed media (including e.g. video) data. More specifically, as shown in step 308, the local media server 202 uses the time and the channel corresponding to the distribution network interface unit 206 to look up and retrieve the filename(s) or number(s) of file(s) of compressed media data in the schedule database. The file(s) of compressed media data are then read from a compressed media database. Next, as shown in step 310, the file(s) of compressed video data are transmitted, as a transport stream of compressed packetized elementary streams, to the server interface 204. The server interface 204 communicates the file(s) of compressed video data to the appropriate distribution network interface unit 206.

Finally, as shown in step 312, back at the distribution network interface unit 206, the file of compressed video data is decoded and formatted in synchronization with the channel of the network feed. As shown in step 314, the distribution network interface unit 206 then selectively outputs an appropriate one of the channel of the network feed or the decoded, formatted, local video (and audio) data based, in part, on the decoded cue tone.

Finally, verification and other administrative functions are performed as shown in step 316.

The output of the analog video switch (and the analog audio switch) of the distribution network interface unit 206 is modulated with a carrier frequency, combined with other video (and audio) signals modulated at other carrier frequencies to form a frequency division multiplexed broadband signal, and multicast or broadcast to a number of subscribers over the analog (e.g., co-axial cable) distribution network.

§3.2 COMPOSITING TEMPORALLY RELATED VIDEO FRAMES

The initial configuration of the system of the present invention can support compositing temporally related video frames. To reiterate, when this compositing function, the system should permit locally stored video, graphical, and/or textual data to be combined, with, or overlayed on, a national (or locally generated) video feed.

Figure 4:
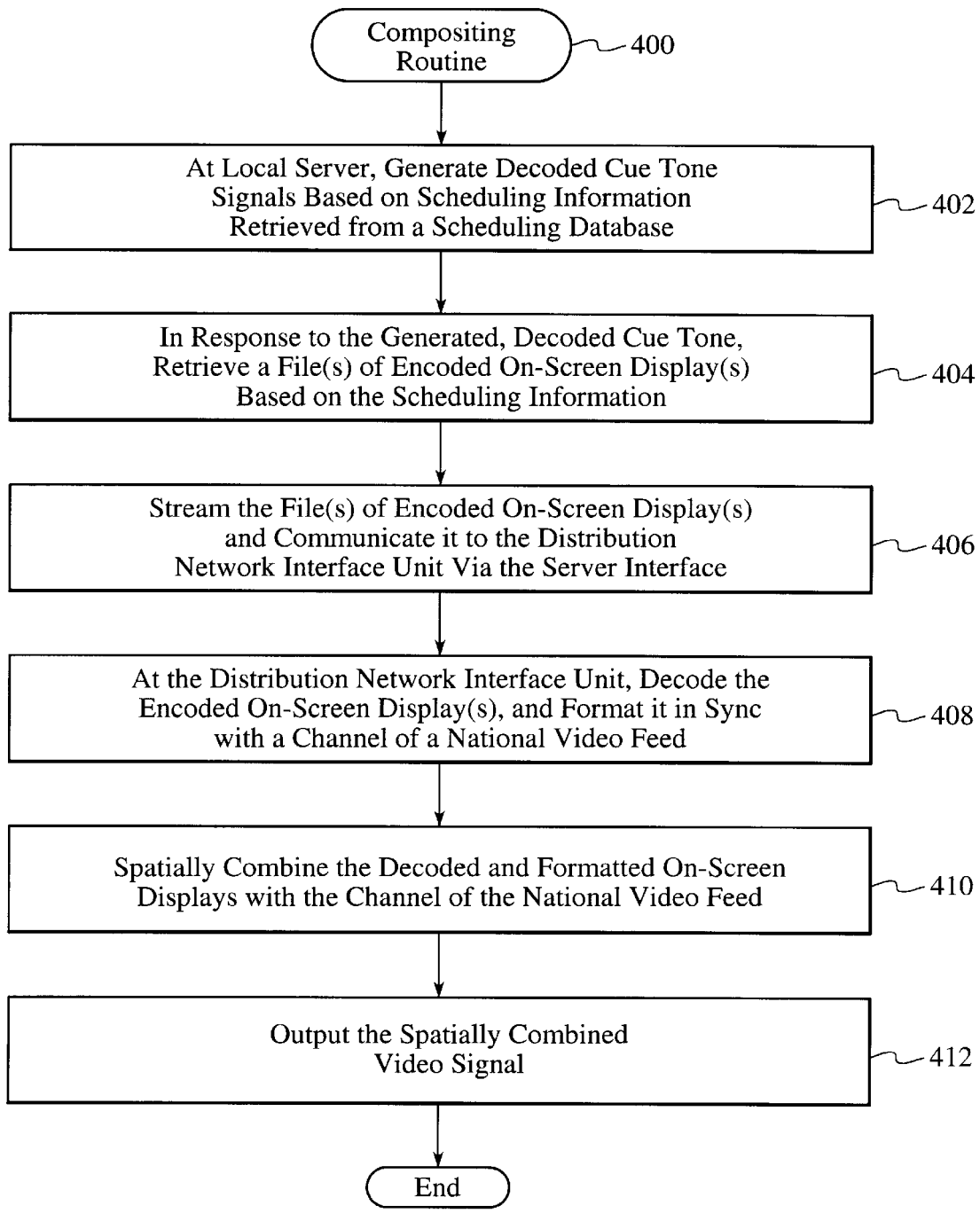
FIG. 4 is a flow diagram of the operation of a compositing function as supported by the initial configuration of the system of the present invention.

FIG. 4 is a high level flow diagram of the compositing routine 400 as performed by the initial configuration of the system of the present invention. First, at the local media server 202, decoded cue tone signals are generated based on scheduling information retrieved from a scheduling database as shown in step 402. Next, as shown in step 404, in response to the generated decoded cue tone signals, file(s) of packetized on-screen display(s) (or "OSDs") are retrieved from a mass storage device. The on-screen display may, for example, include the playtimes of a particular movie at local theaters. An associated channel number may also be stored in, and retrieved from, the mass storage device. The local media server 202 then streams the file(s) of encoded on-screen display(s) and communicates it to a distributed network channel interface unit 206 corresponding to the channel number as shown in step 406.

At the distribution network interface unit 206, as shown in step 408, the file(s) of encoded on-screen display(s) are decoded and then formatted in synchronization with a channel of a national (or locally generated) video feed. For example, the national video feed may include a repetitive sequence of trailers of movies in current release. Next, as shown in steps 410 and 412, the decoded and formatted on-screen display(s) are spatially combined with the channel of the national video feed and output. The spatially combined video signal displays the trailer of a movie in current release with an overlay of playtimes of that particular movie at local theaters.

§3.3 NVOD

Figure 5:
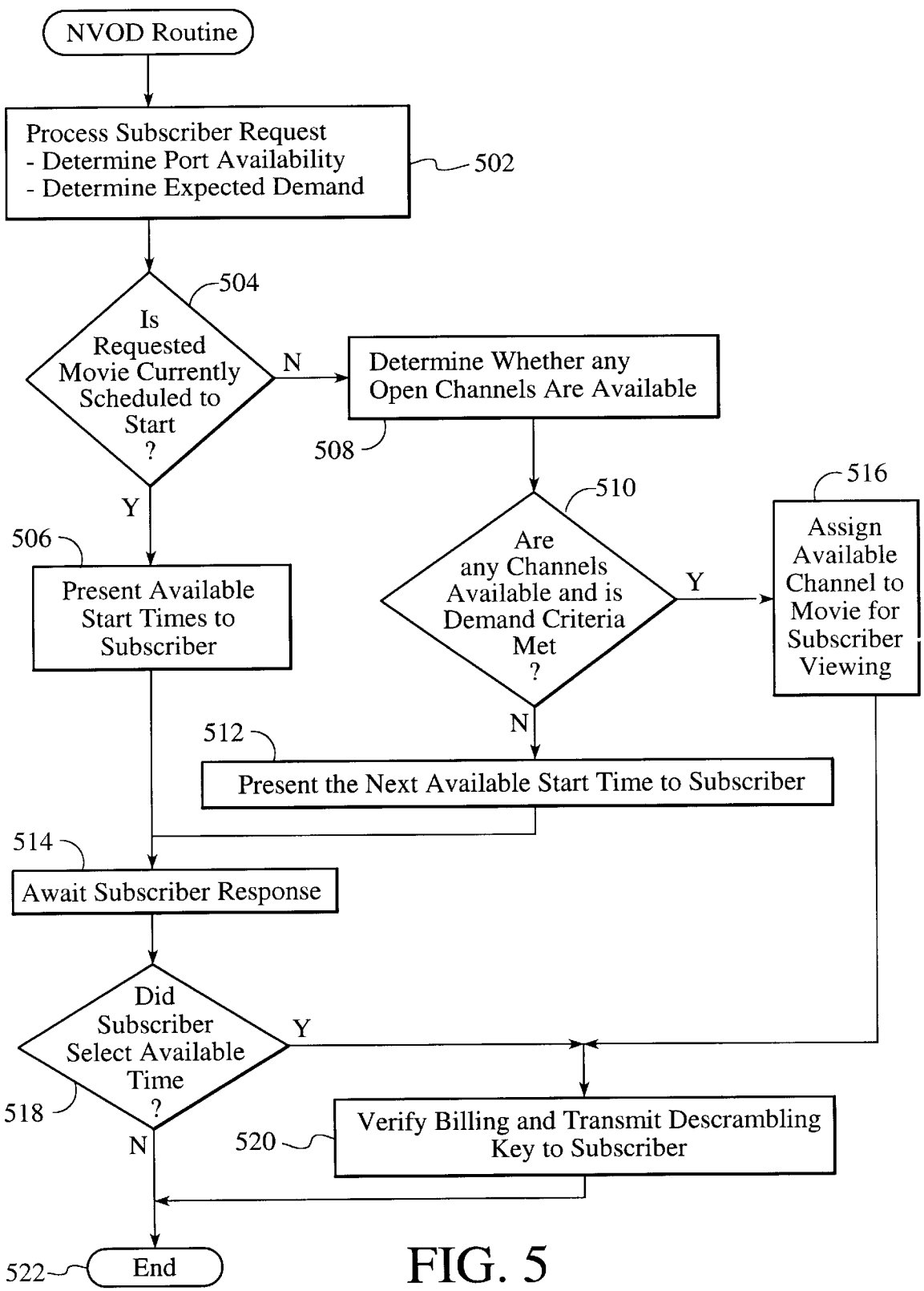
FIG. 5 is a flow diagram of the operation of a near video-on-demand (or NVOD) function as supported by the initial configuration of the system of the present invention.

The initial configuration of the system of the present invention can also support near video-on-demand (or NVOD) functions. Recall that the near video-on-demand functions include permitting a subscriber to request a particular movie. FIG. 5 is a high level flow diagram of the near video-on-demand functions supported by the initial configuration of the system of the present invention.

First, as shown in step 502, the system determines port (i.e., channel) availability and expected demand for particular movies and processes a subscriber request. As shown in steps 504, 506, and 514, if the requested program (e.g. a movie) is currently scheduled to start, the available start times are presented to the subscriber, and a subscriber response is awaited. If, on the other hand, the requested program is not scheduled to start, as shown in steps 504 and 508, it is determined whether any open channels are available. If, as shown in steps 510, 512, and 514, a channel is not available (or the minimum demand or expected demand criteria are not met), the next available start time is presented to the subscriber and a subscriber response is awaited. If, on the other hand, as shown in steps 510 and 516, a channel is available (and assuming that the minimum demand or expected demand criteria are met), the available channel is assigned to the movie for viewing by the subscriber.

Next, if, as shown in step 518, the subscriber selects an available start time or if, as shown in step 516, an available channel is assigned to a movie for subscriber viewing, as shown in step 520, billing status is verified and a descrambling key is transmitted to the subscriber, If, on the other hand, as shown in steps 518 and 522, the subscriber does not wish to view the movie at any of the available scheduled times, the process ends.

§4. DETAILED DISCLOSURE OF THE STRUCTURE OF THE INITIAL CONFIGURATION

The following describes the devices used in an exemplary implementation of the initial configuration of the present invention. In this exemplary embodiment, up to eight (8) distribution network interface units 206 are assigned to each server interface unit 204. Only the structures of these devises are set forth below. The detailed operations of the devices will be set forth in greater detail later.

§4.1 FIRST COMMUNICATIONS MEANS

The first communications means 228 preferably includes a data connection 230 and a control connection 232. The data connection 230 is preferably a parallel bus that supports the SCSI-2 (or Small Computer Standard Interface) fast and wide protocol. (The SCSI-2 protocol is a standard protocol familiar to those skilled in the art.) The control connection 232 is preferably an Ethernet link over which the standard TCP/IP (or Transmission Control Protocol/Internet Protocol) protocol is used. (The TCP/IP protocol is a standard protocol familiar to those skilled in the art.)

§4.2 SECOND COMMUNICATIONS MEANS

The second communications 225 means preferably includes a data connection 224 and a control connection 226. The data connection 224 supports high-bandwidth data transfers, in an essentially unidirectional manner, from a server interface unit 204 to its associated distribution network interface units 206. The control connection 226 is a low-bandwidth link which carries both control and status information. Both logical connections of the second communications means 225 use specially designed protocols to maximize the flow of data and control information between the server interface unit 204 and the distribution network interface units 206.

Figure 8:
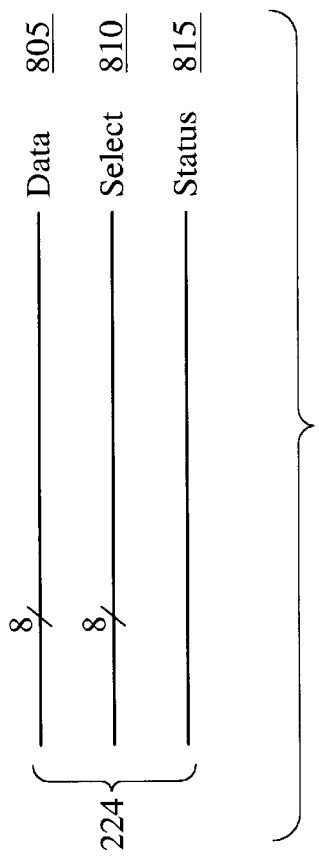
FIG. 8 illustrates the compressed data bus of the initial configuration of the system of the present invention shown in FIG. 2.

As shown in FIG. 8, the data connection 224 includes an eight (8) bit wide data bus 805, an eight (8) bit wide select bus 810 (for selecting one or more of the eight (8) distribution network interface units to receive data), and a status line 815. The status line 815 caries a signal which allows the delivery of two bits of information, namely a flow control bit and an interrupt bit, for each distribution network interface unit 806. The sixteen (16) bits are carried in a sixteen (16) time division multiplexed slots. The flow control and interrupt bits will be explained in greater detail later. One skilled in the art will appreciate that data connection 224 can be modified to permit communication between a server interface unit 204 and more or less than eight (8) distribution network interface units 206, or between a server interface unit 204 and distribution network interface unit(s) handling more or less than eight (8) channels.

Figure 9:
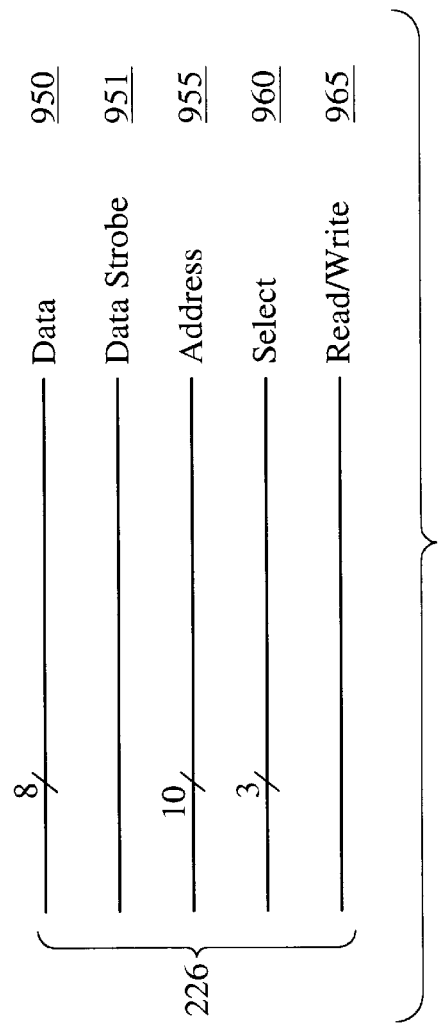
FIG. 9 illustrates the control bus of the initial configuration of the system of the present invention shown in FIG. 2.
Figure 10:
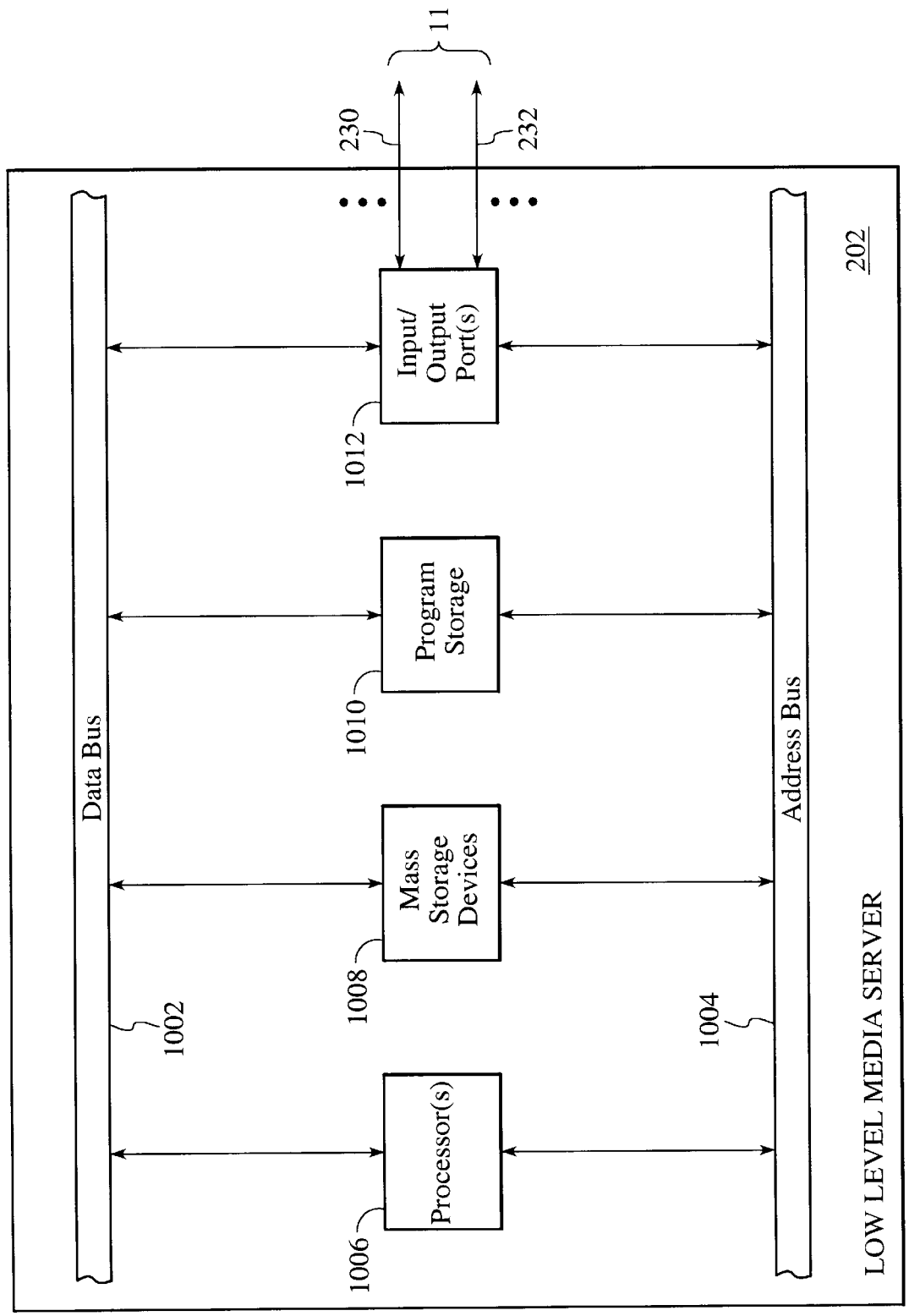
FIG. 10 is a block diagram of the local media server of the initial configuration of the system of the present invention shown in FIG. 2.

As shown in FIG. 9, the control connection 226 includes an eight (8) bit wide control data bus 950, a data strobe line 951, a ten (10) bit wide control address bus 955, a three (3) bit wide select bus 960, and a read/write line 965. The three (3) bit wide select bus 960 allows access of one of the eight distribution network interface units 206, typically on a polling basis or in response to an interrupt request. As with the data connection 224, one skilled in the art will appreciate that the control connection 226 can be modified to permit communication between a server interface unit 204 and more or less than eight (8) distribution network interface units 206, or between a server interface unit 204 and distribution network interface unit(s) handling more or less than eight (8) channels.

§4.3 SERVER INTERFACE UNIT

Figure 6:
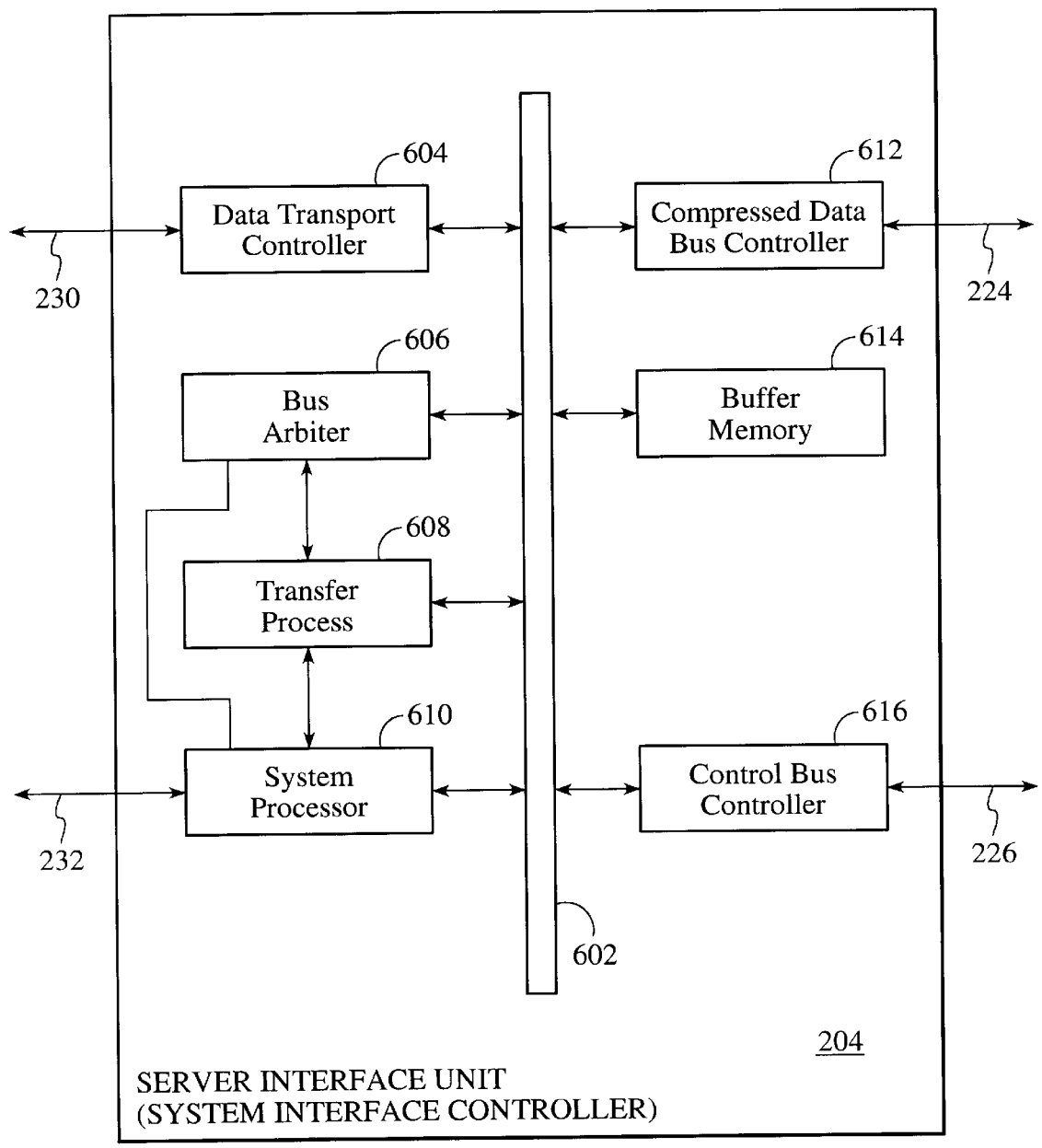
FIG. 6 is a block diagram of the architecture of the server interface unit of the initial configuration of the system of the present invention shown in FIG. 2.

In the exemplary implementation of the initial configuration of the system of the present invention, the server interface unit(s) 204, as shown in FIG. 6, includes an internal bus system 602, a data transport controller 604, a bus arbiter 606, a transfer processor 608, a system processor 610, a compressed data bus controller 612, a buffer memory 614, and a control bus controller 616.

The internal bus system 602 preferably includes a 32 bit data bus and a 32 bit address bus. The data transport controller 604 preferably implements a master or slave side of the SCSI-2 fast and wide protocol supported over data line 230 of the first communications means 228. The data transport controller 604 may be implemented with a NCR720 device sold by SIMBIOS for example. The transfer processor 608 may be implemented with a Motorola 68349 microprocessor for example, and preferably includes two DMA (direct memory access) channels. The system processor 610 may be implemented with a Motorola 68360 microprocessor for example. The compressed data bus controller 612 may be implemented with a programmable gate array such as a XC4010 available from XILINX Inc. The compressed data bus controller 612 converts each 32 bit data word from the 32 bit data bus 602 into four eight-bit data words for byte wide serial communication on the data bus 805 of the compressed data bus 224. The buffer memory 614 is preferably 18 MBytes of DRAM, such as a MB814260 device available from Fijitsu. The 18 Mbytes of memory may be logically divided into nine (9) two-MByte blocks (or queues) such that each of the eight (8) two-MByte queues corresponds to one of the eight (8) distribution network interface units 206, and a two-MByte section remains for storing process instructions for the system processor 610. One skilled in the art can appreciate that the number of queues (and perhaps the physical size of the buffer memory 614) can vary if the server interface unit 204 communicates with more or less than eight (8) distribution network interface units 206 or if the server interface unit 204 is used for more or less than eight (8) channels. The control bus controller 616 is preferably a field programmable gate array such as a Lattice 1048c device for example. Finally, the bus arbiter 606 is preferably a field programmable gate array such as a Lattice 3256 ispLSL device for example.

The data transport controller 604 has its own DMA channel, which permits it to directly move an incoming transport stream to buffer memory 614 via data bus of the interface bus 602. The transfer processor 608 has two DMA channels which facilitate moving data from buffer memory 614 over the 32-bit data bus of the interface bus 602.

§4.4 DISTRIBUTION NETWORK INTERFACE UNITS

Figure 7A:
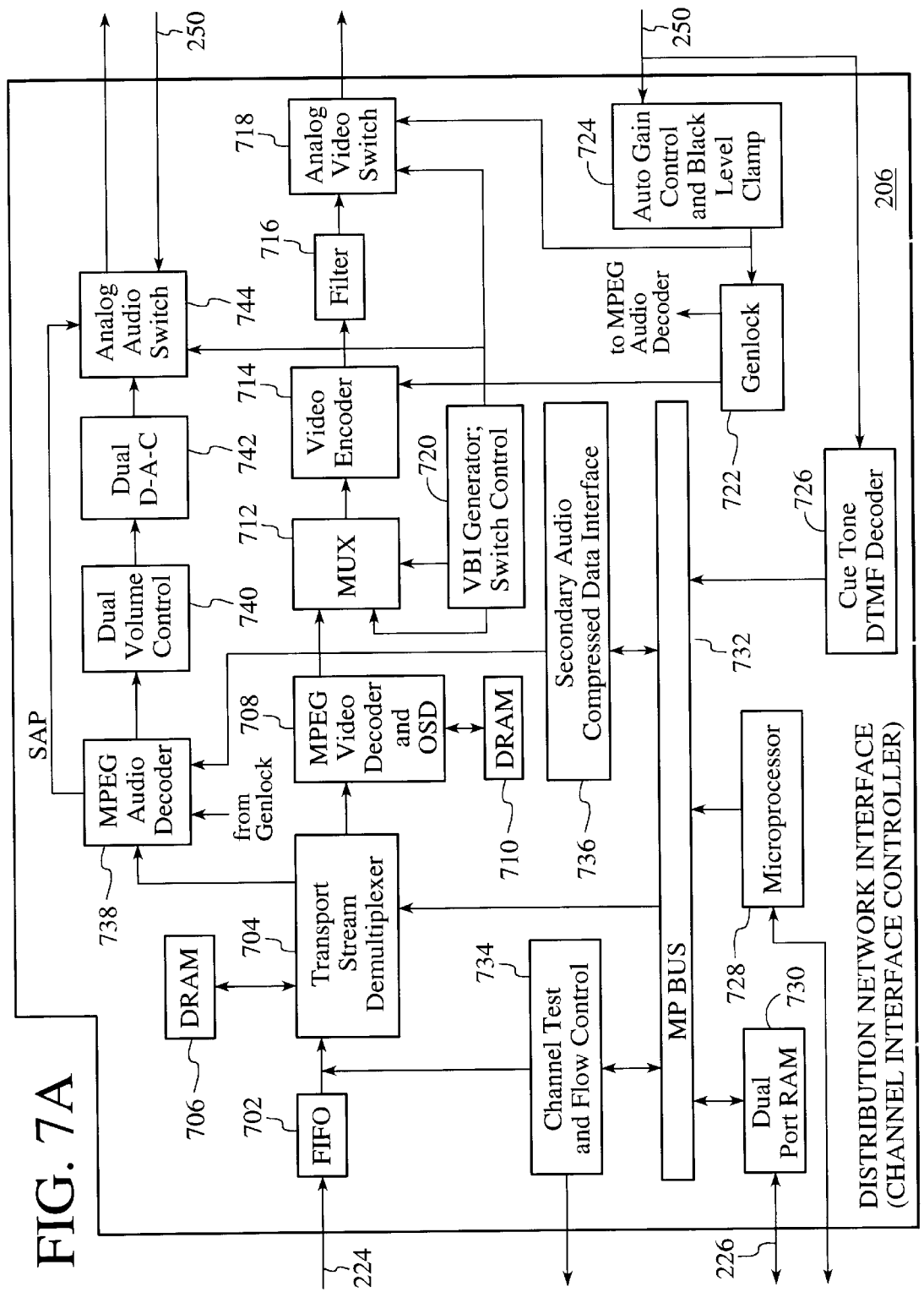
FIG. 7a is a block diagram of the architecture of one of the distribution network interface units of the initial configuration of the system of the present invention shown in FIG. 2.

FIG. 7a is a block diagram of an exemplary distribution network interface unit 206 which may be used in the initial configuration of the system of the present invention. The distribution network interface unit 206 includes, inter alia, a FIFO 702, a transport stream demultiplexer 704 having a DRAM 706, an MPEG video decoder and OSD 708 having a DRAM 710, a two-to-one multiplexer 712, a video encoder 714, a filter 716, an analog video switch 718, a vertical blanking interval (or "VBI") generator and switch controller 720, a genlock circuit 722, and auto gain control and black level clamp circuit 724, a cue tone decoder 726, a microprocessor 728, a dual port RAM 730, a bus 732, a channel test and flow control circuit 734, a secondary audio compressed data interface 736, an MPEG audio decoder 738, a dual volume control 740, a dual digital-to-analog converter 742, and an analog audio switch 744.

The transport stream demultiplexer 704 separates, based on the PID fields 2220, transport stream packets of an incoming MPEG-2 transport stream 2112 into MPEG elementary data streams representative of, for example, audio information and video information (and also secondary audio program and private data for example). The separated data streams are temporarily stored in the memory portion of, and controlled by, the transport stream demultiplexer 704. More specifically, as discussed above, the MPEG-2 transport stream 2112 is characterized by a MPEG packet having a transport "header" 2114 and a payload portion 2116, the payload portion 2116 carrying at least part of an elementary data stream 2108. The transport stream demultiplexer 704 first synchronizes itself to conventional MPEG-2 packet boundaries. Once synchronized, it then parses the packet to obtain header information 2114 and routes the payload 2116 to its storage. The transport header 2114, and specifically the PID field 2220, indicates the type of information contained in the packet, such as audio, video, secondary audio programming (SAP, to be discussed later), and private data. The payload 2116 is stored in different areas of the memory (e.g., 706) of the transport stream demultiplexer 704 based on the type of information in the payload; e.g., the video is stored in a queue which is proportionately larger than the memory allocated to audio and SAP due to the large number of bits required to generate the video component of the overall output signal compared to the audio component.

The distribution network interface unit 206 of the first configuration of the system of the present invention processes video data as follows. The video data stored in the video queue of transport stream demultiplexer 704 is available to MPEG video decoder 708 via the path shown. The MPEG video decoder 708 (e.g. a STi3500A MPEG Video Decoder manufactured by SGS-Thomson Microelectronics) also includes and controls its own memory (e.g., DRAM 710), and if its memory is not full and can accept video data (known to the transport stream demultiplexer 704 via a hardware-type "handshake" over the path shown), then the transport stream demultiplexer 704 downloads video data to MPEG video decoder 708 for storage in its memory (e.g., DRAM 710).

As will become apparent, the video data, besides being initially stored as a file at the local media server 202, is also stored in three intermediate memories, namely, buffer memory 614 of the server interface 204, the video storage portion of the memory (e.g., DRAM 706) of the transport stream demultiplexer 704, and the video storage (e.g., DRAM 710) of the MPEG video decoder 708. The storage algorithm is such that the receipt of a pre-roll cue tone by the cue tone DTMF decoder 726 causes: (1) the memory (e.g., DRAM 710) of the MPEG video decoder 708 to be fully loaded first; (2) next, the video storage portion of the memory (e.g., DRAM 706) of the transport stream demultiplexer 704 is fully loaded, but only after the memory (e.g., DRAM 710) of the MPEG video decoder 708 is fully loaded; and (3) buffer memory 614 of the server interface unit 204 is fully loaded, but only after the memory (e.g., DRAM 706) of the transport stream demultiplexer 704 is fully loaded. With this algorithm, the data needed to generate the analog version of the encoded video is distributed within the first configuration of the system of the present invention 200 to optimize local analog video generation in a timely manner (e.g., for immediate substitution of a local advertisement in a national video signal during a scheduled break interval, as will be described in more detail below).

As outlined earlier, a normal MPEG-2 transport stream is emitted with the presumption that downstream circuitry is arranged to handle the transport stream without loss of incoming data bits. As just described, it is possible, during a pre-roll interval, to fill all intermediate memories before any of the data is required to generate the analog video signal. Thus, assuming a drift in the consumption (i.e., conversion) of the MPEG-2 encoded data, a back-flow control mechanism to control the MPEG-2 transport stream is necessary to ensure that no data bits from the transport stream are lost. One embodiment of the back-flow algorithm may be characterized as follows. The transport stream demultiplexer 704 and the MPEG video decoder 708 use a hardware handshake to determine when the memory of the MPEG video decoder 708 is full. The channel test and flow control processor 734 monitors the storage of the transport stream demultiplexer 704 to determine when its storage is full, which impliedly means that the storage of MPEG video decoder 708 is also full. When the transport stream demultiplexer 704 can no longer accept data for storage, the channel test and flow control processor 734 conveys this information to the transfer processor 608 of the server interface unit 204 via the STATUS line 815 of the compressed data bus 224 of the second communications means 225, the compressed data bus controller 612, and the bus 602. In response, the transfer processor 608 inhibits the transfer of data to the transport stream demultiplexer 704, via the compressed data bus controller 612, the data bus 805 of the compressed data bus 224 of the second communications means 225 and the FIFO 702. As a result, the queue of the buffer memory 614 corresponding to the particular distribution network interface unit 206 begins to fill, and once full to a pre-determined level, the data transport controller 604 informs the local media server 202, using the SCSI-2 protocol, that data transport controller 604 cannot accept another MPEG-2 transport stream destined for the particular distribution network interface unit 206. In response, the local media server 202 stops (or slows the rate of) the transmission of transport streams to server interface unit 204 for the given distribution network interface unit 206. Then, the local media server 202, for example, performs "round-robin" polling of other distribution network interface units 206 for servicing. Upon returning to the server interface unit 204 (which previously blocked a transport stream in this example), the local media server 202 will again attempt to transmit the same transport stream that was rejected earlier. This stream may be accepted if the intermediate buffers have room for more data, or the stream may again be rejected. The local media server 202 continues its "round-robin" processing.

As mentioned, the STATUS line 815 of the compressed data bus 224 of the second communications means 225 is used to carry back-flow information from distribution network interface units 206 to an associated server interface unit 204. In one embodiment, the STATUS lead is divided into 16 time-multiplexed slots—two (2) for each of the eight (8) distribution network interface units 206 associated with each server interface unit 204. One of the two slots is used for a back-channel flow control bit; for instance, a "0" bit would indicate that the transport stream demultiplexer 704 can accept a transport data stream, whereas a "1" bit would indicate that the storage of transport stream demultiplexer 704 is full. The other one of the two slots, in one embodiment, is used to signal the system processor 610 of the server interface 204 that the distribution network interface unit 206 needs servicing, that is, this other slot carries an interrupt request. The communication which occurs over the STATUS lead 815 is asynchronous with respect to any data being transmitted over the data leads of compressed data bus 805 of the compressed data bus 224. That is, either or both the flow control and interrupt request can occur independently in time relative to the transmitted data.

Continuing with the video processing portion of FIG. 7a, the video decoder 708 decompresses the video signal in MPEG-2 format to form a decompressed digital video signal, which serves as one input, via multiplexer 712, to video encoder 714 (e.g., a SAA7185A Video Encoder manufactured by Phillips Semiconductors). A second input to video encoder 714 is illustratively a 27 MHz clock signal from Genlock controller 722; the origin of the 27 MHz clock will discussed in more detail shortly. With this clock signal, video encoder 714 encodes the incoming digital video signal in a transmission format such as a NTSC or PAL composite video signal, and thus converts the digital signal to an analog video signal. The analog video signal is filtered by filter 716 and applied to one input to video switch 718.

For the illustrative embodiment depicted in FIG. 7a, the cascade arrangement of MPEG video decoder 708 followed by video encoder 714 is required so as to convert from one standard (e.g., MPEG-2, VIDEO CYPHER-2, etc.) to another standard (NTSC composite). This conversion can be understood from a consideration of what information is provided by each MPEG-2 elementary stream and what format is necessary for transmission of the video to the television receiver of the local viewer. The NTSC composite signal is composed of a video signal having, for example, the R, G, B color component information. Broadly, the NTSC encoding process is defined as the process of converting the R, G, B color components (or the Y, U, V equivalents) available individually into a composite video signal for transmission over a single wire. The MPEG video decoder 708, on the other hand, delivers the equivalent of the R, G, B components as three individual components Y, U, V as time-multiplexed signals appearing serially onto a single byte-wide bus. Thus, MPEG video decoder 708 and NTSC video encoder 714 complement each other to effect the necessary conversion from the MPEG-2 standard to the NTSC (or PAL) composite signal standard.

The analog video signal 250 from an associated one of the integrated receiver/decoders 210 is supplied to an auto gain control and black level clamp circuit 724, which accomplishes two functions, namely it: (1) provides automatic gain control to restore the signal strength of the incoming network feed signal to a pre-determined value if the incoming signal has become attenuated; and (2) shifts the level of the gain-controlled network video signal as needed to ensure that the "back porch" of the video signal is properly set at zero volts. As is well-known in the art, the "back porch" of a video signal is the interval of a video waveform between the end of the horizontal synch pulse and the beginning of the active video information. The clamped video signal is provided as a second input to the analog video switch 718.

The analog video signal output by the video encoder 714 is synchronized with the network signal 250 as follows. Genlock controller 722 recovers the original timing control signals (such as horizontal synch, vertical synch, and color subcarrier) from the gain-controlled network television signal. The output of Genlock controller 722 is illustratively a 27 MHz clock and vertical and horizontal timing signals in horizontal and vertical synchronization and in-phase with the network feed signal 250. Genlock controller 722 supplies these timing and synchronization signals to the video encoder 714. Thus, the combined decoding and NTSC encoding operations performed by the cascade of MPEG video decoder 708 and video encoder 714 are performed according to the clock generated by Genlock controller 722 rather than a clock which is embedded in the MPEG-2 data stream. By using the clock recovered from the network television signal 250 to perform MPEG decoding and NTSC encoding, synchronization between the national video source and the reconstructed video signal from the MPEG-2 data stream may be achieved, thereby precluding vertical roll and other problems which might otherwise occur as a result of switching between the national feed and the converted MPEG-2 data stream.

Figure 7B:
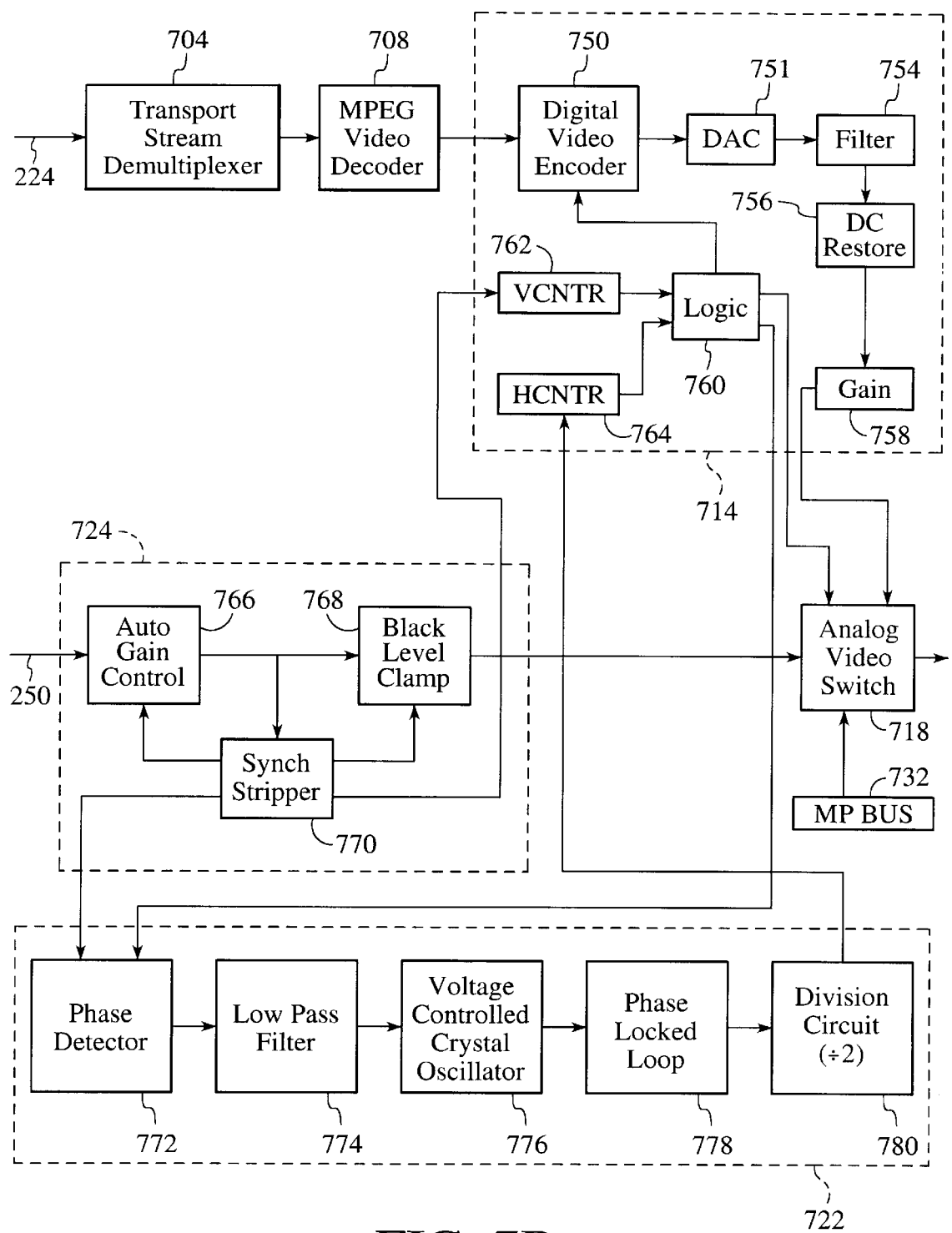
FIG. 7b is a block diagram showing the details of video processing circuitry used by the distribution network interface unit.

FIG. 7b is a more detailed block diagram of the forward digital data and signal flow for the video processing portion of a distribution network interface unit 206. The video portion of the national video signal 250 is provided as an input to automatic gain control (AGC) circuit 766 so as to compensate, if necessary, for any signal loss during transmission. The gain-controlled video signal produced by the AGC circuit 766 is supplied to "black level" clamp circuit 768 to fix the black level of the national video signal at the reference level of zero volts. The clamped output of black level clamp circuit 768 is provided as one input to the analog video switch 718. The gain controlled video signal from AGC circuit 766 is also provided as an input to synch stripper circuit 770, which generates synchronization information, including horizontal synchronization information, provided to phase detector 772, and vertical synchronization information, provided to vertical sync counter 762. The synch stripper circuit 770 also develops a control voltage proportional to the amplitude of the output of AGC circuit 766. The control voltage is fed back, as a negative feedback signal, to AGC circuit 766 to adjust the gain as needed to restore the network video signal to a given amplitude at the input to a conventional receiver. Lastly, the synch stripper circuit 770 also supplies a "back porch" timing signal to the "black level" clamp circuit 768. The "back porch" timing signal indicates when the "back porch" of the national video signal occurs so the black level may be clamped.

In one illustrative embodiment of Genlock controller 722, the horizontal synch signal from the sync stripper circuit 770 is supplied to phase detector 772 which feeds low-pass filter 774. The output of the low-pass filter 774 serves as the input to voltage controlled crystal oscillator (VCXO) 776, which is set to run, in the preferred embodiment, at 27 MHz±25 ppm. The output of VCXO 776 is supplied to 54 MHz phase-locked loop (PLL) circuit 778, and the output of PLL circuit 778 is then divided in half by division circuit 780 to produce an output signal of 27 MHz having a 50% duty cycle. As is standard in the art, a 50% duty cycle is required by certain integrated circuits for proper signal processing. The PLL circuit 778 and the division circuit 780 may be realized, illustratively, by a MC88915 device manufactured by Motorola.

The phase detector 772 compares the frequency and phase of the horizontal synchronization information from the sync stripper circuit 770 with the frequency and phase of a regenerated horizontal synchronization signal produced by logic 760 internal to the video encoder 714 (as described in more detail shortly), and generates an output control voltage based on the comparison. This control voltage is filtered by the low-pass filter 774, and then the output of the low-pass filter 774 is used to adjust the phase and frequency of the VCXO 776 so the regenerated timing signal at the input to phase detector 772 has the same phase and frequency as the national video feed signal. The output by logic 760 is used to encode the decompressed digital video information into, for example, the NTSC composite signal format. The phase detector 772 also generates a "lock-detect" signal (not shown ) whenever the compared phases are substantially identical, and supplies this "lock-detect" signal to the microprocessor 728 over bus 732 to control signal processing by the microprocessor 728.

The 27 MHz signal from Genlock controller 722 is supplied as a clock signal to horizontal counter (Hcntr) circuit 764 of video encoder 714. In addition, the vertical synchronization information from synch stripper circuit 770 is supplied to vertical counter (Vcntr) circuit 762. Finally, the decompressed digital video information from MPEG video decoder 708 is supplied to video encoder 714. In particular, the compressed data formats arriving at the transport stream demultiplexer 704 over the data lines 805 of the compressed data bus 224 of the second communications means 225, are MPEG-1 and MPEG-2 elementary streams which are packetized and layered in an MPEG-2 transport stream. The video decoder 708 decodes Main Level/Main Profile streams at up to 15 Mbps for each distribution network interface unit 206. Horizontal resolutions include up to 720 pixels per line and are sample-rate converted to CCIR601 resolution for presentation to the video encoder 714 to generate, for example, a composite analog NTSC signal.

The vertical synchronization information provided to vertical counter 762 is used to reset vertical counter 762 once per field (or once per frame, depending upon the desired format). The 27 MHz information supplied to horizontal counter 764 increments horizontal counter 764 each clock cycle until the counter reaches a value, for the NTSC format, of 1715 (that is, 1716 counts—this value may be modified as necessary for other formats such as PAL), whereupon the horizontal counter 764 is reset to zero. Each time horizontal counter 764 is reset, the vertical counter 762 is simultaneously incremented by one to start a new video display line. The vertical counter 762 is reset after one full frame of 525 lines (that is, the vertical counter 762 counts from 0 to 524).

The outputs of the vertical and horizontal counters 762 and 764 are supplied to logic circuit 760. The logic circuit 760 also generates the conventional composite synchronization and the color subcarrier signals. The composite synchronization and color subcarrier signals are then supplied, along with the decompressed digital video information from MPEG video decoder 708, to digital video encoder circuit 750, which is the element of video encoder 714 to actually effect the conventional digital encoding for NTSC transmission. The NTSC-encoded digital information is then converted to analog information via digital-to-analog (D/A) converter 752, which generates an analog video signal representative of the incoming MPEG-2 data stream having substantially the same vertical synch as the network video feed signal. Filter 754 is a low-pass analog filter which smoothes the staircase characteristic of the signal from D/A converter 752. The filtered analog video signal is then applied to DC restore circuit 756 to clamp the black-level to zero volts. The clamped analog signal is then applied to gain circuit 758 which is adjusted to zero out amplitude and offset errors caused by variations in nominal characteristics of video encoder 714. The output of gain circuit 758 is applied as a second video input to the analog video switch 718. It is also noted, as alluded to above, that logic circuit 760 is that part of video encoder 714 which provides re-generated horizontal synchronization information to the phase detector 772 for comparison to the horizontal information produced by synch stripper circuit 770.

The analog video switch 718 receives a control signal from the microprocessor 728 (See FIG. 7a) via bus 732, in response to a given cue tone, so that the output from the analog video switch 718 is either the clamped, gain-controlled national analog video feed or the decompressed and converted video signal supplied by the local media server 202—both the video feed and video signal have the same phase and vertical and horizontal synchronization signals by virtue of the overall processing effected by the distribution network interface unit 206.

Preferably, the actual switch over between the national video feed and the video signal generated from the local media server 202 occurs during the vertical blanking interval (VBI) of the national video feed. The VBI is a time period during which the television picture scanning beam is "blanked" so that it may be returned from the bottom of the television screen to the top of the screen without being visible to the viewer. To ensure that the switching operation occurs during the VBI for both switching from and back to the national video feed, the national video feed is monitored at all times by Genlock controller 722, including during transmission of the MPEG-derived signal. Preferably, logic circuit 760 generates and provides such vertical timing information to the analog video switch 718 such that the switch over is enabled only during the VBI.

The audio processing is effected in a similar, although less complicated, manner as the video processing. Referring back to FIG. 7a the MPEG audio decoder 738 receives the audio information, decompresses and converts the audio information to a digitized audio signal and, in turn, converts the digitized audio signal to a reproduced audio signal via a standard digital-to-analog converter 742. The reproduced audio signal provides a first input to the analog audio switch 744. A second input to the analog audio switch 744 is provided by the national signal 250 provided by the integrated receiver/decoder 210 associated with the particular distribution network interface unit 206. The decompression and conversion of the digital audio information are performed under control of Genlock controller 722, which effects a stable clock signal (e.g., 27 MHz), as based on the timing information provided by video source 250. The 27 MHz clock controls the rate at which the decompressed incoming digital audio signal is decompressed, and controls the rate at which the decompressed digital information is converted to analog audio information.

More specifically, the transport demultiplexer 704 delivers compressed data signals Lc and Rc, which are representative of the left channel and right channel audio signals, respectively, of the file output by the local media server 202. The compressed data signals are input to an audio decompressor 738, which includes an internal counter (not shown). The re-generated 27 MHz clock signal serves as another input to audio decompressor 738 and, in particular, is used to control the incrementing of the internal counter. The internal counter may be loaded with an initial value as described in more detail shortly.

The outputs of audio decompressor 738, designated Ld and Rd for left and right digital signals, respectively, are the decompressed counterparts of Lc and Rc; Ld and Rd serve as inputs to dual-channel D/A converter 742. The outputs of converter 742 are the left and right analog signals La and Ra (i.e., the reconstructed analog audio signals corresponding to the compressed digital data signals Lc and Rc, respectively). The left and right analog signals La and Ra are provided as inputs to the analog audio switch 744. Two other inputs to analog audio switch 744 are the left and right (L and R) audio signals provided by the national network feed signal 250. Analogous to the video processing described above, analog audio switch 744 is switched, under control of the microprocessor 728 via bus 732, from the national network feed to the ad insertion path and vice versa based upon the detection of the pre-roll cue tone signal, wherein such switching occurs at such instants to avoid video roll in downstream or customer TVs tuned to the TV channel under consideration.

The MPEG audio decoder is, illustratively, device CS4920A supplied by the Crystal Corporation; this device is an off-the-shelf device that includes the circuitry necessary to properly decompress audio digital data, synchronize the audio to the video (called AV synch), and effect digital-to-analog conversion. Similar circuitry may be used to process secondary audio program compressed data provided by the secondary audio compressed data interface 736.

To synchronize the audio portion and the video portion (AV synch) of the decoded audio and video data from the file provided by the local server 202, the video and audio processing paths are coupled in the following manner. With reference to FIG. 7a, it is recalled that the video portion of the file is provided to the MPEG video decoder 708, and the audio portion of the file is provided to audio decoder 738; the video and audio portions arrive via an MPEG-2 transport stream which has interleaved video and audio packetized elementary data streams that are stored in separate areas in memory of the transport demultiplexer 704. In normal MPEG-2 operation, the headers 2308 of the packetized data streams have embedded timing information—called presentation time stamps (PTSs) 2310 which are placed periodically into the video and audio streams by the encoding operation using an encoder clock which drives the encoding processing. Moreover, in MPEG-2 operation, the transport headers 2114 have overall timing information—called program clock regenerators (PCRs) 2222 which are placed periodically into the transport stream 2112 so as to enable the regeneration of a clock signal at a decoder which can be used to drive the decoding process. Accordingly, by comparing the PTS from a video or audio stream with the clock derived from the PCRs, a reconstructed video frame and corresponding audio signal can be emitted, in synchronism, from the decoders.

As elaborated on in the foregoing material for the present invention, the 27 MHz decoding clock for video and audio processing is derived from the incoming national feed signal. Moreover, the instant in time at which ad insertion is to occur is controlled, not by the PCRs of the MPEG-2 stream in conjunction with the PTS of the packetized elementary streams, but by a counting down (by microprocessor 728) from the cue tone based upon the given pre-roll time. Since the first video frame is, by the storage algorithm presented above, already stored in MPEG video decoder 708, the PTS of the first video frame is known. According to the operation of the present invention, at the instant that the first video frame is switched through encoder 714 to switch 718, the PTS of the first video frame is loaded into the counter of the audio decoder 738, and the counter increments under control of the 27 MHz clock. The PTSs of the incoming audio elementary stream are then compared to the contents of the counter, and when any PTS is equal to the counter's contents, the audio compressor activates to convert Lc and Rc to La and Ra, respectively, to achieve audio/video synch.

Secondary audio programming (or "SAP") data, such as compressed audio in Spanish for example, is provided to the MPEG audio decoder 738. The SAP signal is also delivered as a packetized elementary stream, but in contrast to the video and audio compressed data, SAP signal is provided via an indirect path which includes: storage initially in memory of the transport stream demultiplexer 704; retrieval of the compressed data from the storage of the transport stream demultiplexer 704 under control of the microprocessor 728 via bus 732; and delivery of the compressed data, as the SAP signal, to the audio decoder 738 via secondary audio compressed data interface 736. In the same manner as described above, the PTSs on the incoming SAP signals are used to enable audio/video synch for the SAP path, that is, the PTSs are used to convert compressed SAP to decompressed SAP and, in turn, to convert decompressed SAP to analog SAP. This analog SAP signal is also provided to analog audio switch 744 which switches between it and secondary audio program data of the network feed signal 250. Thus, the analog audio switch 744 delivers, in parallel, either the national feed signals L-R-SAP or the signals La-Ra-SAPa derived from the file of the local media server 202.

§4.5 LOCAL SERVER

The local media server 202 preferably includes, inter alia, a data bus 1002, an address bus 1004, a processor(s) 1006, a mass storage device(s) 1008, a program storage 1010, and appropriate input/output ports 1012. In an illustrative embodiment of the initial configuration of the present invention, the local media server 202 is a Silicon Graphics Challange DM or Challange S server.

The processor(s) 1006 should have adequate processing speed to process packets of MPEG-2 data, perform timing and control functions, perform rate adjustment functions, respond to control signals, and perform administrative and maintenance functions. Such processor(s) may include 100 MHz R4600 and/or 150 MHz R440 CPUs, for example.

The local media server 202 should also include an adequate amount of memory to store audio, video, and private application data files and to store instruction sets for execution by the processor(s) 1006. Such memory may include 32 MBytes to 2 GBytes of RAM 1010.

The mass storage devices 1008 may include a farm of magnetic or optical disks or other mass-storage media, and will be sufficient to store scheduling information, files of compressed media and private data.

The system bus 1002 of the local media server 202 should have adequate throughput for the contemplated applications, e.g., 267 MBytes per second to 1.2 GBytes per second bandwidth. The address bus 1004 must be adequate to address the memory 1010.

The input/output ports 1012 of the local media server 202 should be adequate for accepting packetized data, for transmitting a transport stream of the packetized data, for accepting scheduling files and media files, and for accepting and providing appropriate control and indicator signals. In one illustrative embodiment, at least a SCSI-2 fast and wide interface, and an Ethernet interface are supported. The local media server 202 should also be capable of supporting other communications protocols such as FDDI ("Fibre Distributed Data Interface"), RS232, and ATM/OC-3 ("Asynchronous Transfer Mode/Optical Carrier-3) for example.

The particular procedures carried out by the processor(s) 1006 of the local media server 202 will be described along with the description of the particular applications supported by the system of the present invention.

§4.6 REMOTE SERVER

Like the local media server 202, the remote server 222 will also include a system bus including a data bus and an address bus, a processor(s), mass storage device(s), program storage, and input/output ports. However, the remote server 222 is contemplated as having a much larger mass storage area. Moreover, the high level or remote media server will preferably communicate with one or more local media servers 202 via a communications network, such as the public switched telephone network (PSTN) 220, or via a private communications network. Accordingly, the input/output ports should support very high bandwidth communications, supporting protocols such as ATM, SONET, etc. Moreover, the programs carried out by the processor(s) of the remote media server 222 will differ from those carried out by the processor(s) 1006 of the local media server(s) 202. The processes carried out by the processor(s) of the remote media server 222 will be described along with the description of the particular applications supported by the system of the present invention.

§5. DETAILED OPERATION

Figure 11:
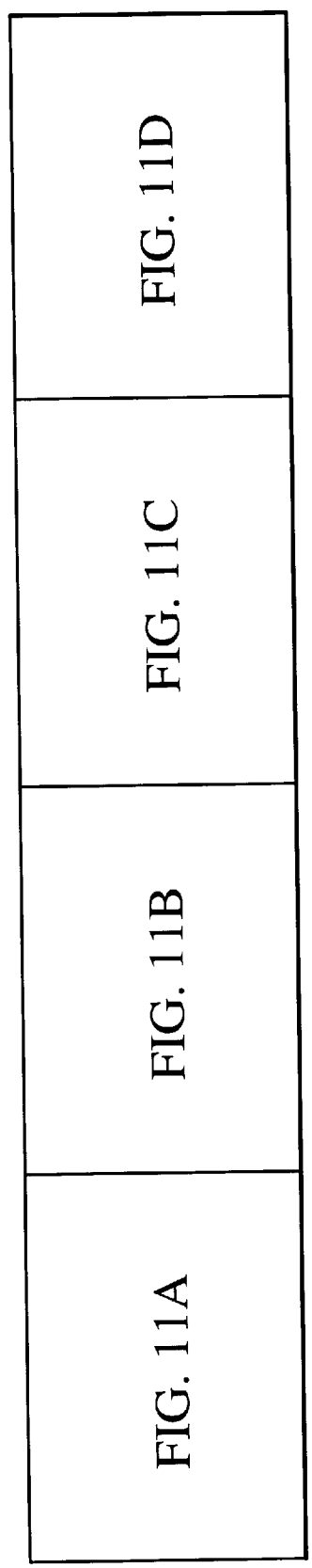
FIG. 11, which consists of FIGS. 11a through 11d, is a process diagram of the ad insertion, compositing, and near-video-on-demand functionality supported by the initial configuration of the system of the present invention as shown in FIG. 2.
Figure 11A:
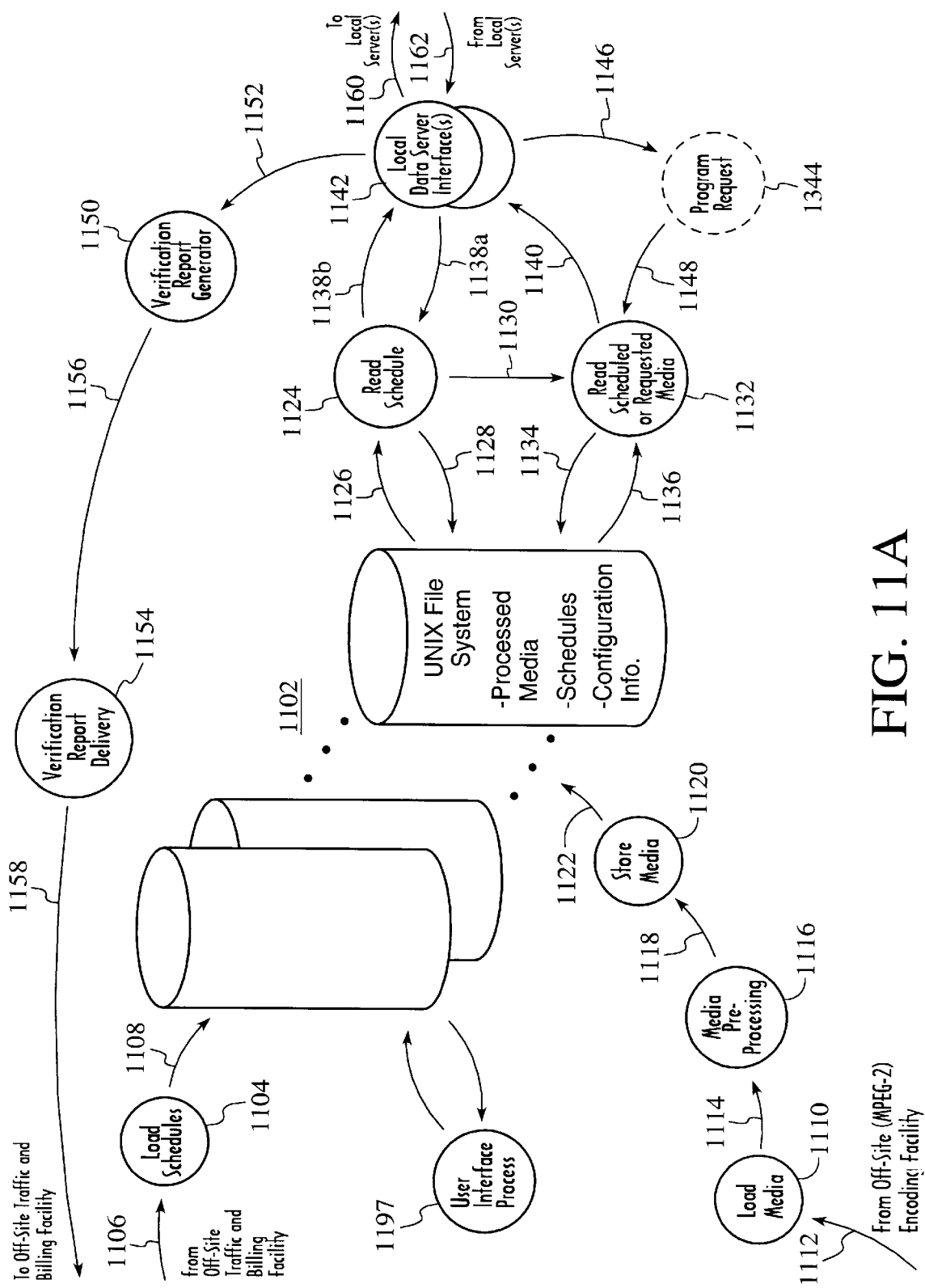
Figure 11B:
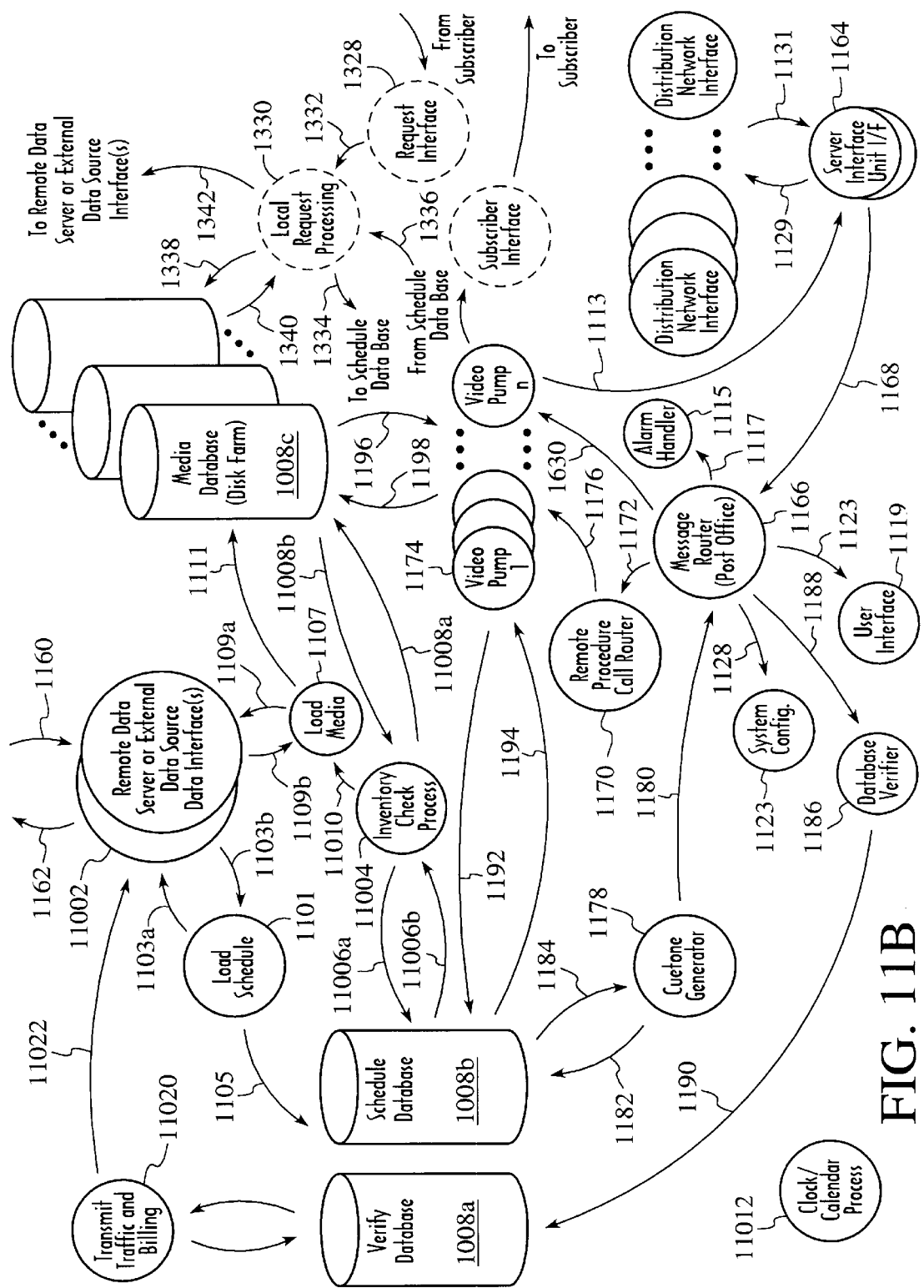
Figure 11C:
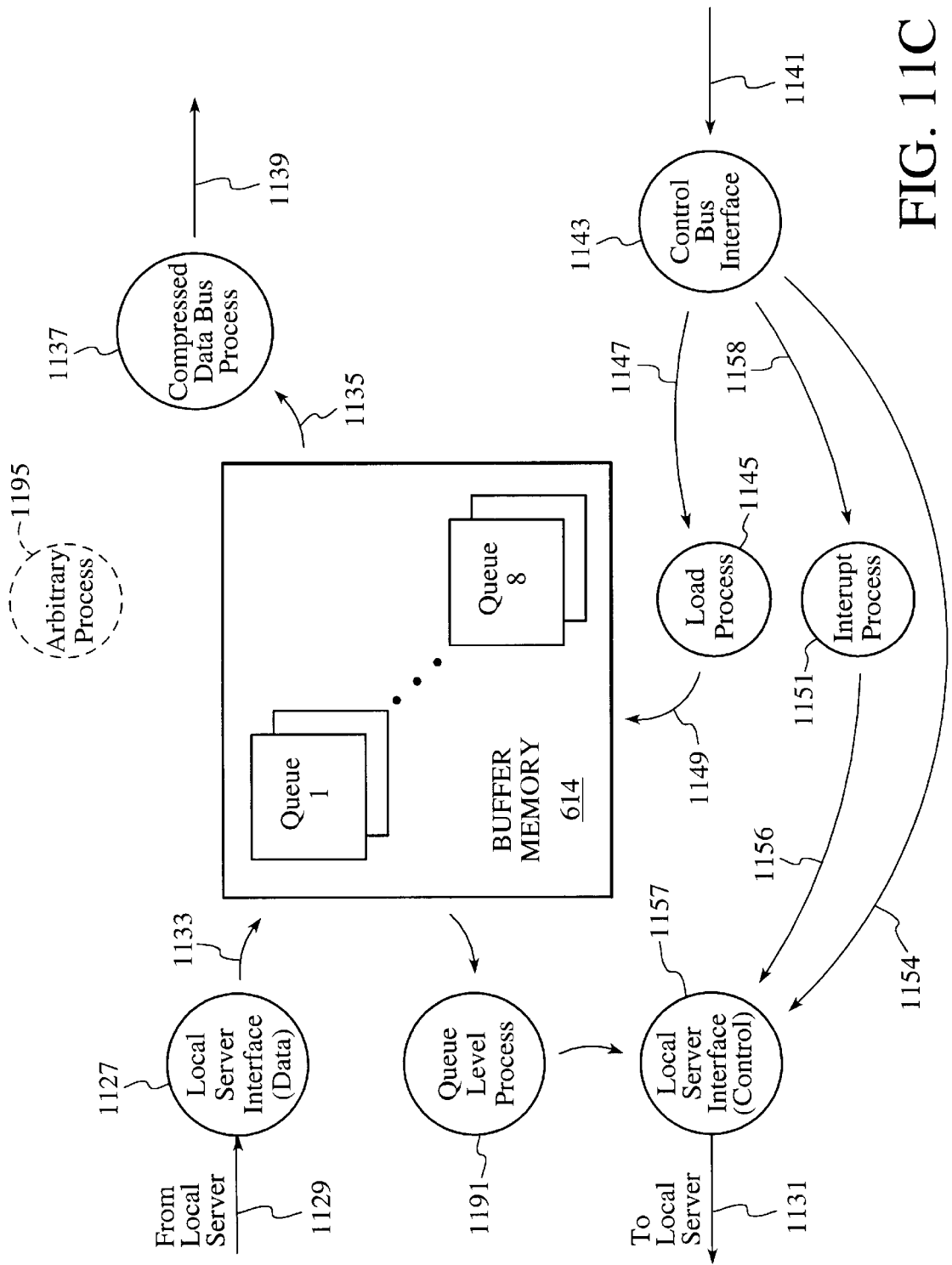
Figure 11D:
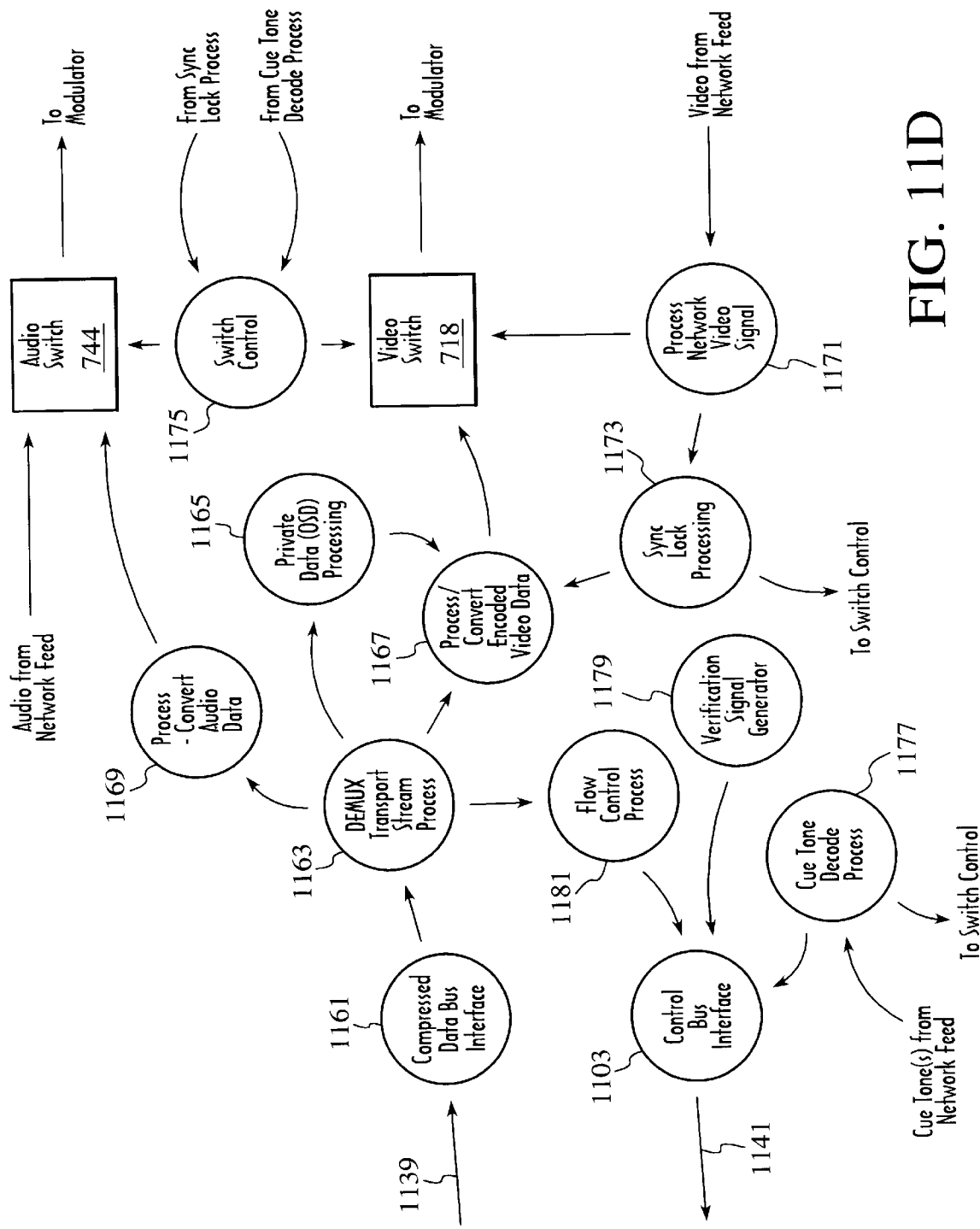

FIG. 11, which includes FIGS. 11*a* through 11*d*, is a diagram of data flow between processes throughout the initial configuration of the system of the present invention. More specifically, FIG. 11*a* depicts the flow of data between processes within the remote media server 222, FIG. 11*b* depicts the flow of data between processes within the local media server 202, FIG. 11*c* depicts the flow of data between processes within a server interface 204, and FIG. 11*d* depicts the flow of data between processes within one of the distribution network interface units 206 assigned to the server interface 204. In FIGS. 11*a* and 11*b*, the TCP/IP protocol may be used for logical connections in inter-process communications. The operations of the initial configuration of the system of the present invention when facilitating ad insertion, video compositing, and near video-on-demand functions are discussed below.

§5.1 DETAILS OF AD INSERTION OPERATION

As discussed above with reference to FIG. 3, the initial configuration of the system of the present invention can support ad insertion functions. To reiterate, when performing ad insertion, the system should permit either of (a) national video programming, or (b) local video programming, to be selectively applied to the analog distribution network. The local video programming may be stored as compressed (e.g., MPEG-2, CYPHER-2, etc. encoded) video streams. The local video programming may be comprised of a "break" including one or more commercial advertisements (or "spots").

Figure 29:
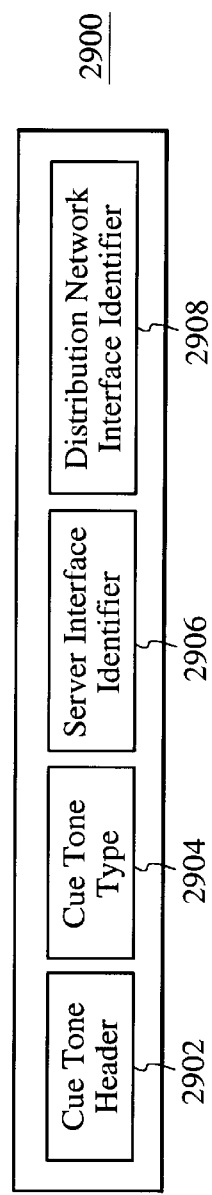
FIG. 29 illustrates an exemplary data structure for carrying decoded cue tone information in the system of the present invention.

As discussed above with reference to FIG. 3, a distribution network interface unit 206 receives a channel of a network feed from an associated integrated receiver/decoder 210 for example. Each channel of the network feed will include cue tones. As shown in FIG. 11*d*, a cue tone decode process 1177, carried out by the cue tone DTMF decoder 726, bus 732, and microprocessor 728 for example, decodes received cue tone(s), formats it with a distribution network interface unit 206 identifier (and optionally, a server interface unit 204 identifier), and provides it to a control bus interface process 1183. The cue tone decode process 1177 may also determine whether the cue tone (e.g., consisting of DTMF_VALUE_1, DTMF_VALUE_2, DTMF_$_{VALUE\_}$ 3, DTMF_$_{VALUE\_}$4) is valid. That is, each distribution network interface unit 206 may be associated with a channel having a unique valid cue tone (e.g., CNN's valid cue tone may be: 1#5*). More specifically, referring to FIG. 7*a*, a cue tone dual tone multi-frequency (or "DTMF") decoder 726 decodes the cue tone and provides the decoded cue tone information to the microprocessor 728 via bus 732. The control bus interface process 1183, which may be carried out by the microprocessor 728, formats the cue tone information and puts it on the data bus 950 of the control bus 226. FIG. 29 illustrates an exemplary format for the decoded cue tone information packet 2900. As shown, the decoded cue tone information packet 2900 includes a cue tone header field 2902, a cue tone type field 2904, a server interface unit identifier field 2906, and a distribution network interface unit identifier field 2908. The cue tone header field 2902 includes a bit sequence which identifies the packet 2900. The cue tone type field 2904 identifies the cue tone as (a) a pre-roll cue tone, (b) a transfer-to-ad cue tone, or (c) a return cue tone. The cue tone ($16^4$) value may also be provided. The server interface unit ID field 2906 and the distribution network interface unit ID field 2908 permit the channel receiving the cue tone to be uniquely identified.

As discussed above with reference to FIG. 3, the distribution network interface unit 206 communicates the decoded cue tone information to the local server 202. More specifically, as shown in FIG. 11c, at the server interface unit 204, a control bus interface processes 1143, as carried out by the control bus controller 616 for example, receives the decoded cue tone information from the data bus 950 of the control bus 226 and provides the decoded cue tone information the local server (control) interface process 1157, which is carried out by the system processor 610 for example. More specifically, the system processor 610 reads data from the control bus controller 616 via the bus 602. If not already provided at the distribution network interface unit 206, the server interface unit 204 adds the server interface identifier value 2906 to the cue one packet 2900. The local server (control) interface process 1157, as carried out by the system processor 610, then formats the decoded cue tone information, in accordance with the TCP/IP protocol for example, and provides it on the Ethernet line 232.

Figure 30:
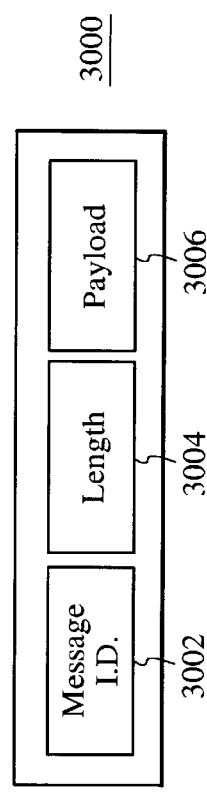
FIG. 30 illustrates an exemplary data structure for carrying control information in the system of the present invention.

As shown in FIG. 30, the TCP (Transmission Control Protocol) packet 3000 used in the system of the present invention includes a message ID field 3002, a length field 3004, and a payload 3006. The message ID field 3002 is used by the message router process 1166 at the local media server 202 to route the payload 3006 to an appropriate process. Use of the message ID field 3002 may eliminate the need for the cue tone header field 2902 discussed above.

As discussed above with reference to FIG. 3, upon receipt of the cue tone packet 2900, the local media server 202 checks a resident schedule database, using the time and the channel corresponding to the distribution network interface unit 206 to look up and retrieve the filename(s) or number(s) of file(s) of compressed video data in the schedule database, to determine an appropriate file of compressed media data. More specifically, as shown in FIG. 11b, one of the server interface unit interface processes 1164, as carried out by one of the input/output ports 1012 for example, receives the TCP/IP formatted decoded cue tone information and provides it, via path 1168 (e.g., via the data bus 1002 of the local media server 202), to a message router process 1166. The message router process 1166 may be carried out by one of the processor(s) 1006 for example. The message router process 1166 recognizes the cue tone packet 2900 based on the cue tone header field 2902 (or based on the message ID field 3002 of the TCP/IP packet 3000) and invokes an appropriate one of the video pump processes 1174, via a remote procedure call router process 1170.

Figure 14:
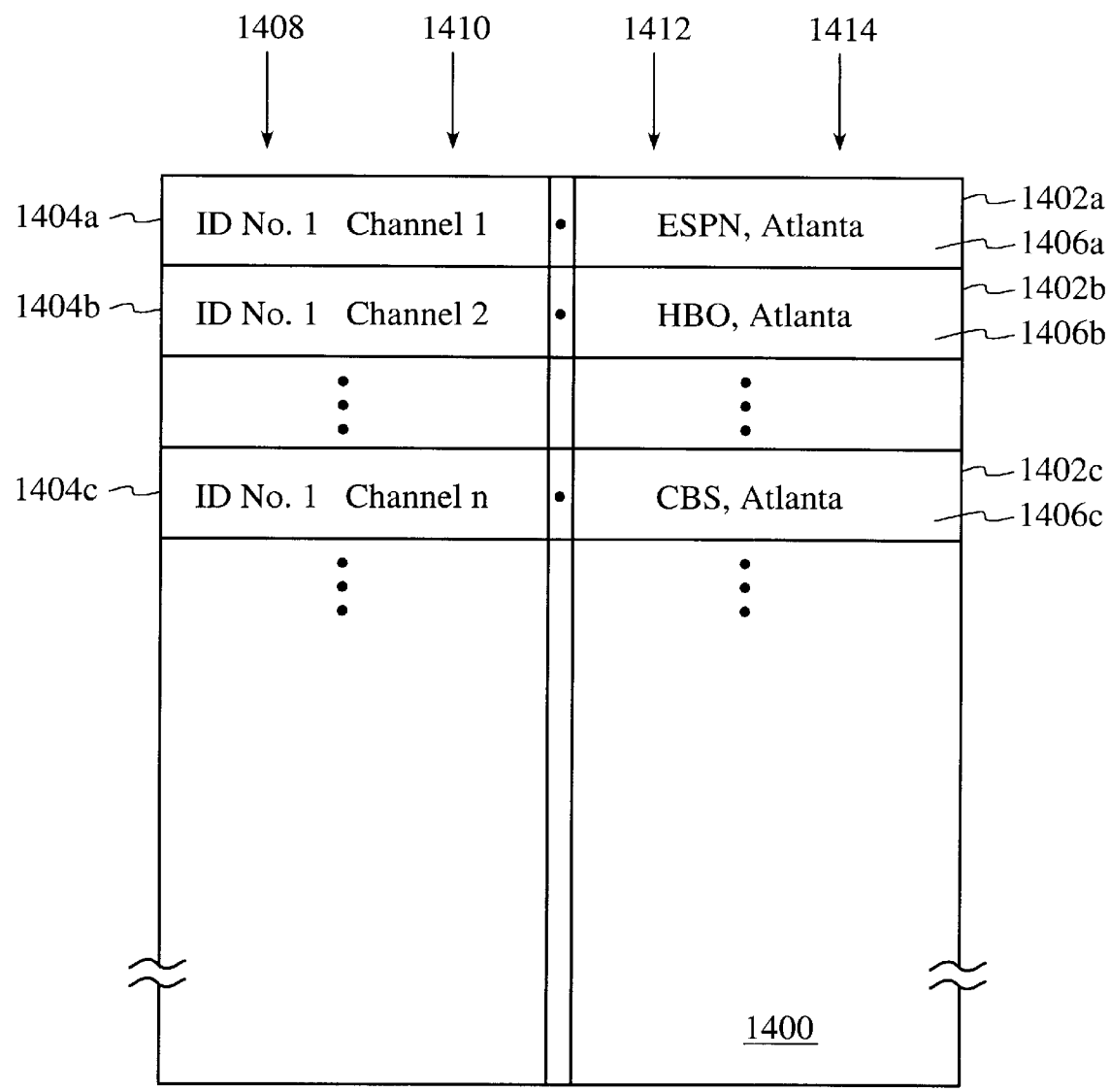
FIG. 14 is a look-up table used by the system of the present invention to determine "network" and "zone" information.

The remote procedure call router process 1170 uses a pre-stored network configuration look-up table (see FIG. 14) to select an appropriate one of the video pump processes 1174. The remote procedure call process 1170 converts the cue tone information (e.g., a cue tone ID) and the channel number associated with the particular server interface unit 204 and distribution network interface card 206 from which the decode cue tone information was sent, to network and zone information. More specifically, as shown in FIG. 14, the network configuration lookup table 1400 includes multiple records 1402, each record 1402 including an input 1404 which points to an associated output 1406. Each input 1404 includes an ID number 1408 and a channel number 1410 and each associated output 1406 includes network information (e.g., ESPN, HBO, or CBS, etc.) 1412 and zone information (e.g., Atlanta, Decatur, Alpharetta, etc.). In the illustrative embodiment of the present invention, a plurality of video pump processes 1174 are provided such that each distribution network interface card 206 supported by the local media server 202 has an associated video pump process 1174.

Figure 16:
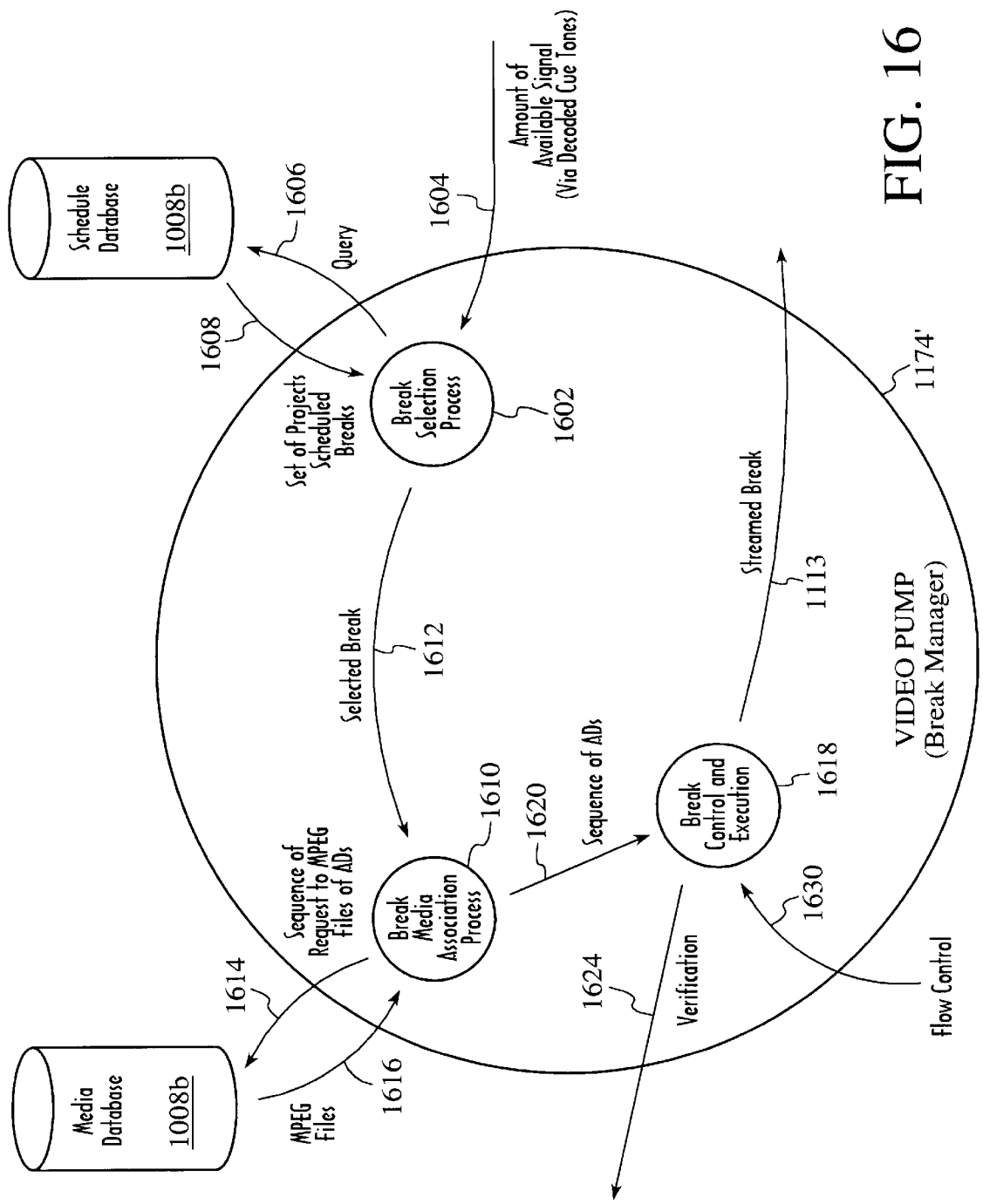
FIG. 16 is a process diagram illustrating data flow in a break management process used in an ad-insertion operation carried out by the system of the present invention.

As shown in FIG. 11b, the video pump process 1174 prepares a query including the time, the network, and the zone and sends the query to the schedule database 1008b via path 1192. A play list, which includes a set of eligible scheduled "breaks" is returned. As shown in more detail in FIG. 16, the video pump process 1174' used to support ad insertion includes a break selection process 1602 which queries the schedule database 1008b, via path 1606 (e.g., via data and address buses 1002 and 1004), and receives a playlist (i.e., a set of eligible scheduled breaks), via path 1608 (e.g., via data bus 1002), from the schedule database 1008b.

The operation of the break selection process 1602 is now described. First, however, some terms should be defined. As used below, an "ad" is programming material, such as audio and video data forming a commercial advertisement. A "local avail" is a temporal location, within a national broadcast, indicated by a cue tone in the national broadcast, which is available for the insertion of a local ad. A "spot" is a temporal position filled by ads. A "break" is an ordered list of spots, each of the spots having scheduled start and stop times, and each of the breaks being defined by a window having a start time and a stop time. Ads are sold to play in a network local avail in a particular geographical zone. Basically, the ad insertion system implemented by the initial configuration of the present invention packages ads into breaks, and temporally matches the breaks to local avails. When a local avail is indicated by a cue tone in the network broadcast, the system identifies the appropriate break and broadcasts the ads in lieu of the network programming.

For each decoded cue tone, the set of eligible breaks may include breaks: (i) with a break window covering the current time; (ii) which have not been played; (iii) whose network ID matches the cue tone network ID; (iv) associated with the cue tone ad insertion zone; and (v) whose cue tone signature matches the decoded cue tone.

Figure 18:
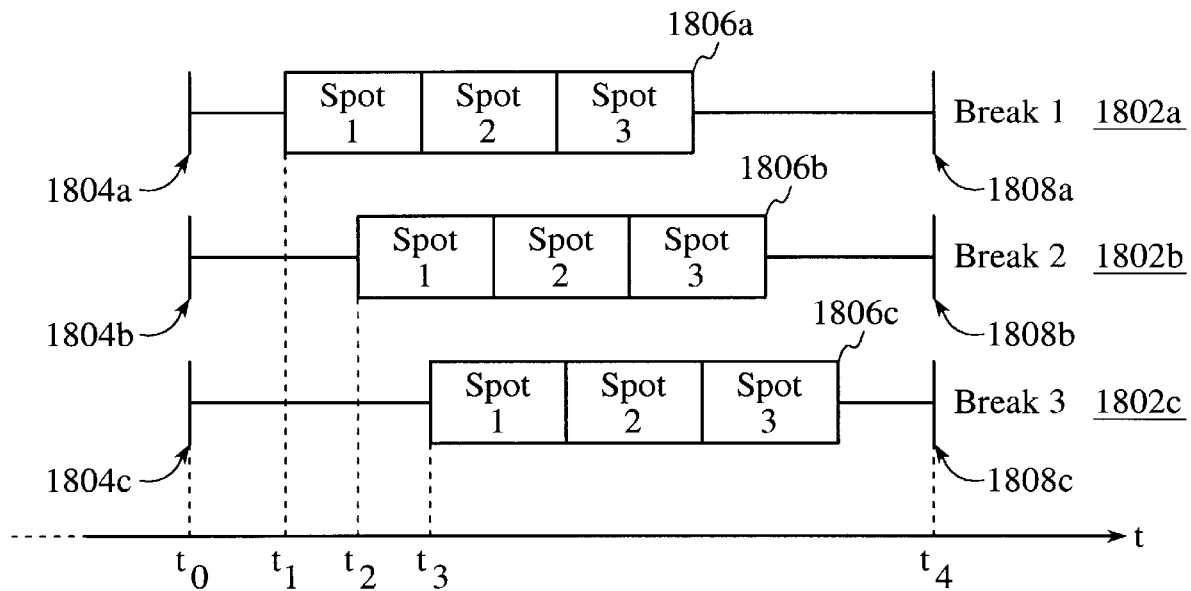
FIG. 18 illustrates the fact that multiple scheduled advertising breaks may have the same window parameters.
Figure 19:
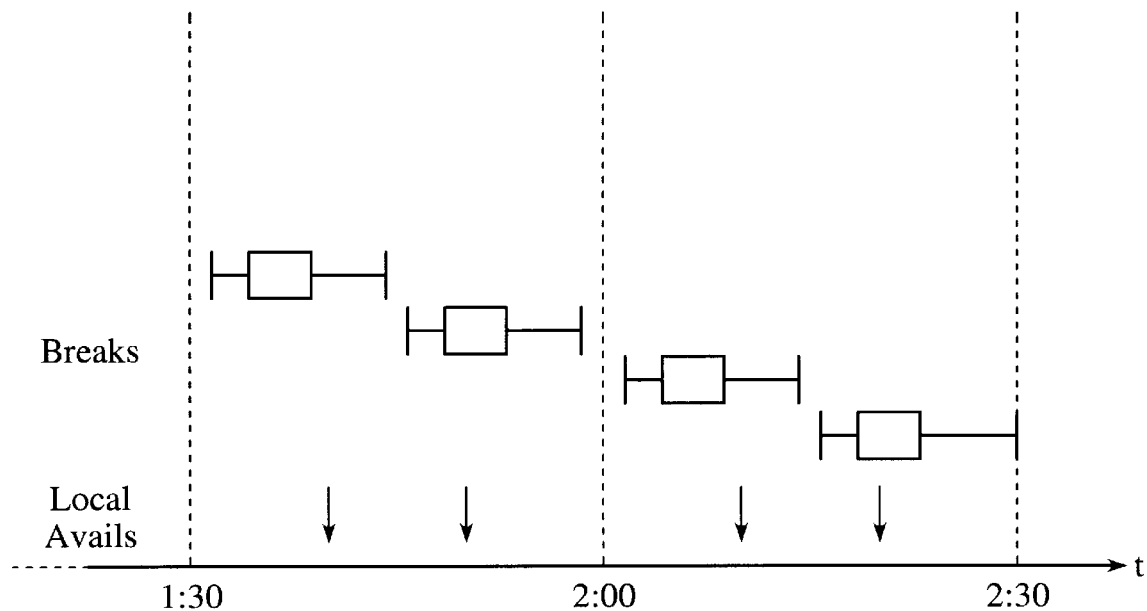
FIG. 19 illustrates a nominal advertising break schedule.

As shown in FIG. 18, multiple breaks 1802 may have the same window parameters (i.e., the same window start times 1804 and stop times 1808). When break windows overlap, individual breaks are distinguished and ordered by the scheduled start time of the first spot 1806 of the break 1802. For example, if the local avail occurs between $t_0$ and $t_4$, break 1 1802a would be selected by the break selection process 1602 because the start time of the first spot of that break is the earliest. A break-remains "active" even if its scheduled start has passed, as long as its scheduled end has not yet passed. Thus, a break may play outside of its window, but cannot start outside of its window. The break selection process 1602 selects the break with the closest fit (i.e., first by scheduled start time, and then by closest fit by scheduled duration of the spots). Once it is played, a break become ineligible for re-playing. FIG. 19 illustrates a nominal break schedule for a one hour show.

Figure 20A:
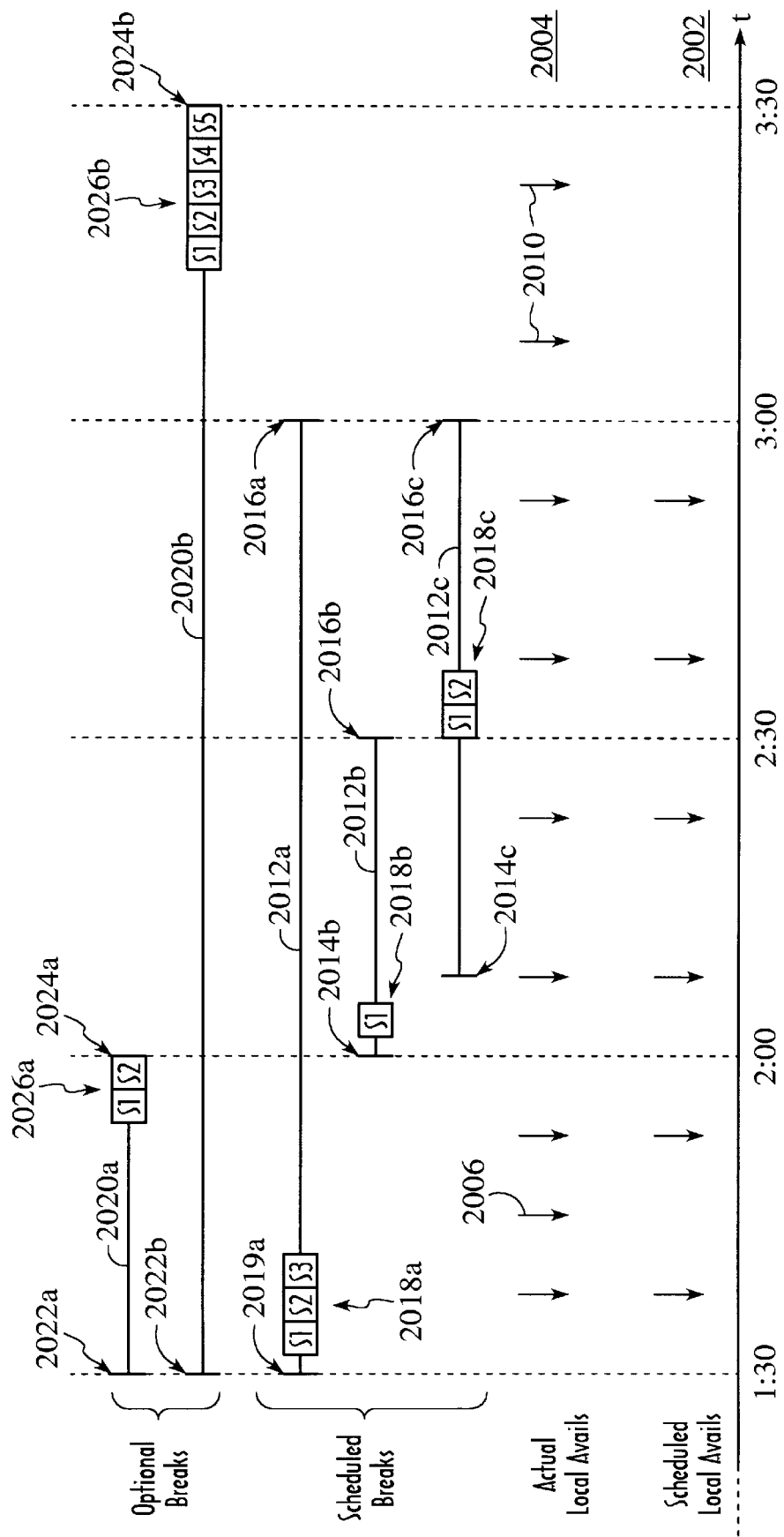
FIGS. 20a and 20b illustrate alternative ways to schedule advertising breaks during a sporting event.

In live events, such as a sporting event for example, the number, duration, and times of local avails may widely vary. For example, there may be more actual avails than scheduled avails due to injury time outs or other delays, or due to the even running longer than scheduled. FIG. 20a illustrates a sporting event scheduled to start at 1:30, end at 3:00, and have an average of two (2) local avails each half-hour for a total of six (6) scheduled avails 2002. Each of the scheduled breaks 2012a through 2012c is defined by a window start time 2014, a window end time 2016, and includes one or more spots 2018. Optional breaks 2020a and 2020b are also provided, each being defined by a window start time 2022 and a window end time 2024 and having one or more spots 2026. As shown in FIG. 20a, the spots 2018 of the scheduled breaks 2012 start towards the beginning of their windows while the spots 2026 of the optional breaks 2020 start towards the end of their windows. Thus, if a local avail occurs within both the window of a scheduled break 2012 and an optional break 2020, the break selection process 1602 will select the scheduled break 2012 (if it has not already been run) before the optional break 2020. For example, during the first actual local avail, the scheduled break 2012a will be played. However, during the second, unexpected, local avail 2006, the optional break 2020a will be played. If the sporting event runs over its expected time, the spots 2026b of optional break 2020b my be played during local avails 2010. While the optional break window 2020b extends the overall window for the sporting event by 30 minutes, care must be exercised such that the overall window is not extended too far. Otherwise, such a window would overlap the following program if the sporting event were to end on time. Thus, the optional spots should include ads that would be acceptable in either the current program event, or in the next program event.

Figure 15:
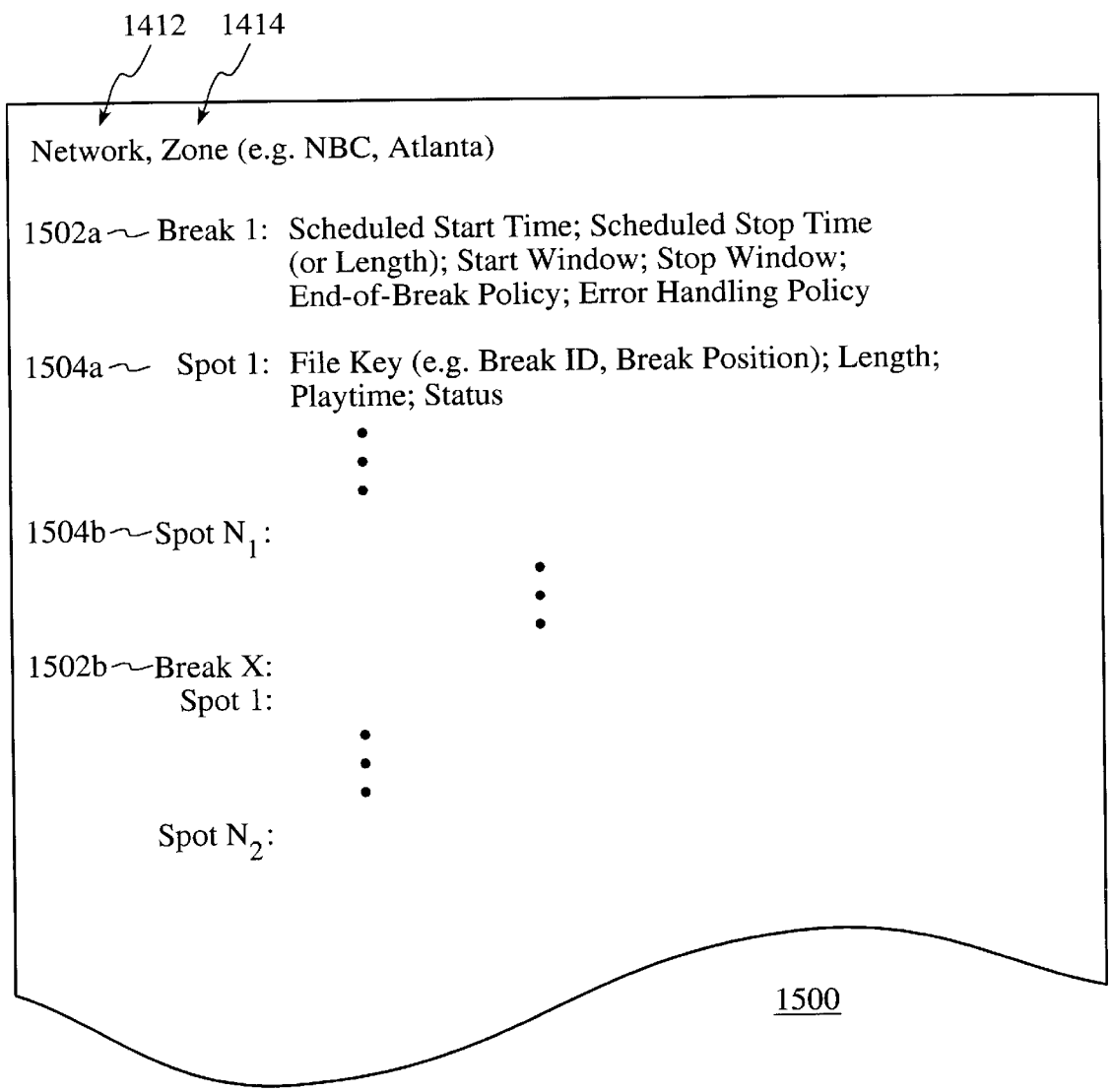
FIG. 15 illustrates the format of a scheduling record used by the system of the present invention.

FIG. 15 is an illustrative file of eligible break records 1502 returned from the schedule database 1008b. As shown in FIG. 15, the file includes the network 1412 (e.g., NBC) and zone 1414 (e.g., Atlanta) information used to query the schedule database 1008. As shown in FIG. 15, each break 1502 includes a number of associated spots 1504. As discussed above, each break record 1502 will include a scheduled start time, a scheduled stop time (or length), a start window, and a stop window. In addition, each illustrative break record 1502 may include an end-of-break policy field and an error handling policy field.

The end-of-break policy field instructs the switch control process 1175 when to switch from the local ad, back to the national broadcast. For example, if the national broadcast issues a stop cue tone, that stop cue tone may either (a) be honored by switching back to the national broadcast or (b) ignored. Moreover, if the end of the spots extend beyond the stop time of the break, the national broadcast is switched to either (a) at the end of the scheduled stop, or (b) at the end of the spots. In one embodiment of the present invention, the end-of-break policy is handled on a network (e.g., CNN, ESPN) basis rather than on a break by break basis. That is, all breaks associated with a particular network will have the same end-of-break policy.

The error handling policy field provides play policies in the event of an error, the principle error being an ad not available error. For example, the video pump 1174' may either (a) play filler content, or (b) delete the spot from the break and move the following spots up. As is further shown in FIG. 15, each spot 1504 will include a unique file key (or spot key), a temporal length field, a playtime field, and a status (e.g., played/not played) field. If filler is played in place of the spot, the file name is changed. Alternatively, the file key may be changed to indicate that filler, not the spot itself, was played.

Figure 22:
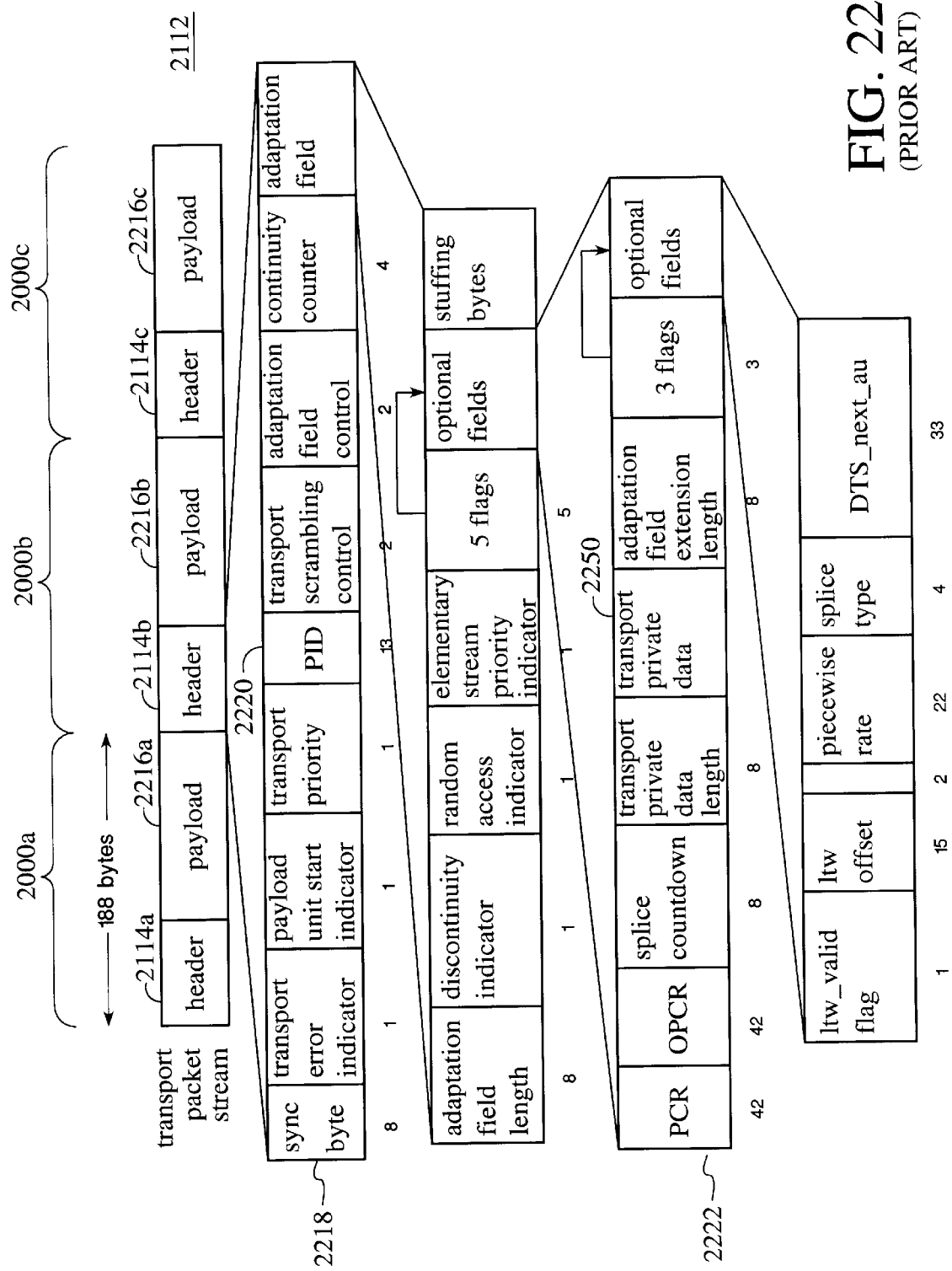
FIG. 22 depicts the format of an MPEG-2 transport stream.
Figure 23:
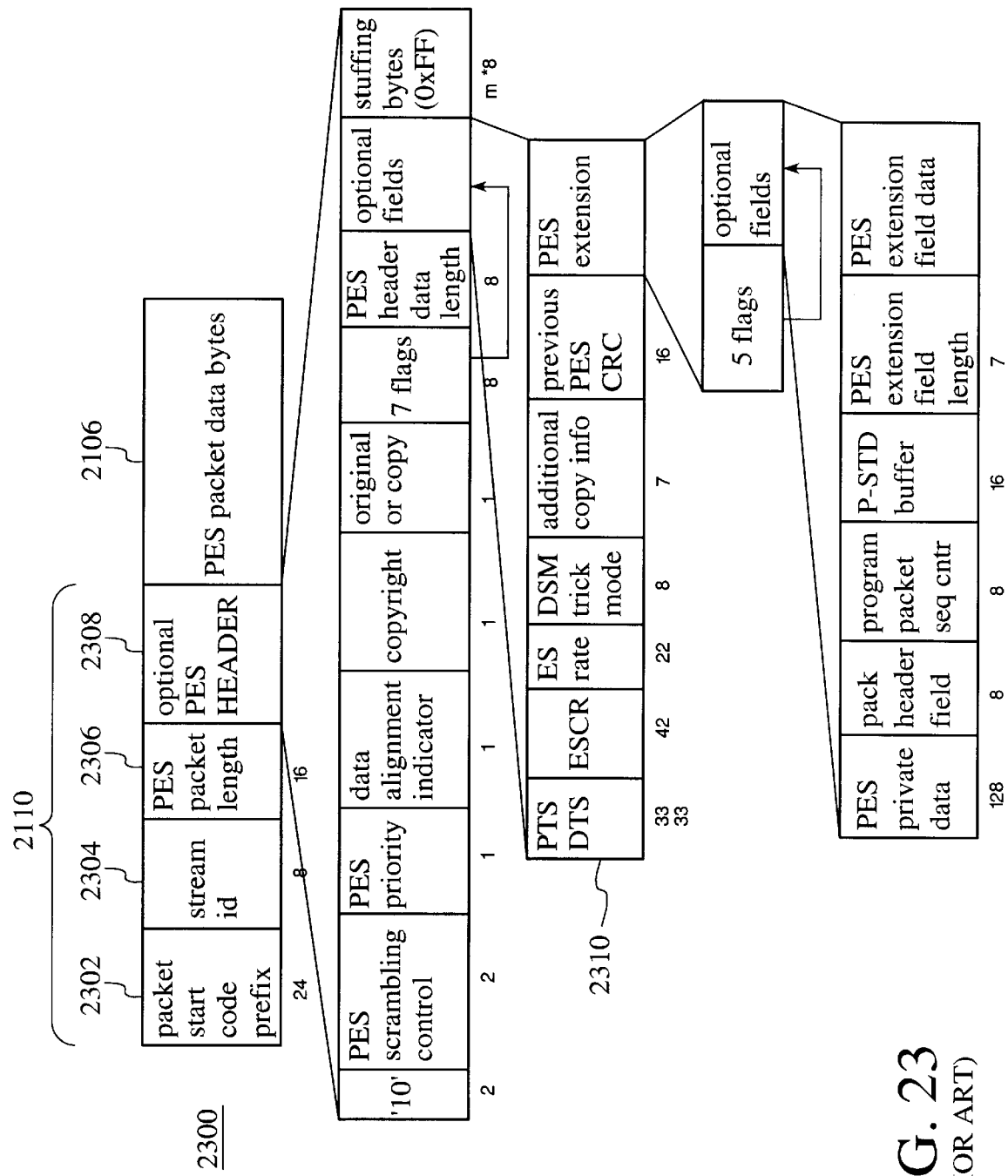
FIG. 23 depicts the format of an MPEG-2 PES packet.
Figure 24:
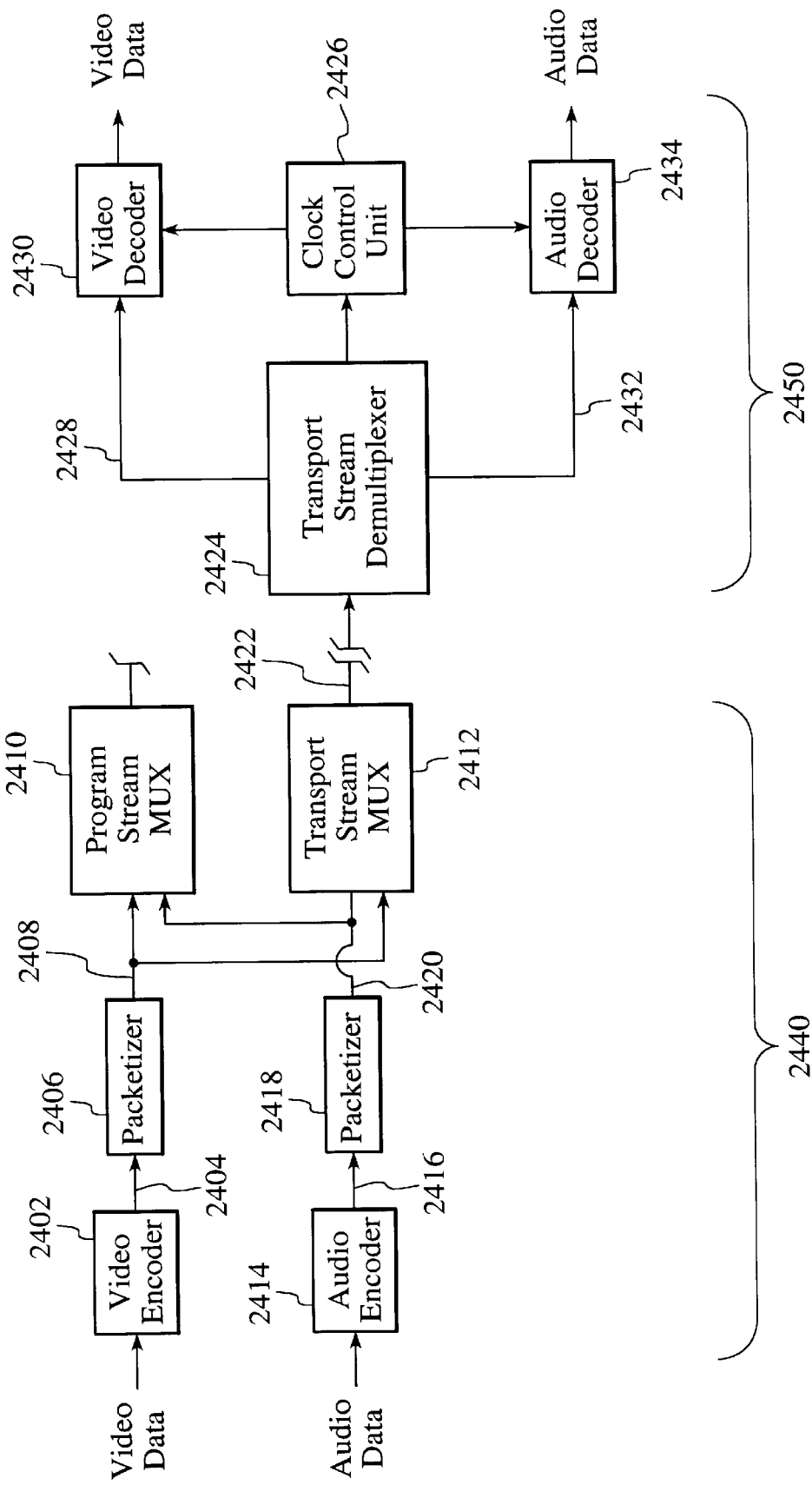
FIG. 24 depicts a system, contemplated by the MPEG-2 standard, for encoding, transmitting, and decoding audio and video data.

Once the break selection process 1602 selects one of the eligible breaks, it provides the selected break, via path 1612, to a break media association process 1610. The break media association process uses the file key(s) or spot key(s) of the spot(s) 1504 of the selected break 1502 to issue a sequence of queries, via path 1614, to the media database 1008c. In response, the media database will return, via path 1616, a sequence of MPEG-2 encoded files of audio and video data corresponding to the sequence of ads playing in the sequence of spots 1504 of the selected break. This sequence of MPEG-2 encoded files is provided, via path 1620, to a break control and execution process 1618. The break control and execution process 1618 formats the files of MPEG-2 encoded audio and video data (See e.g., the program elementary streams of FIG. 23) into an MPEG-2 transport stream (See e.g., FIG. 22) and provides the resulting MPEG-2 transport stream, via path 1113, to an appropriate one of the server interface unit interface processes 1164 (carried out, for example, by one of the input/output ports 1012 of the local media server 202).

The rate at which the break control and execution process 1618 of the video pump 1174' provides the data is based on flow control information. As shown in FIG. 11b, this flow control information, which is received from the server interface unit 204 as discussed below, is forwarded to the video pump 1174' via one of the server interface unit interface processes 1164 and message router process 1166.

Figure 20B:
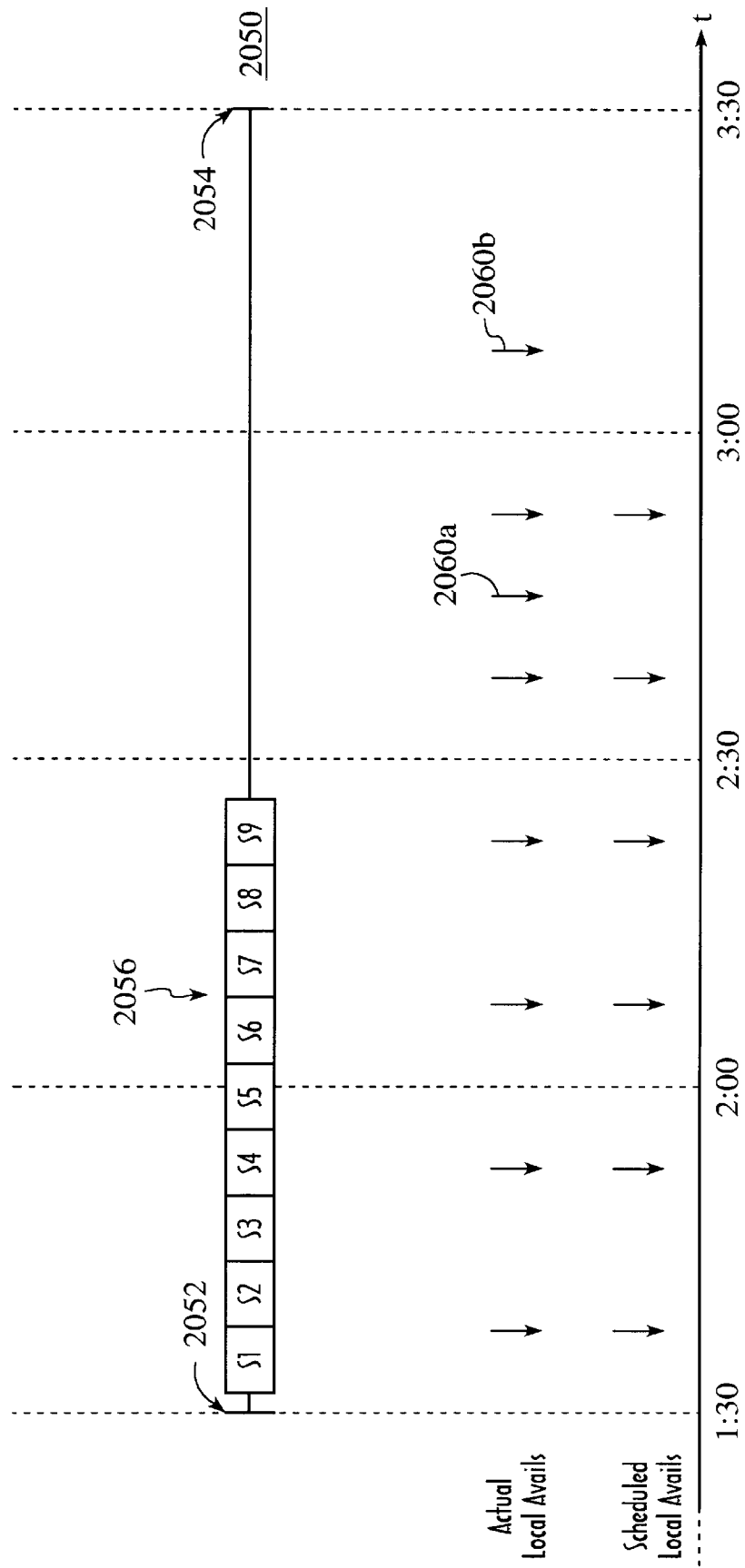
Figure 21:
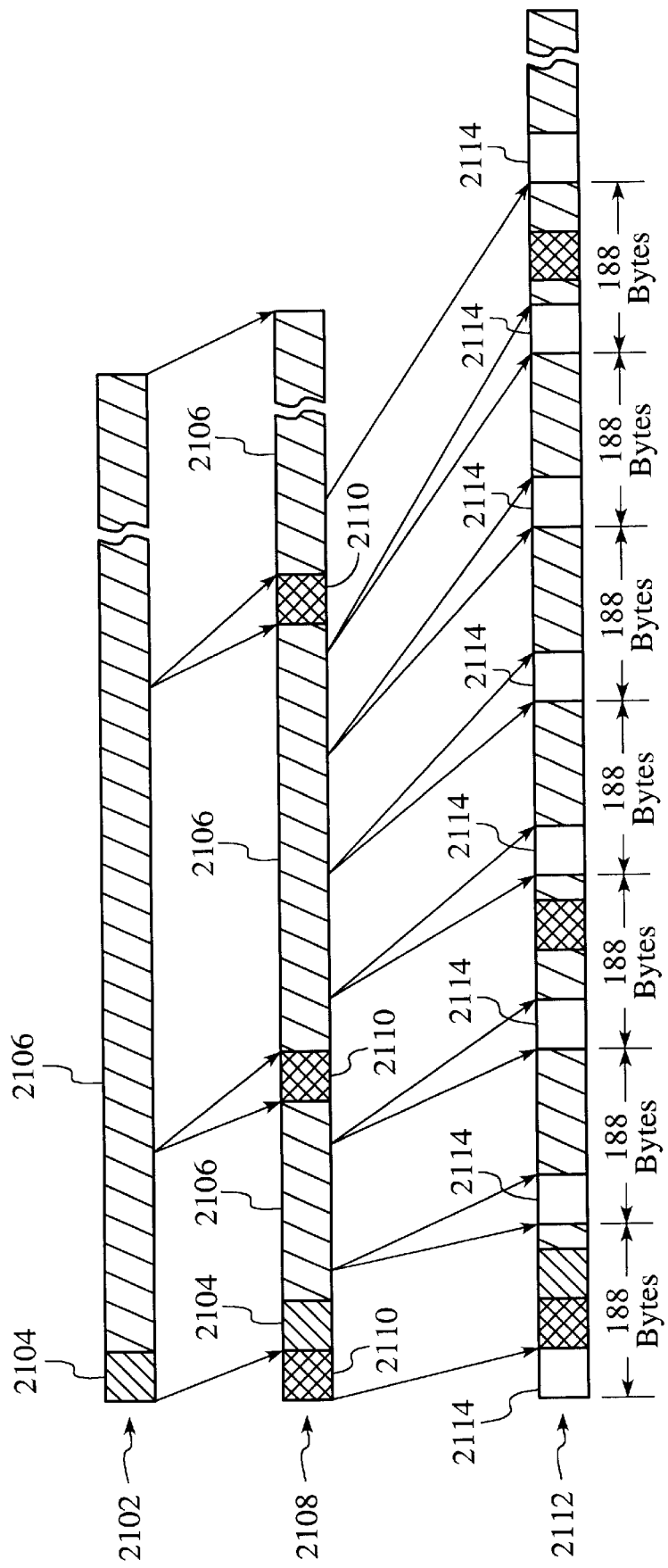
FIG. 21 depicts various levels of packetizing data in accordance with the MPEG-2 standard.

In an alternative, simplified version of the present invention, the video pump process 1174 does not include a separate break selection process 1602 and break media association process 1610. Rather, a query to the schedule database 1008b is formed based on the network, zone, and time. In response, only one break, having a sequence of spots (or filenames) is returned. For example, as shown in FIG. 20b, a live event may be provided with a single window 2050 which starts at time 2052 and ends at time 2054. In this case, the sequence of spots S1 through S9 2056 are simply played in order. A sufficient number of spots are provided such that spots are available in instances of unscheduled local avails 2060. The end 2054 of the window 2050 may extend beyond the scheduled end of the live event so that the break window 2050 covers the possibility of time overruns.

Figure 17A:
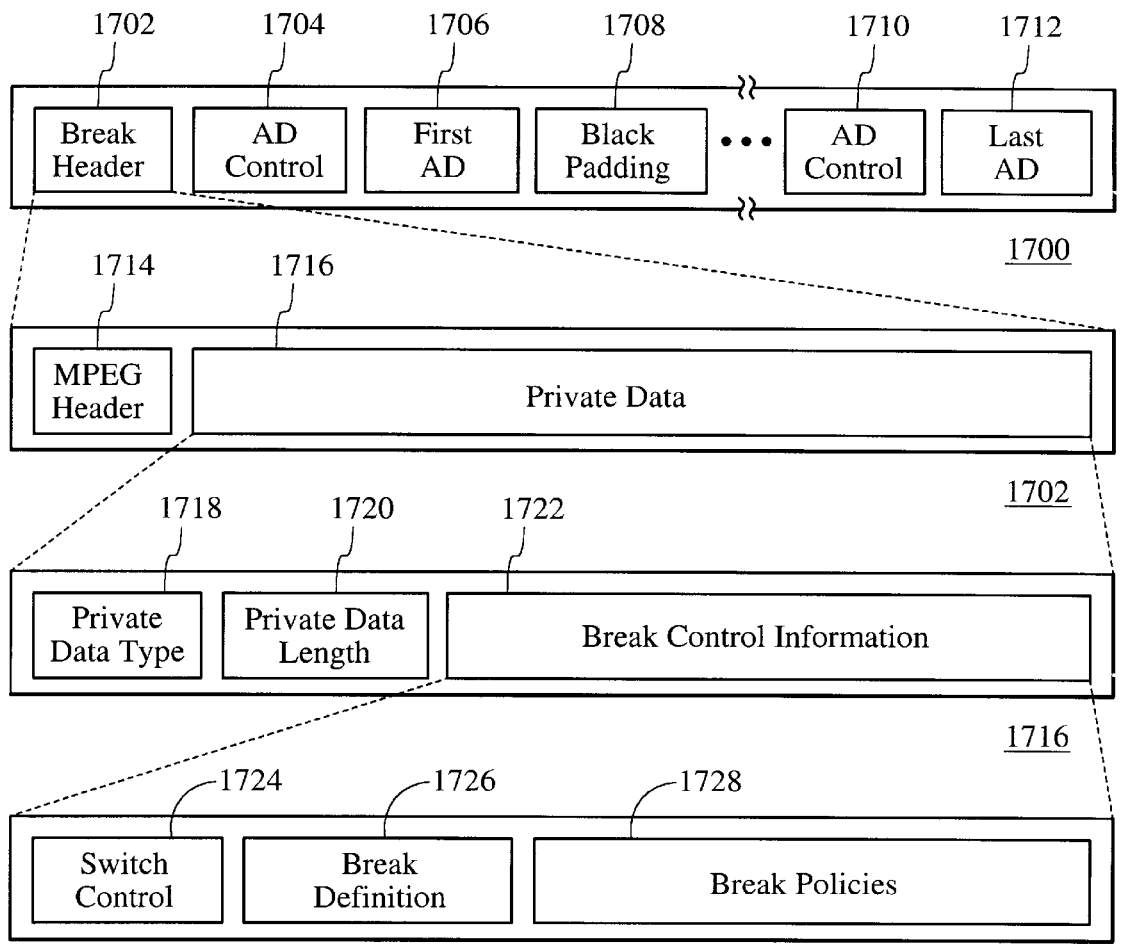
FIGS. 17a and 17b illustrate alternative data structures used to communicate advertising break data in the system of the present invention.
Figure 17B:
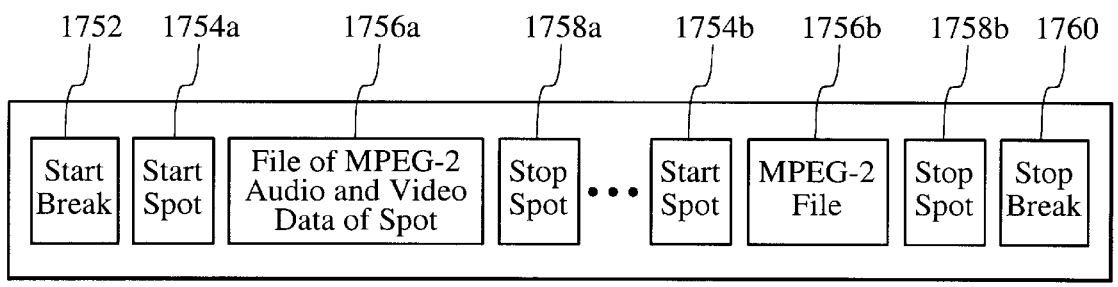

In the exemplary embodiment, the server interface unit interface process 1164 formats the data in accordance with the SCSI-2 fast and wide protocol and also formats the data in accordance with either of the alternative formats illustrated in FIGS. 17a and 17b. In the first format 1700 illustrated in FIG. 17a, a break header 1702 is followed by ad control data 1704 and MPEG files 1706 for one or more ads, where black padding MPEG data 1708 is provided between adjacent ads. The ad control data 1704 resolves presentation time stamp (or PTS, see FIG. 23) discontinuities between successive ads and also provides audio leveling values. This information is used by the distribution network interface unit for which the break is destined 206. The break header 1702 includes an MPEG header 1714 (See e.g., the transport stream header 2114 in FIG. 22) followed by private data 1716. As discussed above, the packet identification (or PID) field 2220 of the MPEG header 1714 will identify the data in the payload 2216 as private data 1716.

The private data 1716 includes a private data type field 1718, a private data length field 1720, and break control information 1722. The private data type field 1718 is used to distinguish between various types of private data payloads that may be used. The private data length field 1720 indicates the number of bytes of the MPEG private data field that carry information. The break control information 1722 includes a switch control field 1724, a break definition field 1726, and a break policies field 1728. The switch control field 1724 includes a count used by the distribution network interface unit 206 for switching from the network broadcast to the local ad. The break definition field 1726 describes attributes of the break, including, but not limited to, the number of spots in the break. The break policies field 1728 includes information relating to the end-of-break and error handling policies of the break as discussed above with reference to FIG. 15.

In the second, alternative, format 1750 illustrated in FIG. 17b, a start break packet 1752 and a stop break packet 1760 bound a number of files of MPEG-2 audio and video data of a number of spots 1756, each of the MPEG-2 spot files following a start spot packet 1754 and preceding a stop spot packet 1758. The start break packet 1752 includes a bit sequence (e.g., 0x0002) which identifies it as a "start break" packet, a break ID field, and a break length field.

The break length field is important because it limits the stream decoded and output by a distribution network interface unit 206 in the event of certain errors. For example, suppose a 30 second spot is to be sent during a break. However, suppose that the video pump process 1174 improperly receives a 90 minute movie. The video pump process 1174 is "dumb"—it will stream whatever it receives. If the end-of-break policy is to ignore stop cue tone, or if a stop cue tone is not provided on the national video feed, the distribution network interface unit 206 would continue to output the decoded video. The break length packet is used by the microprocessor 728 to command the analog audio and video switches 718 and 744 to switch back to the network feed.

The stop break packet 1760 includes a bit sequence (e.g., 0x0003) which identifies it as a "stop break" packet, and a break ID field. Each of the start spot packets 1754 includes a bit sequence (e.g., 0x0004) which identifies it as a "start spot" packet, and a spot key which, as discussed above, uniquely identifies the spot within the system of the present invention. Similarly, each of the stop spot packets 1758 includes a bit sequence (e.g., 0x0005) which identifies it as a "stop spot" packet, and a spot key. Each of the start break 1752, stop break 1760, start spot 1754, and stop spot 1758 packets are encapsulated in a transport stream packet 2200, the packet identification (or PID) number 2220 in the header 2114 of the transport packet 2200 indicating that the transport stream packet 2200 is a "private data" packet.

As discussed above with reference to FIG. 3, the file(s) of compressed video data are transmitted, as a transport stream of compressed video streams, to the proper server interface unit 204. More specifically, one of the server interface unit interface processes 1164 provides data, in accordance with the SCSI-2 fast and wide protocol, to the local server (data) interface process 1127, which is carried out by the data transport controller 604. The local server (data) interface process 1127, as carried out by the data transport controller 604, stores the data in queues of the buffer memory 614 via bus 602. The SCSI-2 interface protocol implemented by one of the server interface unit interface processes 1164 at the local media server 202 and the local server (data) interface process 1127 at the server interface unit 204, are implemented such that the local media server 202 is the master and server interface 204 is the slave (or initiator and target, respectively, in SCSI-2 terminology). Thus, the server interface unit interface process 1164 carried out by the one of the input/output ports 1012 of the local media server 202 communicates with local server (data) interface process 1127 carried out by the data transport controller 604 of the server interface unit 204 as if each of the server interface units 204 associated with the local media server 202 is a SCSI-2 disk. As such, each of the server interface units 204 is given an identification number (ID) as is conventional for the SCSI-2 protocol. (In another illustrative embodiment, the roles of initiator and target are reversed; the embodiment that is deployed in any given situation depends upon the particular technical requirements of the application).

To reiterate, the MPEG-2 compliant transport stream transmitted from the local media server 202 to server interface unit 204 is processed by the local server (data) interface process 1127, carried out by the data transport controller 604 (such as a NCR720 device supplied by SIMBIOS). The incoming transport stream is processed by the local server (data) interface process 1127 and passed, via path 1133 (e.g., bus 602), to the buffer memory 614. Recall that the data transport controller 604 has its own DMA channel, so transport controller 604 directly moves the incoming transport stream to the buffer memory 614. Recall also that in the initial configuration of the system of the present invention having eight (8) distribution network interface units 206, the buffer memory 614 is preferably 18 Mbytes of DRAM (such as a MB814260 device available from Fujitsu), with the 18 Mbytes being logically divided into nine 2-Mbyte blocks (also referred to as nine "buffers")—a 2 Mbyte block for each distribution network interface 206, and 2 Mbytes for storing processes for system processor 610 (e.g., a Motorola 68360 microprocessor).

Buffer memory 614 serves as intermediate storage, in that the incoming transport stream is held in 2 Mbyte queues until the data is required by the distribution network interface units 206. Accordingly, the buffer memory 614 serves to receive and divide the interleaved transport stream of incoming MPEG-2 data for delivery to the distribution network interface units 206. In this capacity, server interface unit 204 functions to "de-concentrate" the incoming data stream or, from another viewpoint, server interface unit 204 is an expander so that a plurality of distribution network interface units 206 can be handled with only one SCSI-2 interface, thereby precluding replicated hardware as would be the case if each distribution network interface unit 206 had a separate incoming data stream handled by a SCSI-2 interface device dedicated to that separate stream.

In the server interface unit 204, the compressed data bus process 1137, as carried out by compressed data bus controller 612 and transfer processor 608, communicates the file(s) of compressed media data to the distribution network interface 206. Data stored in buffer memory 614 is retrieved under control of transfer processor 608 (e.g., a Motorola 68349 microprocessor) and passed to compressed data bus controller 615, which is illustratively a field programmable gate array (such as a XC4010 available from XILINX Inc.). Transfer processor 608 has two DMA channels which facilitate moving the data from buffer memory 614 over the 32-bit data bus of interface bus 602. As carried out by the compressed data bus controller 612, the compressed data bus process 1137 places the digital data onto compressed data bus 224.

As shown in FIG. 11d, whenever a particular distribution network interface unit 604 requires data, a flow control process 1181, carried out by microprocessor 728 and/or the channel test and flow control unit 734, asserts a flow control bit via the control bus interface processes 1183 and 1143, of the distribution channel interface unit 206 and the server interface unit 204, respectively. The control bus interface process 1183 of the distribution network interface unit 206 is carried out by the microprocessor 728, bus 732, and dual port RAM 730. The control bus interface process of the server interface unit 204 is carried out by the control bus controller 616. The flow control bit is asserted to reflect the need for data which is queued in the buffer memory 614 for the particular distribution network interface unit 206. Whenever a particular channel interface controller requires servicing, the interrupt bit is asserted to reflect the need for servicing. When the interrupt and flow control bits, are received by the control bus interface process 1143 of the server interface 204, the load process 1145, as carried out by transfer processor 608, pumps data from the appropriate queue of the buffer memory 614, to the compressed data bus 224 via the compressed data bus process 1137. The compressed data bus process, carried out by the compressed data bus controller 612, converts each 32-bit data into four 8-bit data words for byte-wide serial transmission over the data line 805 of the compressed data bus 224.

Since the data and address buses comprising bus 602 are subject to being mastered by three different devices, namely, data transport controller 604, system processor 610, and transfer processor 608, an arbitration process 1195, carried out by the bus arbiter 606 (e.g., a field programmable gate array such as a Lattice 3256 ispLSL) prevents one master from dominating the other possible masters.

As shown in FIG. 11c, a queue level process 1191, which may be carried out by the transfer processor 608 and/or the system processor 610, obtains pointer values of the each of the queues of the buffer memory 614, and determines utilization levels or states (e.g., empty, full, low, high) of each of the queues. This information is provided to the local server (control) interface process 1157, carried out by the system processor 610, formatted in the TCP/IP protocol, and provided to the local media server 202 via the SCSI-2 link 230. More specifically, in response to a SCSI write by the local media server 202 (i.e., the initiator), the server interface unit 204 (i.e., the target) provides a SCSI return code. This return code will include the queue information. (Alternatively, the queue information may be provided to the local media server 202 via Ethernet link 232.)

At the local media server 202, an appropriate one of the server interface unit interface processes 1164 provides the queue level (or state) information to message router 1166 via path 1168. The message router, in turn, provides the queue level (or state) information to the break control and execution process 1618 of the video pump 1174'. An example of flow control processing is described in U.S. patent application Ser. No. 08/711,827, filed on Sep. 10, 1996, entitled "Method and Apparatus for Transmitting MPEG Data at an Adaptive Rate" and commonly assigned (which is expressly incorporated by reference herein).

Next, as discussed above with reference to FIG. 3, at the distribution network interface unit 206, the file of compressed video data is decoded and formatted in synchronization with the channel of the network feed. More specifically, as shown in FIG. 11d, a transport stream demultiplexing process 1163 is carried out by the transport stream demultiplexer 704. More specifically, based on the packet identification (or "PID") number 2220 of the header 2114 of a transport stream packet 2200, the payload data 2216 is routed to either (a) a process to process and convert audio data 1169, (b) a process to process and convert video data 1167, or (c) a process to process private application data 1165.

The process to process and convert audio data 1169 is carried out by MPEG audio decoder 738, dual volume control 740, and dual DAC 742. These elements decode the MPEG-2 encoded audio data, adjust the volume of the left and right channels, and convert the digital audio signals to analog audio signals. This process 1169 is also carried out by microprocessor 728, bus 732, and secondary audio compressed data interface 736. These elements read SAP data from the memory of the transport demultiplexer 704 (recall that the SAP data has a PID 2220 which differs from the PID 2220 associated with MPEG-2 encoded audio data) and decode it.

The process to process and convert the video data 1167 is carried out by the MPEG video decoder 708, MUX 712, video encoder 714, genlock 722, and filter 716. These elements decode the MPEG-2 encoded data, add data to the vertical blanking interval (if required), encode the digital data to provide an analog signal in the NTSC or PAL format in sync with the national broadcast signal, and filter the analog signal.

The private data (OSD) processing 1165 may be carried out by the MPEG video decoder and OSD and/or microprocessor 728. However, such processing is not required for the ad insertion function. It will be discussed below with respect to the video compositing function.

The process network video signal process 1171 is carried out with the auto gain control circuit 766, the black level clamp 768, and sync stripper circuit 770 as discussed above.

The sync lock process 1173 is carried out with the synch stripper 770 and the genlock circuit 722, which includes the phase detector 722, the low pass filter 774, the voltage controlled crystal oscillator 776, the phase locked loop 778 and the division circuit 780 and provides sync data to the process for processing and converting encoded video data 1167.

The switch control process 1175 is carried out with the microprocessor 728, the logic 760, the vertical sync counter 762 and the horizontal sync counter 764 and controls the switching of both the analog audio switch 744 and the analog video switch 718.

The flow control process 1181 is carried out by the microprocessor 728 and/or the channel test and flow control unit 734. As discussed above, when the memory (e.g., DRAM 706) of the transport stream demultiplexer 704 is full, which implies that the memory (e.g., DRAM 710) of the MPEG-2 video decoder 708 is full, the microprocessor communicates this, via control bus process 1183 of the distribution network interface unit 206, the control bus 226, and the control bus interface process 1143 of the server interface 204, to the load process 1145 so that the queue, associated with that distribution network interface unit 206, may be filled.

Since the initial configuration of the system of the present invention does not require a remote server 222, the foregoing describes an implementation for performing ad insertion functionality. However, since a remote server 222 may be provided, the operation of the initial configuration of the system of the present invention is described with a remote server 222 with reference to FIGS. 11a and 11b. As shown in FIG. 11a, the remote server 222 includes a mass storage system 1102, such as a UNIX file system for example, which stores, inter alia, processed media, schedules, and system configuration information.

Files of MPEG-2 encoded media, such as advertisements, movies, screen overlays, etc., may be created at an off-site encoding facility. These files of media may be brought to the remote media server 222 on physical storage media (e.g., magnetic tape, optical disk, etc.) or may be communicated to the remote media server 222 via a communications link. In either case, a load media process 1110, carried out on an appropriate input device (e.g., a tape drive, a disk drive, or a communications line terminating device), loads the files of MPEG-2 encoded media and provides the files, via path 1114, to a media preprocessing process 1116.

The media preprocessing process 1116 (i) avoids the need to determine program boundaries in real time, and (ii) permits two programs (such as commercial advertisements for example) to be decoded back-to-back. The preprocessing process may, inter alia, (i) verify that the file is an MPEG file, i.e., is MPEG compliant, (ii) add a private data packet (s), which should include, inter alia, a source ID field, a bit rate field, a video frame count field, and a version field, (iii) remap the audio and video packet IDs (or PIDs) so that they correspond to conventions used in transport stream demultiplexers 704 located in the distribution network interface units 206, (iv) remove video frames that cannot be decoded due to a lost frame(s) destroying temporal correctness, (v) remove video frames following an end_of_sequence code such that an end_of_sequence code appears at the end of the video stream, (vi) remove any partial audio frames, (vii) add or remove audio frames, if necessary, such that the audio sequence starts at the same time as (or within 12 ms of) the corresponding video sequence, (viii) add or remove audio frames, if necessary, such that the temporal length of the audio sequence matches that of its associated video sequence (or is within a predetermined time of that of its associated video sequence), and (ix) update the private data packet(s), and in particular, a video frame count value, after the video and audio streams have been "cleaned up". An illustrative example of preprocessing MPEG files is described in U.S. patent application Ser. No. 08/686,629, filed Jul. 24, 1996, entitled "Method and Device for Preprocessing Streams of Encoded Data to Facilitate Decoding Streams Back-to-Back", and commonly assigned (expressly incorporated by reference herein).

The media preprocessing process 1116 provides the preprocessed MPEG-2 media files to a store media process 1120, via path 1118. The store media process 1120 stores the preprocessed MPEG-2 media files to the mass storage device(s) 1102. Alternatively, the load media process 1110 may store the received files of MPEG-2 encoded media to the mass storage device(s) 1102 of the remote media server 222 and the media preprocessing process 1116 may (i) read the files from the mass storage device(s) 1102, (ii) perform the above described preprocessing on the files, and (iii) store the preprocessed files back on the mass storage device(s) 1102.

Files of scheduling information (See e.g., FIG. 15) may be created at an off-site traffic and billing facility. As was the case with the files of MPEG-2 encoded media, the files of scheduling information may be brought to the remote media server 222 on physical storage media (e.g., magnetic tape, optical disk, etc.) or may be communicated to the remote media server 222 via a communications link. However, since the files of scheduling information carry much less information, the use of a communications link is much more feasible than for files of MPEG-2 encoded media. In either case, a load schedule process 1104, carried out on an appropriate input device (e.g., a tape drive, a disk drive, or a communications line terminating device), loads the files of scheduling information, and provides the scheduling information to the mass storage device(s) 1102 via path 1108.

Further regarding the scheduling information, a user interface process 1197 (which may reside at the local media server 202 and/or the remote media server 222) may be used to add scheduling information to the mass storage device(s) 1102 instead of, or in addition to, the load schedules process 1104. Moreover, the user interface process 1197 may be used to monitor, modify, add, or delete scheduling information files.

Thus, to this point, the processes for loading MPEG-2 encoded media files and scheduling information files to the mass storage device(s) 1102 of the remote media server 222 have been described. Of course, if the initial configuration of the system of the present invention does not include the optional remote media server 222, these processes will reside at the local media server 202.

Returning now to FIGS. 11a and 11b, in a system including a remote media server 222, the local media server(s) 202 will periodically (e.g., daily or weekly) require the scheduling information files and media files for the upcoming period (e.g., the upcoming day or week). The time periods at which the schedule information files and media files are required may differ, and will depend, inter alia, upon the amount of available storage at the local media server 202 and upon the likelihood that the media files or schedule files will be subject to change.

As shown in FIG. 11b, a load schedule process 1101 will periodically (based on clock/calendar information from clock/calendar process 11012) generate a request for schedule files for the upcoming time period and provide the request, via path 1103a, to one of the remote data server interface processes 11002. The particular remote data server interface process 11002 used may be carried out by one of the input/output ports 1012, such as a communications line terminating device. Since the schedule files (See e.g., 1500) include relatively small amounts of data, and can be communicated in non-real-time, the input/output port 1012 carrying out this process may be a modem or ISDN terminal for example. Path 1162, such as the public switched telephone network (or PSTN) 220, carries the request to one of the local data server interface processes 1142 at the remote media server 222. As with the remote data server interface(s) processes 11002, the local data server interface(s) processes 1142 may be carried out by a communications line terminating device, such as a modem or ISDN terminal for example.

At the remote media server 222, the local data server interface process 1142 provides the request, via path 1138a, to a read schedule process 1124. The read schedule process 1124 requests the requested scheduling information from the mass storage device(s) 1102, via path 1128. The requested scheduling information is returned to the read schedule process 1124 via path 1126. The read schedule process 1124 then sends the requested scheduling files to the load schedule process 1101 at the local media server 202 via path 1138b, the local data server interface process 1142, the path 1160, the remote data server interface process 11002, and the path 1103b. At the local media server 202, the load schedule process 1101 then stores the requested and received schedule files to the schedule database 1008b, via path 1105.

Alternatively, rather than have the requests for schedule files being generated at the local media server(s) 202, the request may be generated at the remote media server 222 with read schedule process 1124. In this case, the read schedule process 1124 will generate requests for the schedule files for the upcoming time period (e.g., the upcoming week) for each of the local media servers 202 served by the remote media server 222. Since this process will necessarily be more complex than the individual processes running at each of the local media servers 202 served by the remote media server 222, the former alternative is preferable. The requested schedule files are then communicated to the local schedule processes 1101 of the local media servers 202 as described above. In this case, paths 1103a and 1138a are not required.

The downloading of media files from the remote media server 222 to the local media server 202 will now be described with reference to FIGS. 11a and 11b. Once a new schedule is downloaded and stored in the schedule database 1008*b*, the local media server 202 must periodically determine whether it has the media files scheduled to play within an upcoming time period. This process may be initiated by a user and performed manually. That is, a user may check the upcoming schedule and the media files stored via the user interface process 1119. Alternatively, an inventory check process 11004 may be provided. The inventory check process 11004, carried out by one of the processor(s) 1006, queries the schedule database, via path 11006*a*, for all break files (See e.g., 1500 of FIG. 15.) for the upcoming time period (e.g., for the upcoming day). The requested files are returned to the inventory check process 11004 via path 11006*b*. The inventory check process 11004 then strips the file key or spot key for each of the spots included in the breaks for the upcoming time period. Using these spot keys, the inventory check process 11004 queries the media database 1008*c* to determine whether files of MPEG-2 encoded media, corresponding to each of the spot keys, exist locally. For any of the spot keys, from the breaks scheduled for the upcoming time period, not having a corresponding file of MPEG-2 encoded media, the inventory check process forms a request to the remote media server 222 for such a file. This request is provided, via path 11010, to the load media process 1107.

The load media process 1107 forwards the request, via path 1109*a*, to one of the remote data server interface processes 11002 (carried out by one of the input/output ports 1012), a communications path 1162, one of the local data interface processes 1142, and path 1146, to program request process 1344. Since the request itself carries relatively little data, the local data server interface process 1142 and the remote data server interface process 11002 may be carried out by modems for example and the physical communications path linking the associated output and input ports, respectively, may be of relatively low bandwidth. The program request process 1344 queries, via path 1148, a read scheduled or requested media process 1132, and path 1134, files of MPEG-2 encoded media, corresponding to the spot key and residing on mass storage device(s) 1102. The requested media files are provided to the media database 1008*c* of the local media server 202 via path 1136, read scheduled or requested media process 1132, path 1140, another of the local data server interface processes 1142, communications path 1160, another of the remote data server interface processes 11002, path 1109*b*, load media process 1107 and path 1111. Although the media files include compressed data, compressed video data is still relatively large. However, the media files may be communicated in non-real-time. Accordingly, the communications line terminating devices carrying out the local data server interface process 1142 and the remote data server interface process 11002, as well as the communications link 1160 itself, should permit relatively high bandwidth communications. For example, the input/output ports could implement the ATM (asynchronous transfer mode) protocol over an OC-1 (55.840 Mbps) or OC-3 (167.52 Mbps) optical line. The network file system (or "NFS") protocol may be used to transfer the MPEG-2 media files.

The output of the analog video switch 718 (and the output of the analog audio switch 744) of the distribution network interface unit 206 is modulated with a carrier frequency at an associated modulator 212, combined with other video signals modulated at other carrier frequencies at channel combiner 214 to form a frequency division multiplexed broadband signal, and multicast or broadcast to a number of subscribers over the analog (e.g., co-axial cable) distribution network.

Figure 25:
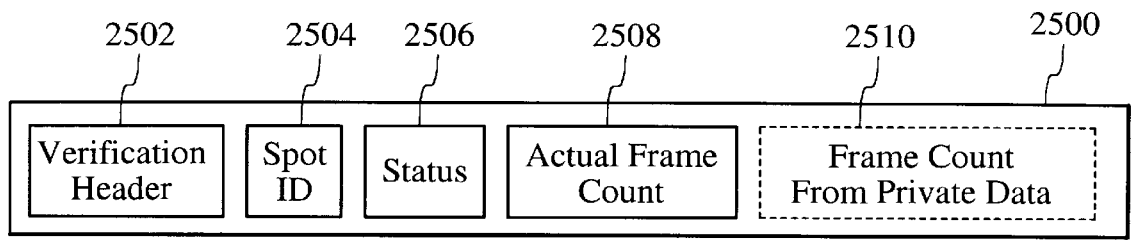
FIG. 25 is an exemplary data structure used to format verification data for use by the system of the present invention.

Finally, as discussed above with reference to FIG. 3, a verification function is performed. As shown in FIG. 11*d*, at each of the distribution network interface units 206, a verification signal generation process 1179 is performed, carried out, for example, by the microprocessor 728, the transport stream demultiplexer 704 and the vertical and horizontal counters 762 and 764. More specifically, upon receiving a private data transport stream packet 2200, as indicated by a unique PID number, the transport stream demultiplexer 704 makes such private data available to the microprocessor 728. Recall from the discussion of FIG. 17*b* above, that the start spot 1754 and stop spot 1758 packets include a spot key value. The microprocessor 728 also determines the number of frames of decoded video switched through the analog video switch 718 based on counts from the vertical and horizontal counters 762 and 764. Upon receiving the stop spot packet 1758, the microprocessor compares the spot key of that packet to the spot key of the start spot packet 1752. If the spot keys match, the microprocessor 728 assembles a verification data packet 2500 shown in FIG. 25. As shown in FIG. 25, the verification data packet 2500 includes a verification header field 2502, a spot id field 2504, a status field 2506, and an actual frame count field 2508. The verification data packet 2500 may also include a frame count from private data field 2510. Recall that during the media preprocessing process 1116, a private data packet, including a frame count, is included in the file of MPEG-2 encoded media. This private data packet will also be made available to the microprocessor 728 by the transport stream demultiplexer 704.

The verification data packet 2500 is transmitted to the local media server 202 via the control bus interface process 1183 (as carried out by dual port RAM 730), the data bus 950 of the control bus 226, control bus interface process 1143 (as carried out by control bus controller 616), path 1159 (as carried out by bus 602), local server (control) interface process 1157 (as carried out by system processor 610), path 1131 (as carried out by Ethernet bus 232), and one of the server interface unit interface processes 1164 (as carried out by one of the input/output ports 1012). The server interface interface process 1164 used forwards the verification data packet 2500 to message router process 1166 via path 1168 and the message router process 1166 routes the verification data packet 2500 to database verifier process 1186 via path 1188. The database verifier process 1186 loads the verification data packet 2500 to verify database 1008*a* via path 1190.

Periodically (e.g., daily), the contents of the verify database 1008*a* are sent to the remote media server 222 via a transmit traffic and billing process 11020, path 11022, one of the remote data server interface processes 11002 (as implemented by one of the input/output ports 1012, such as a modem for example), a communication link 1162, and one of the local data server interface processes 1142. At the remote media server 222, the verification packet is sent to the verification report generator process 1150 via path 1152. The verification report generator process 1150 generates a verification report based on the verification data packet 2500. More specifically, the status field 2506 is checked and the actual frame count field 2508 is compared to the frame count from private data field 2510. The generated verification report(s) are then sent to an off-site traffic and billing facility via path 1156, verification report delivery process 1154 and path 1158.

Alternatively, the verification report generation process 1150 may be executed at the local media server 202 such that verification reports are generated locally. The remote media server 222 will periodically interrogate local server(s) 202 associated with it for verification reports. Later, the verification reports may be shipped to an off-site traffic and billing facility.

If no remote media server is provided in the system, the transmit traffic and billing process 11020 may send the verification records from verify database 1008a, to the off-site traffic and billing facility. In such a system, the transmit traffic and billing process 11020 may also perform the functions otherwise performed by the verification report generator process 1150.

Alarm and system status data files may be processed in a similar manner as the verification files.

§5.2 DETAILS OF COMPOSITING OPERATION

The initial configuration of the system of the present invention can support compositing temporally related video frames. To reiterate, when this compositing function is used, the system should permit locally stored video, graphical, and/or textual data to be combined, with, or overlayed on, a national video feed (or locally generated video).

Figure 33A:
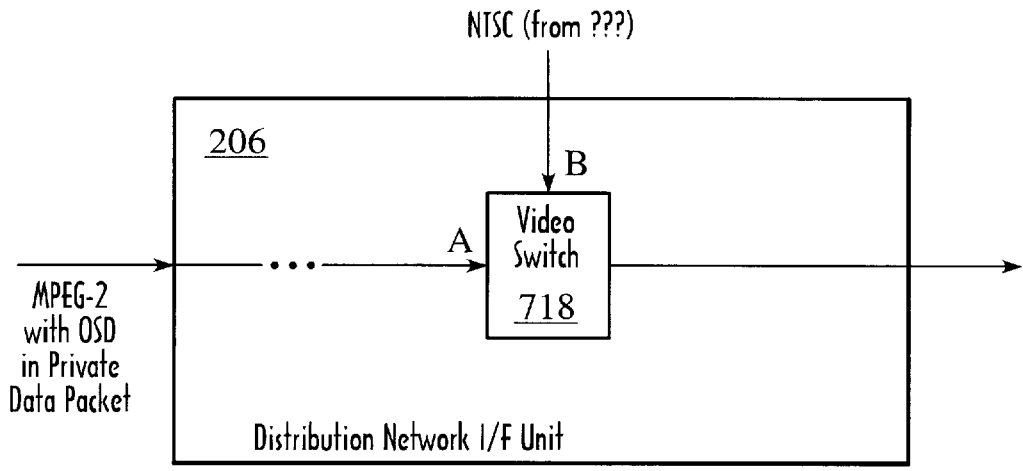
FIGS. 33a through 33d are simplified block diagrams of a distribution network interface unit for implementing alternative on-screen display or video compositing functionality.
Figure 33B:
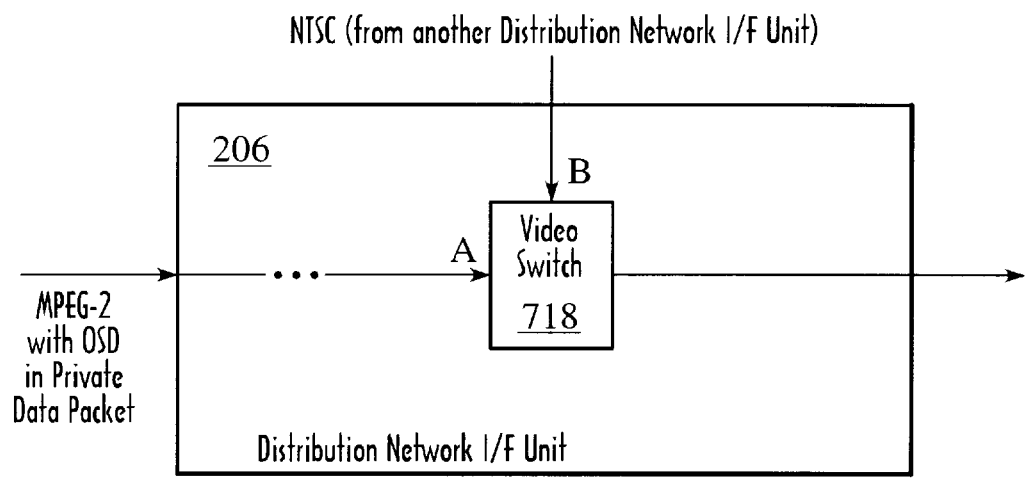
Figure 33C:
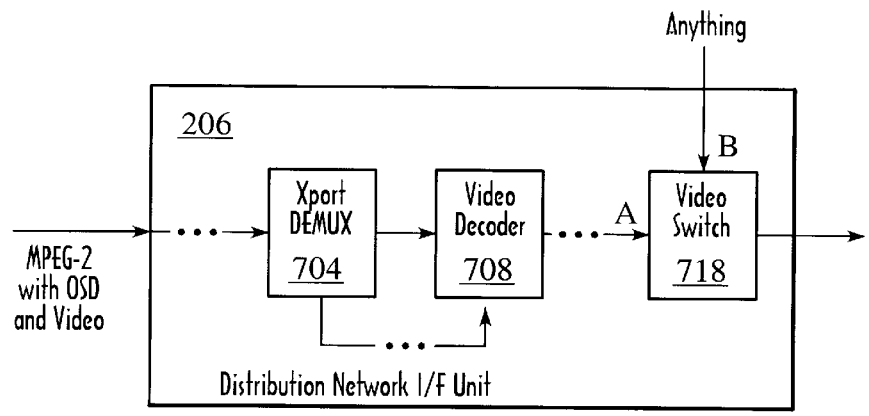
Figure 33D:
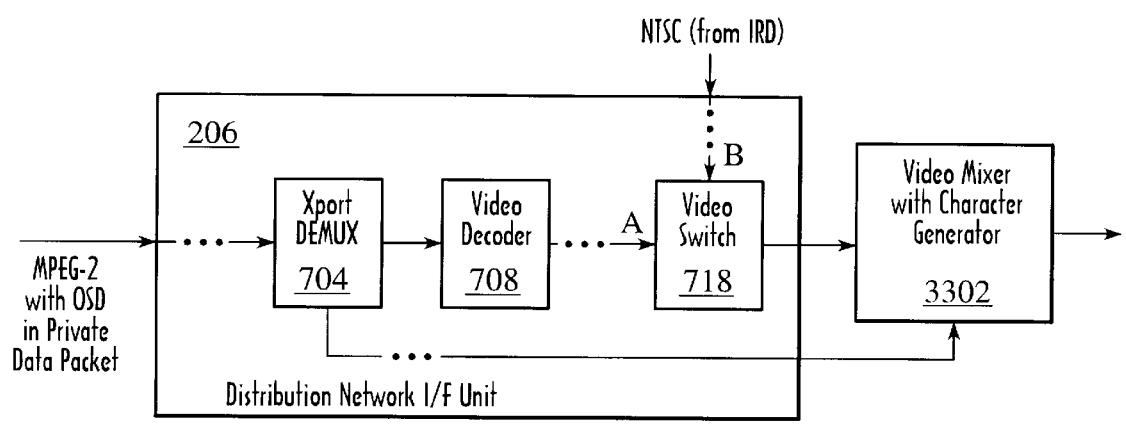

FIGS. 33a through 33d illustrate four different ways of performing video compositting with the initial configuration of the system of the present invention. More specifically, FIG. 33a illustrates compositting video from a local MPEG-2 private data packet(s) with a national analog (e.g., NTSC formatted) video signal, FIG. 33b illustrates compositting video from a local MPEG-2 private data packet (with bit mapped OSD data) with a locally generated analog video signal, FIG. 33c illustrates compositting video from a local MPEC-2 private data packet(s) with video from a local MPEG-2 video data packet(s), and FIG. 33d illustrates compositting characters generated from data (e.g., ASCII data) from a local MPEG-2 private data packet(s) with a national analog (e.g., NTSC formatted) video signal. Each of these compositting methods is described in more detail below.

FIG. 33a illustrates compositting video from a local MPEG-2 private (or video) data packet(s) with a national analog (e.g., NTSC formatted) video signal. As discussed above with reference to FIG. 4, the local video server 202 streams a private (or video) MPEG-2 transport stream packet(s) from its media database 1008c based in response to decoded cue tones, generated by the decoded cue tone generation process 1178 in response to scheduling information in the scheduling database 1008b.

More specifically, as shown in FIG. 11b, cue tone generator process 1178 periodically queries the schedule database 1008b for the schedule for particular channels for an upcoming time period (e.g., for the next hour on a movie theater channel). In the particular movie play time application discussed above, the schedule files will be based on a network feed of a repetitive sequence of movie trailers. The cue tone generator may be carried out by one of the processors 1006 of the local media server 202.

The decoded cue tones generated by the cue tone generator process 1178 are provided to a video pump corresponding to the particular channel, via path 1180, message router process 1166, path 1172, remote procedure call router 1170 and path 1176. The video pump reads the appropriate media file from the media database 1008c. In this specific compositing application, the media files will include on-screen display (or "OSD") information regarding the playtimes of a particular movie at local theaters. The media files are then provided to the appropriate distribution network interface unit 206 in the manner described above with reference to the ad insertion application.

Alternatively, appropriate files of MPEG-2 encoded media or of OSD data may be read and transmitted by the local media server 202 in response to decoded cue tones from the national video feed as discussed above with respect to the ad insertion operations.

Figure 28:
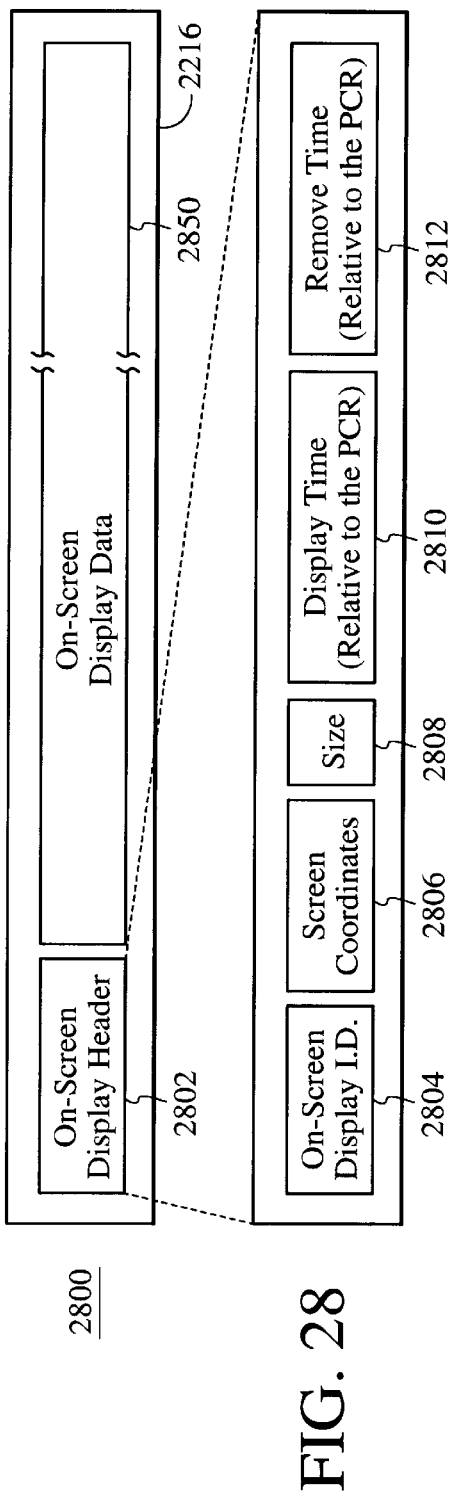
FIG. 28 illustrates an exemplary data structure for carrying on-screen display data in the payload of a transport stream packet.

As shown in FIG. 28, the on-screen display file 2800 is carried in the payload 2216 of a transport stream packet(s) 2200. The PID field 2220 in the header 2114 of the transport stream packet identifies the payload 2216 as private data, and specifically, on-screen display data.

The on-screen display file 2800 includes an on-screen display header field 2802 followed by, for example, uncompressed, bit mapped, two (2) or four (4) bits per pixel, data 2850. The header field 2802 includes an on-screen display identifier field 2804, an on-screen display coordinate (s) field 2806, size of the on-screen display data field 2808, a display time field 2810, and a remove time field 2812. The illustrative on-screen display identifier field 2804 includes a bit sequence which identifies the file 2800 as an on-screen display file. The illustrative on-screen display coordinate(s) field 2806 may either (a) include a corner pixel coordinate to which the on-screen display is anchored or (b) define a group of coordinates which bound the on-screen display. The size of the on-screen display data field 2808 may define the number of bytes of on-screen display data 2850. The display time field 2810 provides a display start time, relative to the program clock reference (or PCR) field 2222, of the header 2114 of the transport stream packet 2200, for the on-screen display while the remove time field 2812 provides a time, relative to the PCR 2222, to remove the on-screen display.

As discussed above with reference to FIG. 4 and as shown in FIG. 11d, at the distribution network interface unit 206, the file(s) of encoded on-screen display(s) are stripped from the transport stream by the demultiplex transport stream process 1163 and provided to the private data (OSD) processing process 1165. More specifically, referring to FIG. 7a, the demultiplex transport stream process 1163 is carried out by the transport stream demultiplexer 704 and the private data (OSD) processing process 1165 is carried out by the microprocessor 728. The transport stream demultiplexer 704 stores the transport stream packets 2200 at different queues in its memory (e.g. DRAM 706) based on the data in the PID field 2220 of the transport packet header 2114. When the transport stream demultiplexer 704 stores private data (such as OSD data for example) to the appropriate queue, it interrupts the microprocessor 728, thereby indicating the presence of private data in its memory. The microprocessor 728 reads the private OSD data from the queue of the memory of the transport stream demultiplexer 704 and writes it to the memory (e.g. DRAM 710) of the MPEG video decoder 708.

The video signal output by the MPEG video decoder and OSD 708 and formatted, in accordance with NTSC by the video encoder 714 is applied to a first input "A" of the video switch 718.

An analog video signal (in the NTSC format for example) is provided from a local integrated receiver/decoder 210, is processed by the distribution network interface unit 206 as described above, and provided to a second input "B" of the video switch 718.

The video switch 718 is switched based on a horizontal line count from counter 764 such that a first group of lines of a video frame are from input "A" while a second group of lines of the video frame are from input "B". Thus, the video switch 718 provides a composite video frame.

FIG. 33b illustrates compositting video from a local MPEG-2 private data packet (with bit mapped OSD data) with a locally generated analog video signal. It is similar to the scheme described above with reference to FIG. 33a, but differs only in that the source of the analog video signal applied to input "B" of the video switch 718 is generated locally, for example, by another distribution network interface unit 206.

FIG. 33c illustrates compositting video from a local MPEG-2 private data packet(s) with video from a local MPEG-2 video data packet(s). In this case, based on scheduling information in its schedule database 1008B, the local media server 202 outputs a transport stream including MPEG-2 video transport stream packets (having a first PID) and MPEG-2 private data packets (having a second PID). As was the case with the scheme described above with respect to FIG. 33a, the payload of the MPEG-2 transport stream private data packet(s) includes OSD header information 2802, as well as uncompressed bit mapped OSD data 2850. Once the MPEG-2 transport stream packet reaches the transport stream demultiplexer 704, the transport stream demultiplexer stores it in an appropriate queue of its memory (e.g., DRAM 706) and interrupts the microprocessor 728. The microprocessor 728 reads the private data from the queue of the transport stream demultiplexer 704 and writes it into the memory (e.g., DRAM 710) of the MPEG video decoder and OSD 708. The transport stream demultiplexer 704 makes the video transport stream packets available to the video decoder 708. The video signal output by the MPEG video decoder and OSD 708 represents a composite of the video data and the OSD uncompressed bit mapped data. The output of the MPEG video decoder and OSD 708 is formatted, in accordance with NTSC by the video encoder 714 is applied to a first input "A" of the video switch 718. In this case, the video switch always switches the signal at its first input "A" through to its output.

FIG. 33d illustrates compositting characters generated from data (e.g., ASCII data) from a local MPEG-2 private data packet(s) with a national analog (e.g., NTSC formatted) video signal. The local video server 202 streams a private MPEG-2 transport stream packet(s) from its media database 1008c based in response to decoded cue tones, generated by the decoded cue tone generation process 1178 in response to scheduling information in the scheduling database 1008b. The payload of the MPEG-2 transport stream packet(s) includes OSD header information 2802, as well as character (e.g., ASCII) data. Once the MPEG-2 transport stream packet reaches the transport stream demultiplexer 704, the transport stream demultiplexer stores it in an appropriate queue of its memory (e.g., DRAM 706) and interrupts the microprocessor 728. The microprocessor 728 reads the private data from the queue of the transport stream demultiplexer 704 and provides it to a video mixer and character generator circuit 3302.

An analog (e.g., NTSC formatted) video signal, received, for example, from an integrated receiver/decoder 210, is applied to a second input "B" of the video switch 718. In this scheme, the video switch always switches the signal at its second input "B" through to its output. The video output of the switch 718 is provided to the video mixer with character generator 3302.

The video mixer and character generator 3302 outputs a video signal corresponding to the analog video signal input to the second input "B" of the video switch 718, but having characters, based on the character data from the private data transport stream packet, superimposed on it.

Thus, in view of the above, the OSD data may be locally stored and retrieved bit map or character data, communicated from the local server 202 to the distribution network interface unit 206 in an MPEG-2 private data transport stream packet. The video data over which the OSD is laid, may be (a) a national analog signal or (b) a locally generated analog signal.

§5.3 DETAILS OF NVOD OPERATION

Basically, near video-on-demand (or "NVOD") is accomplished with dynamic control based on program distribution during peak user times, coupled with customer demand. Scheduling of popular movies is determined using customer orders and scheduling minimums. When a customer orders a movie, the initial configuration of the system of the present invention determines port availability and expected demand. If the requested movie is currently scheduled to start, the customer is given a choice of available start times. If, on the other hand, the requested movie is not already scheduled, the scheduling system is queried for open channel availability and a channel is then assigned to the movie for subscriber viewing. If all channels are in use, the customer is given the next available start time.

In a preferred embodiment, a "Barker Channel" (i.e., a channel listing scheduled movies, their start time(s), and the channel(s) playing them) will be provided so that subscribers can see what movies are available and which have already been scheduled.

In a preferred embodiment, the most popular movie(s) is repetitively broadcast over a number of channels, each of the channels having a staggered start time. For example, a 90 minute movie may be repetitively broadcast over three (3) channels, the movie start time being staggered by 30 minutes over each of the three (3) channels. This embodiment is particularly attractive in low-loss optical-fiber analog distribution networks discussed above or with digital streamer units 3100 discussed below.

In the near video-on-demand application, means for providing back-channel (i.e., subscriber to headend) communications must be provided for permitting a subscriber to communicate its request(s) to the system. FIGS. 12a through 12d illustrate four possible means for back-channel communications.

Figure 12A:
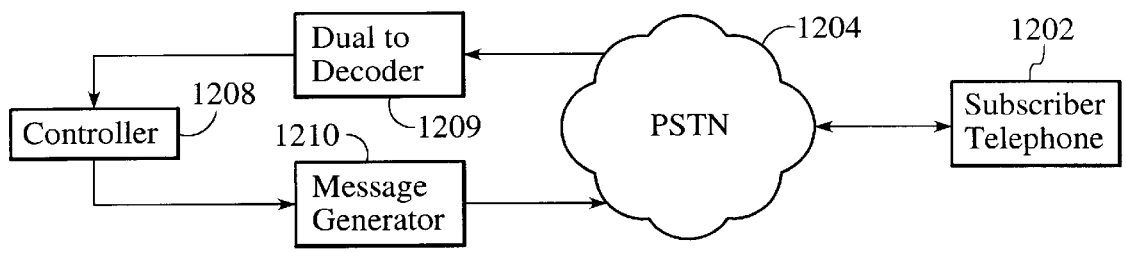
FIGS. 12a through 12d are block diagrams of various types of back-channel communications which may be used in the system of the present invention.

FIG. 12a is a block diagram of a first means for processing subscriber request, which first means includes, enter alia, a telephone 1202 at the subscriber premises (or elsewhere), and a dual tone decoder 1206, a controller 1208, and a message generator 1210 at the local media server 202 for example. In the first means of FIG. 12a, a subscriber uses his or her telephone (or any other telephone) 1202 to communicate dual tones, corresponding to numbers or symbols entered at their keypad, to the local media server 202 via the public switched telephone network (or PSTN) 1204. At the local media server 202, a dual tone decoder 1206 converts the dual tones to commands. The controller 1208 responds to the commands as discussed in more detail below. The controller 1208 may send messages corresponding to order verification, a hierarchical menu of queries, etc., to the subscriber via the message generator 1210 and the public switched telephone network 1204.

Figure 12B:
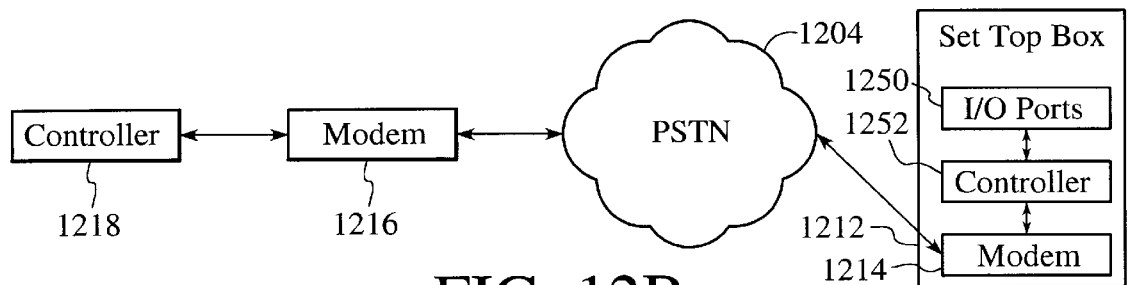

FIG. 12b is a block diagram of a second means for processing subscriber request, which second means includes, inter alia, a set top box 1212 at the subscriber premises, the set top box having input/output ports 1250, a controller 1252, and a modem 1214, and at the headend station (e.g., at the local media server 202) a modem 1216 and controller 1218. In the second means of FIG. 12b, a subscriber may use an input device, such as an infra-red remote controller, to provide a request to the controller 1252 via an appropriate one of the input/output ports 1250. The controller 1252 then sends the request to the controller 1218 at the headend station via modem 1214, PSTN 1204, and modem 1216. The controller 1218 responds to the received requests as discussed in more detail below. The controller 1218 at the head-end station may communicate order verification, a hierarchical menu of queries, etc., to the subscriber via modem 1216, PSTN 1204, modem 1214, controller 1252, an appropriate one of the output ports 1250, and an output device (not shown) such as the video monitor for example.

Figure 12C:
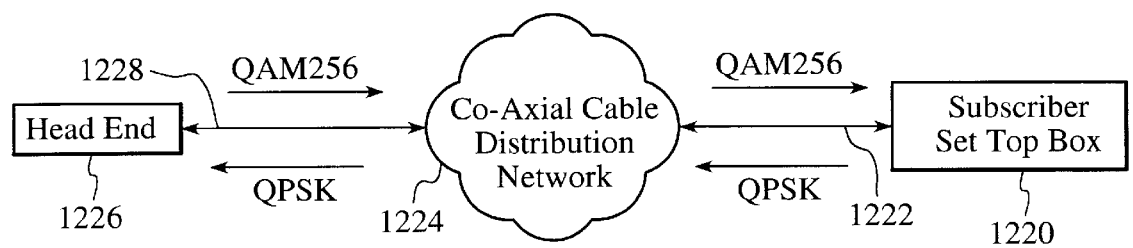
Figure 26:
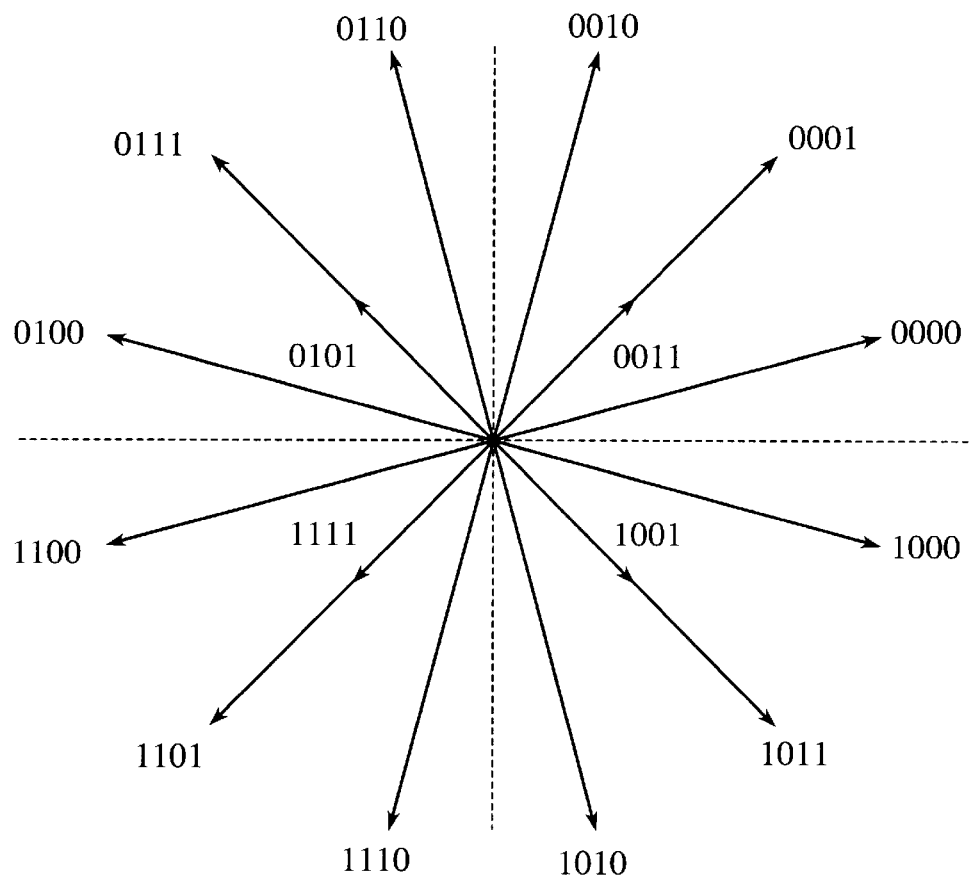
FIG. 26 illustrates QAM 16 data transmission.

FIG. 12c is a block diagram of a third means for processing subscriber request, in which the co-axial cable distribution network 1224, not the public switched telephone network (or PSTN) is used. As shown in FIG. 12c, the broadband signal, composed of the individual channel signals frequency division multiplexed, and sent from the head-end station 1226 to the subscriber, is modulated in accordance with QAM256. With QAM256 (or quadrature amplitude modulation 256), both the amplitude and the direction of a vector (i.e., phase) of a signal convey information. FIG. 26 illustrates the use of QAM16 to convey four bits of information, 0000 through 1111. Back-channel communications from the subscriber to the head-end station are carried, via the same co-axial cable network, in accordance with QPSK (quadrature phase shift keying) for example. A robust modulation scheme, such as QPSK, is required because signal attenuation in the back-channel is much greater than in the forward channel. At the head-end station, the subscriber request is processed as described below.

Figure 12D:
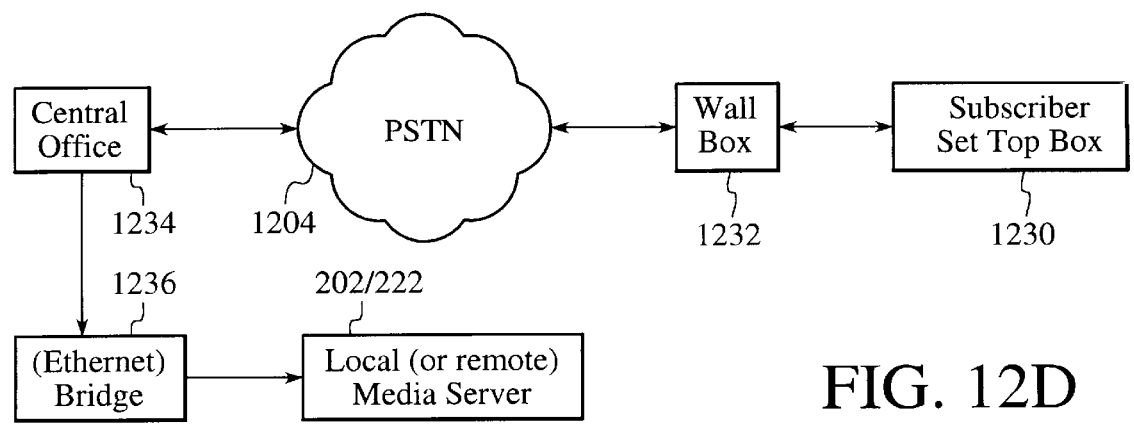

Finally, FIG. 12d is a block diagram of a fourth means for processing subscriber request, which fourth means carries all digital signals and includes, inter alia, a subscriber set top box 1230, a wall box 1232, and a bridge 1236. The subscriber set top box 1230 sends a digital signal (based on a subscriber input at an input device—not shown) to the local media server 202 (or remote media server 222) via wall box 1232, public switched telephone network 1234, central office 1234, and bridge 1236. Once at the local (or remote) media server 202 (or 222), the subscriber request is processed as described below.

The processing of the subscriber request, for example by the local media server 202, is described below. Referring to FIG. 11b, a request interface process 1328, carried out on one of the input/output ports 1012 of the local media server 202, receives the subscriber request and routes it, via path 1332, to a local request processing process 1330. As mentioned above, scheduling of popular movies on one or more channels is determined using customer orders and scheduling minimums. That is, given the limited bandwidth of the distribution network in the initial configuration of the system of the present invention, a movie will only be scheduled for transmission on a particular channel at a particular time if a set of criteria, including for example, channel availability, location of media files, number of actual requests for a particular movie at a particular time, port availability and expected number of requests for a particular movie, is met. If the requested movie is currently scheduled to start, the customer is given a choice of available start times (e.g., via message generator 1210 and PSTN 1204 as shown in FIG. 12a, via controller 1218, modem 1216, PSTN 1204, modem 1214, controller 1252, and output port 1250 as shown in FIG. 12b, via the forward channel of a co-axial cable distribution network 1224 as shown in FIG. 12c, or via Ethernet bridge 1236, central office 1234, PSTN 1204, wall box 1232, and set top box 1230 as shown in FIG. 12d). If, on the other hand, the requested movie is not already scheduled, the scheduling database 1008b is queried, via path 1334, for open channel availability. If an open channel is available at the appropriate time, a channel is then assigned to the movie for subscriber viewing. If all channels are in use, the subscriber is given the next available start time via the alternative means set forth above with reference to FIGS. 12a–12d (assuming the above set of criteria is met). In either case, the results of the schedule database query are provided to the local request processing process 1330 via path 1336. The local request processing process 1330 (or alternatively, the inventory check process 11004) checks the media database 1008c to determine whether files of compressed media data corresponding to the requested and/or scheduled programming are available at the local media server 202. If they are not, a request for such files is send to the remote media server 222 as described above.

If a movie has been scheduled, at the scheduled start time, the cue tone generator process 1178 invokes an appropriate one of the video pump processes 1174 via path 1180, message router process 1166, path 1172 remote procedure call router process 1170, and path 1176. The video pump then transmits the files of media to the appropriate distribution network interface unit 206 as discussed above with reference to the ad insertion process. Scrambling data is preferably included so that only paying customers may view the requested program. Scrambling may be employed during the encoding of the media or at any point before transmission of the media onto a distribution network. The media server 202 may download a decryption key to a subscriber's set top box after the subscriber has requested the movie and has been approved to receive it.

In a preferred embodiment, a "Barker Channel" (i.e., a channel listing scheduled movies, their start time(s), and the channel(s) playing them) will be provided so that subscribers can see what movies are available and which have already been scheduled.

§6. FUNCTION OF SECOND CONFIGURATION

A second configuration of the system of the present invention permits the system to migrate towards an all digital, high bandwidth, distribution network. The second configuration will permit full interactivity (to permit such applications as true video-on-demand) when such all digital, high bandwidth, distribution networks become economically feasible.

§7. HIGH LEVEL DESCRIPTION OF THE STRUCTURE OF THE SECOND CONFIGURATION

Figure 27:
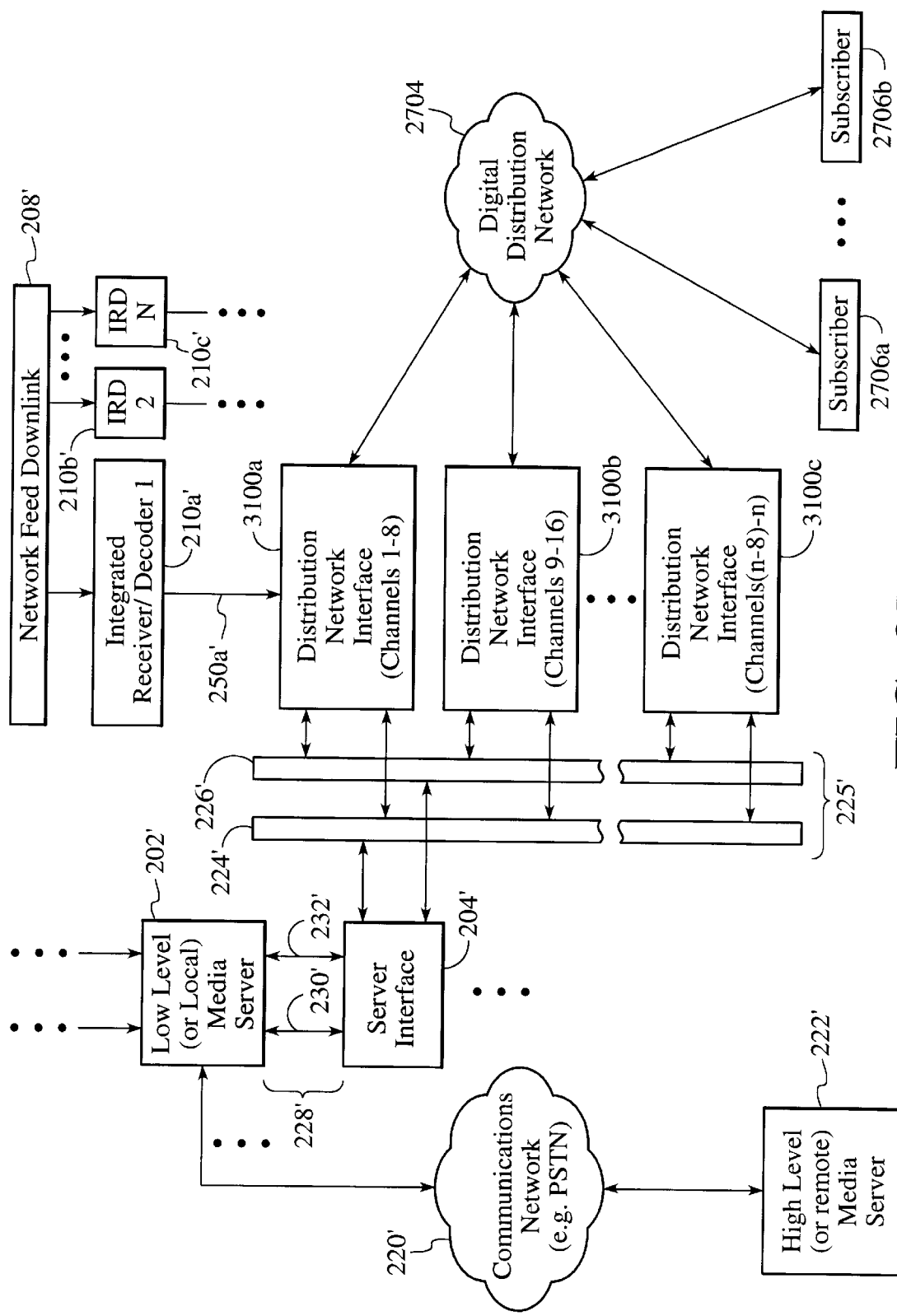
FIG. 27 is a high level, block diagram of a second configuration of the system of the present invention.

FIG. 27 is a high level block diagram of the second configuration of the system of the present invention in conjunction with a digital distribution network 2704. In the most basic arrangement, the system includes a local media server 202', one or more server interfaces 204', at least one (e.g., two) of distribution network interface unit(s) (or digital streamers) 3100 assigned to each of the one or more server interfaces 204', a first communications means 228' for permitting the communication of data between the local server 202' and the one or more server interfaces 204', and a second communications means 225' for permitting the communication of data between the server interface(s) 204' and its associated distribution network interface units (or digital streamers) 3100. As a comparison of FIGS. 2 and 27 indicates, the system of the present invention is advantageous in that many components (e.g., the local media server 202/202', the first communications means 228/228', and the server interface(s) 204/204') remain the same.

§8. DETAILED DISCLOSURE OF THE STRUCTURE OF THE SECOND CONFIGURATION

§8.1 DIGITAL STREAMER CARD

§8.1.1 FUNCTIONS OF THE DIGITAL STREAMER CARD

Figure 31:
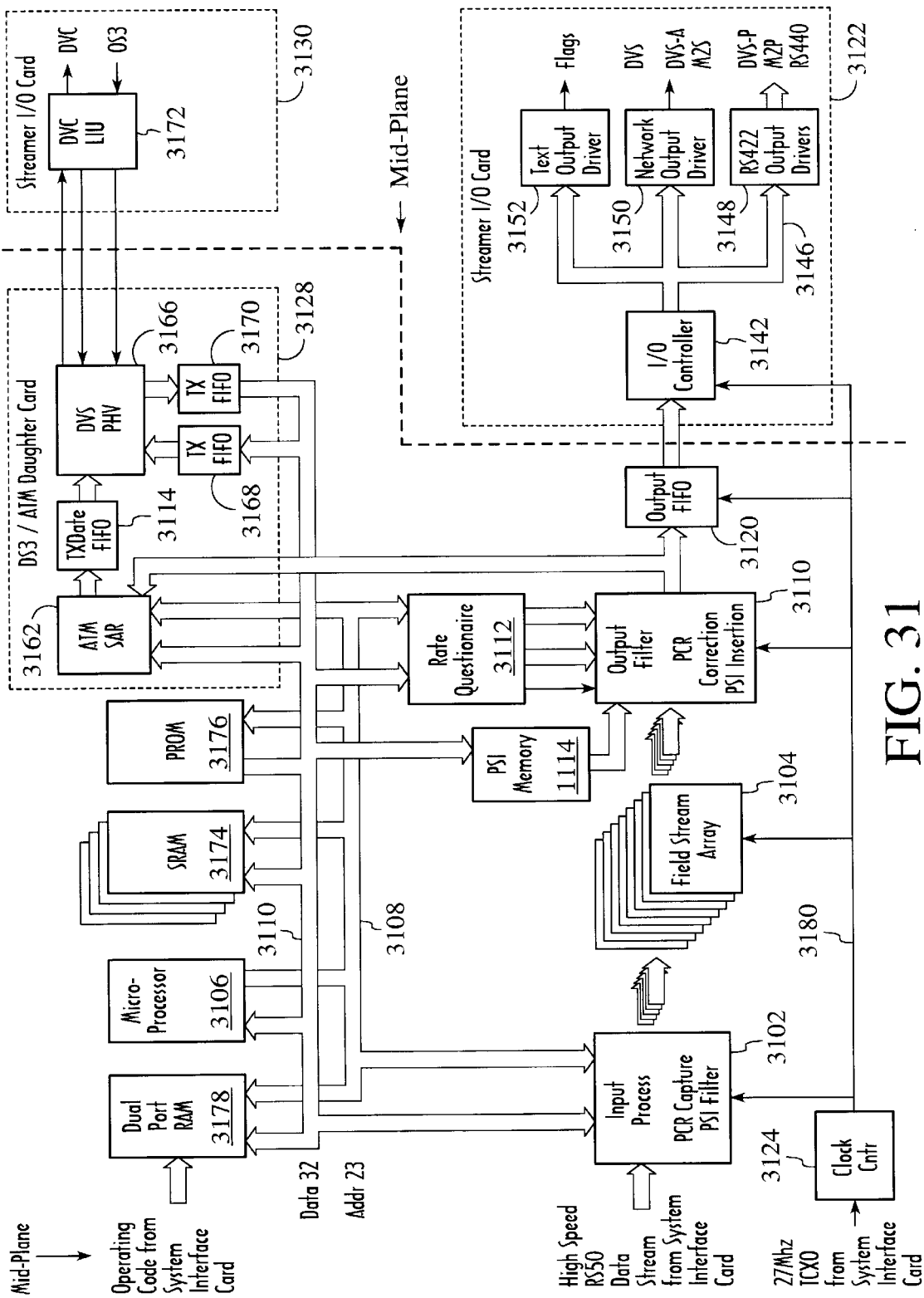
FIG. 31 is a block diagram of an alternative distribution network interface unit for outputting digital video data.

FIG. 31 illustrates an exemplary digital distribution network interface unit (or digital streamer) 3100 that may be used in the second configuration (or in a hybrid configuration) of the system of the present invention. As its name implies, the digital streamer 3100 may be used to interface the system of the present invention with a digital distribution network. The digital output of the digital streamer 3100 may also be modulated, with a QAM64 modulator for example, and placed on an analog distribution network. Such a modulated signal of compressed digital data can carry, within a given frequency band, more channels of video and audio data than a modulated NTSC analog video signal for example.

The digital streamer 3100 operates as a concentrator to multiplex upto eight (8) single program transport streams 2112 corresponding to (8) different channels onto a single multi-program transport stream (or "MPTS"). As described below, PID 2220 remapping is carried out at a system interface unit 204 such that the eight (8) channels on the multiplexed transport stream can be distinguished and separated from one another. Although the digital streamer 3100 has been described as multiplexing upto eight (8) single program transport streams, one skilled in the art can appreciated that more than eight (8) single program streams may be multiplexed—the number depends on the total bandwidth available and the bandwidth required by each of the streams.

The digital streamer 3100 also adjusts the rates of each of the upto eight (8) transport streams such that jitter (i.e., random variations in the transmission speed in the transport stream) is reduced.

Finally, the digital streamer 3100 can stuff MPEG-2 transport stream packets onto the transport stream if downstream devices, such as a QAM64 modulator for example, require a constant input of transport stream packets.

§8.1.2 STRUCTURE OF THE DIGITAL STREAMER CARD

As shown in FIG. 31, the digital streamer 3100 includes an input parser 3102, an array of (e.g., eight (8)) field stores 3104, an output multiplexer 3118, an output FIFO 3120, a streamer input/output card 3122, a microprocessor 3106, a dual port RAM 3178, static RAMs 3174, a programmable RAM 3176, rate generators 3112, a program specific information (or "PSI") FIFO 3112, a data bus 3110, an address bus 3108, a clock distribution circuit 3124, an optional DS3/ATM daughter card 3128, and an optional streamer ATM input/output card 3130.

The input parser 3102 may be a field programmable gate array (or FPGA) made by Altera for example. The input parser 3102 functions to (i) capture PCRs 2222 in the incoming transport streams 2112, (ii) count bytes or packets between PCRs, and (iii) interrupt the microprocessor 3106 each time the input parser 3102 receives a PCR such that the microprocessor 3106 may read out the count.

The field store array 3104 may consist of eight (8) frame buffers. Each of the eight (8) frame buffers of the field store array 3104 buffers a corresponding transport stream from the input parser 3102.

The microprocessor 3106 may be a 68349 device sold by Motorola. The microprocessor 3106 functions to, for each of the upto eight (8) transport streams, (i) fetch the byte count between PCRs from the input parser 3102, (ii) determine a time between PCRs, and (iii) determine a rate based on the byte count between PCRs and the time between PCRs. The PROM 3176 contains bootstrapping code for the digital streamer 3100. The dual port RAM 3178 permits operating code, from the local server 202, via the server interface unit 204, for example, to be downloaded to the SRAMs 3174.

The rate generators 3112 may be FPGAs sold by Altera. Based on the rate data determined by the microprocessor 3106, the rate generators 3112 determine a packet rate for each of the transport streams stored in the field store array 3104 and generate control signals for the output of the each of the transport streams. The output multiplexer 3118 may also be an FPGA sold by Altera. The output multiplexer 3118, under the control of the rate generators 3112, switches through one of the upto eight (8) transport streams from the field store array 3104. The output multiplexer 3118 also stuffs PSI (or program specific information) data from the PSI memory 3114, also under the control of the rate generators 3112. Finally, the output multiplexer 3118 performs a PCR correction function to avoid the generation of jitter. More specifically, if the rate generators 3112 request the output of two (2) or more transport streams at the same time, only one transport stream is output and the other transport stream(s) is delayed. The output multiplexer 3118 tracks the delay of the output of the other transport stream(s) and updates the PCR(s) of the delayed transport stream(s) based on the delay, thereby canceling out any jitter that would otherwise be introduced by the delay.

The output FIFO 3120 smoothes the 27 MHz bursts of transport stream data to the output rate determined by the streamer input/output card 3122. The streamer input/output card 3122 includes an input/output controller 3142, a data bus 3146, a TAXI output driver 3152, a HotLink output driver 3150, and RS442 output drivers 3148. The HotLink output driver 3150 may provide a SMB output, a DVB-S output, and/or an M2S output. The RS442 output driver 3148 may provide a DB25 output, a DVB-P output, an M2P output, and/or a RS449 output. The DVB (Digital Video Broadcast) serial and parallel outputs are widely used by other equipment such as integrated receivers/decoders, modulators, etc. The M2S serial and M2P parallel outputs are used by DiviCom products which are widely used.

The DS3/ATM daughter card 3128 includes an ATM segmentation and reassembly (or SAR) chip 3162, a DS3 physical interface chip 3166, a transmit FIFO 3168, a receive FIFO 3170, and a transmit data FIFO 3164. The streamer ATM input/output card 3130 includes a DS3 line interface unit 3172. The ATM SAR chip 3162 segments the MPEG-2 transport stream packets into ATM packets (of 53 bytes having a 48 byte payload). The microprocessor inserts required data, such as virtual path and virtual channel routing information, into the five byte header of each ATM packet. The ATM packets output by the ATM SAR 3162 are provided to the DS3 physical interface chip 3166 via transmit data FIFO 3164 which smoothes the bursts of data to the DS3 rate of 44.736 Mbps. The DS3 line interface unit 3172 is an electrical signal interface. The transfer and receive FIFOs 3168 and 3170, respectively, provide a control path from and to the microprocessor 3106 for sending and receiving control (non-transport stream) data.

§8.1.3 OPERATION OF THE DIGITAL STREAMER CARD

§8.1.3.1 UPSTREAM INPUT(S) AND PROCESSING

As mentioned briefly above, PID 2220 remapping is carried out at the system interface card 204 such that the eight (8) channels on the multiplexed transport stream can be distinguished and separated from one another. FIG. 34 is an example of a translation table which may be used to remap the PIDs of eight (8) transport streams. As shown in FIG. 34, in each of the transport streams, PID XXXXXXXXXX000 indicates MPEG-2 video data, PID XXXXXXXXXX001 indicates MPEG-2 audio data, PID XXXXXXXXXX010 indicates MPEG-2 SAP data, PID XXXXXXXXXX011 indicates private on screen display data, PID XXXXXXXXXX100 indicates private vertical blanking interval insertion data, PID XXXXXXXXXX101 indicates private stuffing data, and other PIDs indicate private data to be defined. As shown in the right column of FIG. 34, the first three bits of the remapped PID are used to indicate a particular one of the eight (8) transport streams. This information will be used by the input parser 3102 to distinguish the upto eight (8) transport streams.

§9. VARIOUS SYSTEM CONFIGURATIONS USING THE DIGITAL STREAMER CARD

§9.1 Use in an Analog Distribution Network

Upto two(2) digital streamer units 3100 may be used with the distribution network interface units 206 and share the analog distribution network 216. In this hybrid configuration, the outputs of the digital streamer units 3100 are modulated with a QAM64 modulator for example. If the analog distribution network 216 is a co-axial cable distribution network, then the usable frequency band of the distribution network may be shared as shown in FIG. 32.

Figure 32:
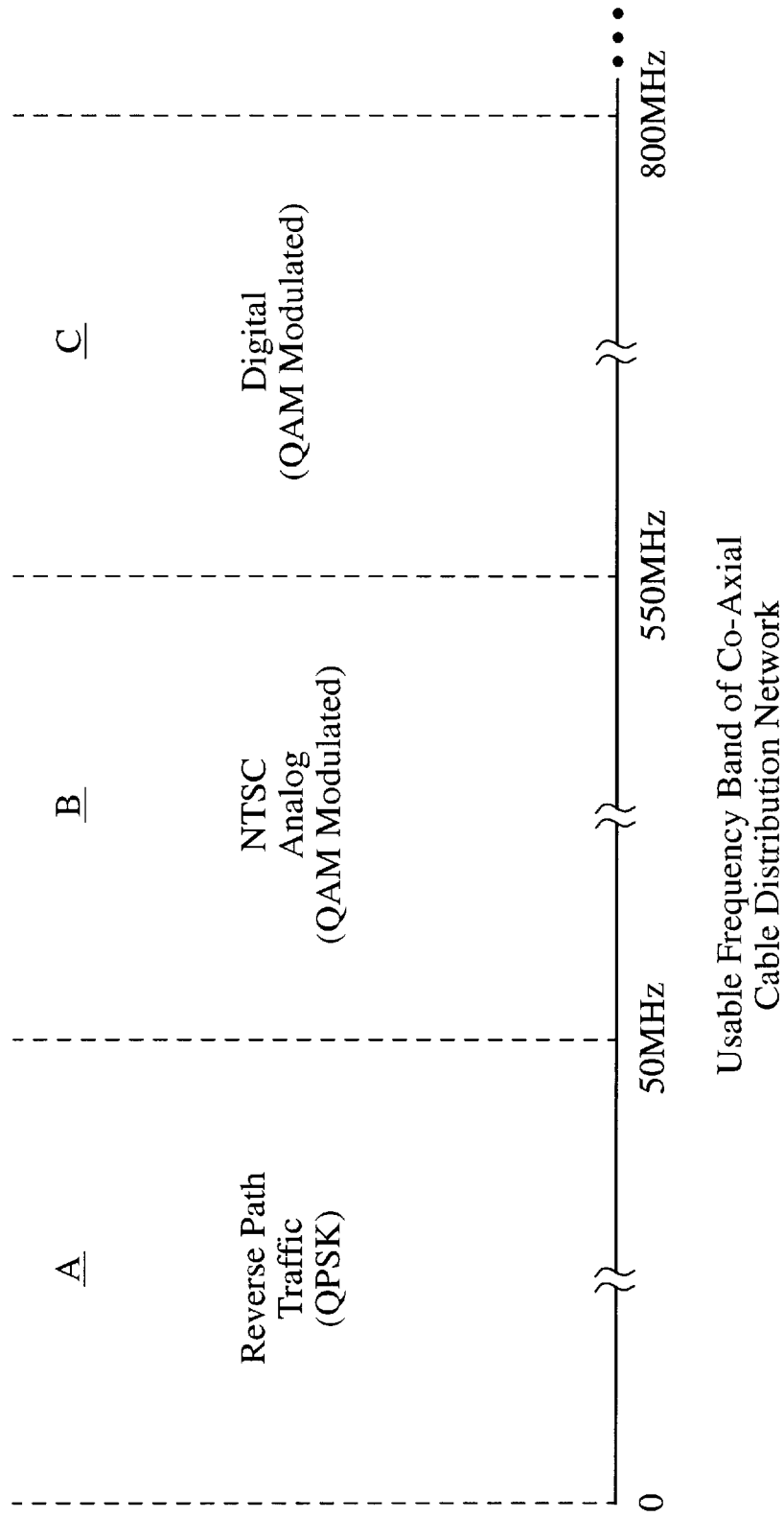
FIG. 32 illustrates a division of the usable frequency of an analog distribution network for use with a hybrid configuration of the present invention.

As shown in FIG. 32, the 0 to 50 MHz frequency band is used for reverse path traffic, modulated for example, with quadrature phase shift keying (or QPSK). This band can carry low bandwidth back-channel data, such as subscriber NVOD requests as discussed above with reference to FIG. 12c for example.

The 50 MHz to 550 MHz frequency band is used for QAM (Quadrature Amplitude Modulation) modulated NTSC analog signals output by the distribution network interface units 206 described in detail above. Subscribers with "dumb" set top boxes or cable ready televisions can tune into a selected channel on the 50 MHz to 550 MHz frequency band.

Finally, the 550 MHZ to 800 MHz band is used for QAM modulated digital signals from the digital streamers 3100. A 30 Mbps digital signal, QAM64 modulated, requires a 6 MHz band. Thus, to carry upto eight (8) transport streams, each transport stream being provided at 1.5 to 9 Mbps (i.e., upto 72 Mbps), three (3) QAM64 modulators outputting signals having an 18 MHz band are needed. Subscribers having more advanced set top boxes with QAM demodulators, and MPEG decoders can tune into a selected channel on the 550 MHz to 800 MHz frequency band.

Thus, the hybrid configuration of the system of the present invention can exploit a single coaxial cable analog distribution network to simultaneously carry QAM modulated NTSC signals to subscribers with "dumb" set top boxes and QAM modulated multiplexed transport streams to subscribers with advanced set top boxes.

§9.2 Use in a Digital Distribution Network

As shown in FIG. 27, if only digital streamer units 3100 are used, a digital distribution network 2704 may carry the multiplexed transport streams to further distribution networks or directly to subscribers 2706. Hence, a digital configuration of the system of the present invention may exploit digital distribution networks when such networks are built and the use thereof becomes economically feasible.

§10. DETAILED OPERATION OF SYSTEM USING DIGITAL STREAMER CARD(S)

Figure 35:
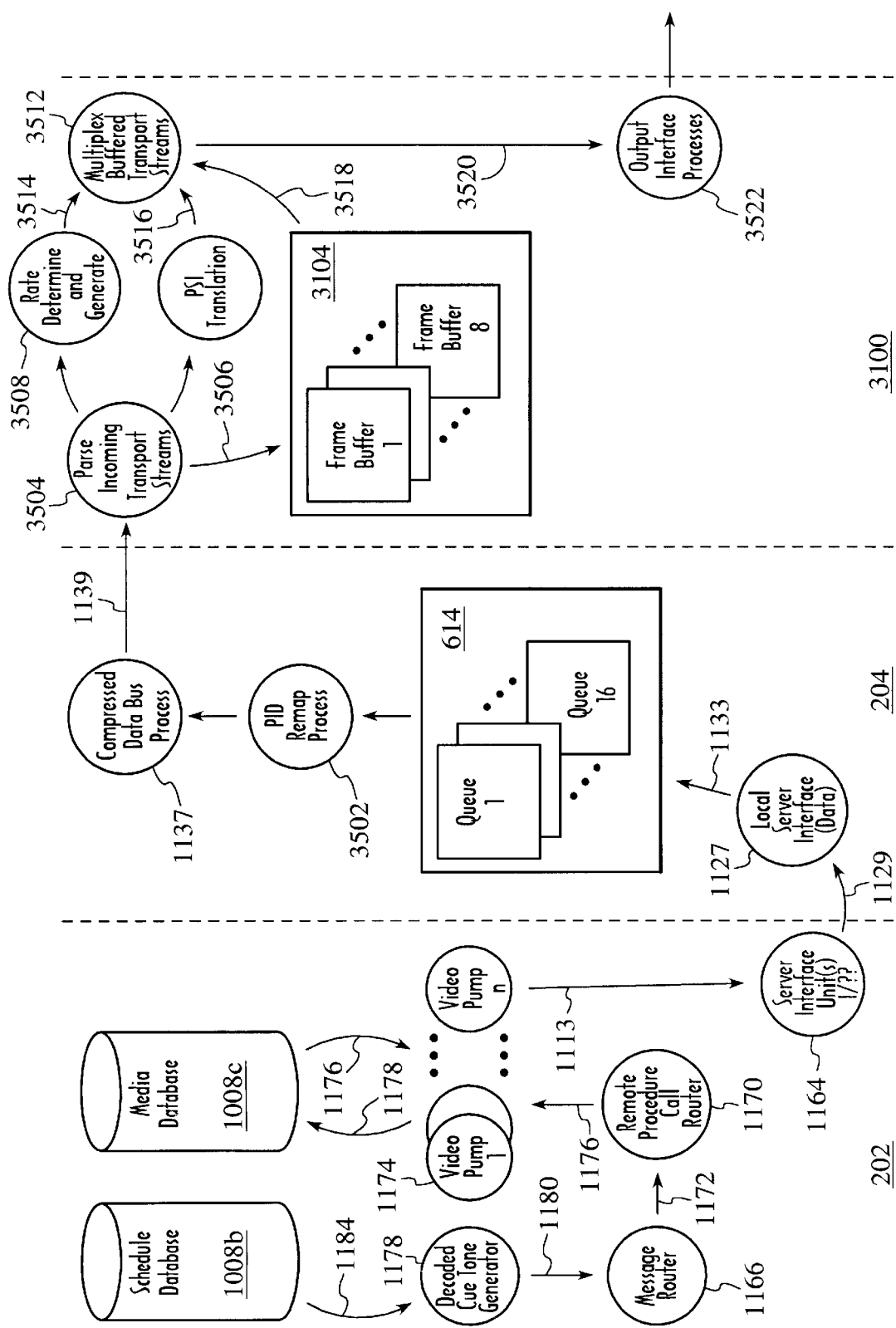
FIG. 35 is a process diagram of the streaming of digital data in the hybrid configuration and a second configuration of the present invention.

The processes used when streaming MPEG-2 transport streams with the configurations of the system of the present invention using a digital streamer card 3100 are shown in FIG. 35. Since many of the same processes used at the local server 202 and the server interface 204 discussed above are also used in these configurations, like reference numerals are used for like processes.

As shown in FIG. 35, when stored media (e.g., files of MPEG-2 encoded audio and video data) are scheduled to play, the decoded cue tone generator process 1178 generates an appropriate decoded cue tone packet 2900, and provides it, via path 1180, to message router 1166. The message router 1166 recognizes the cue tone header 2902 of the generated cue tone packet 2900 and, in response, routes the cue tone packet 2900 to the remote procedure call process 1170, via path 1172. Based on the network configuration lookup table discussed above with reference to FIG. 14, the remote procedure call process 1170 uses the server interface identifier field 2906 and the distribution network interface (or digital streamer) identifier 2908 to route the request to the appropriate one of the video pumps 1174 via path 1176.

The invoked video pump process 1174 reads the appropriate media file from the media database 1008c, and provides a transport stream (at a controlled rate as described above) to the server interface 204 via one of the server interface unit interface processes 1164 and path 1113 (implemented with the SCSI-2 fast and wide bus 224).

At the server interface unit 204, the local server (data) interface process 1127, carried out with the data transport controller 604, stores the stream in an appropriate queue of the buffer memory 614. In this configuration, since two (2) digital streamers 3100, each capable of multiplexing upto eight (8) transport streams, may be assigned to each server interface unit 204, the buffer memory 614 may now be divided into 16 or more virtual queues.

Next, the PID remap processes 3502 remaps the PIDs of the transport stream as described above with reference to FIG. 34 for example. Next, the compressed data bus process 1137 formats the data for transmission over the data bus 224. Both the PID remap process 3502 and the compressed data bus process 1137 may be carried out by the compressed data bus controller 612.

At each digital streamer 3100, a parse incoming transport stream process 3504, carried out by input parser 3102, (i) separates the transport streams based on their PIDs, (ii) stores the transport streams in an appropriate one of the frame buffers of the field store array 3104, and (iii) makes rate data and PSI data available to the microprocessor 3106.

The rate determination and generation process 3508, carried out by the microprocessor 3106 and the rate generators 3112, generate transport stream output signals provided to the output multiplexer 3118. The PSI translation process 3510, carried out by the microprocessor 3106 and PSI memory 3114 for example, provides PSI data to the output multiplexer 3118. The multiplex buffered transport streams process 3512 receives timing signals, via path 3514, from the rate determination and generation process 3508, PSI data, via path 3516, from the PSI translation process 3510, and transport streams, via path 3518, from the field store array 3104.

The multiplex buffered transport stream process provides multiplexed transport streams, via path 3520, to one or more output interface processes 3522. The output interface processes 3522 may be carried out by (a) output FIFO 3120, and streamer input/output unit 3122 and/or (b) DS3/ATM daughter card 3128 and streamer ATM input/output card 3130.

Figure 13:
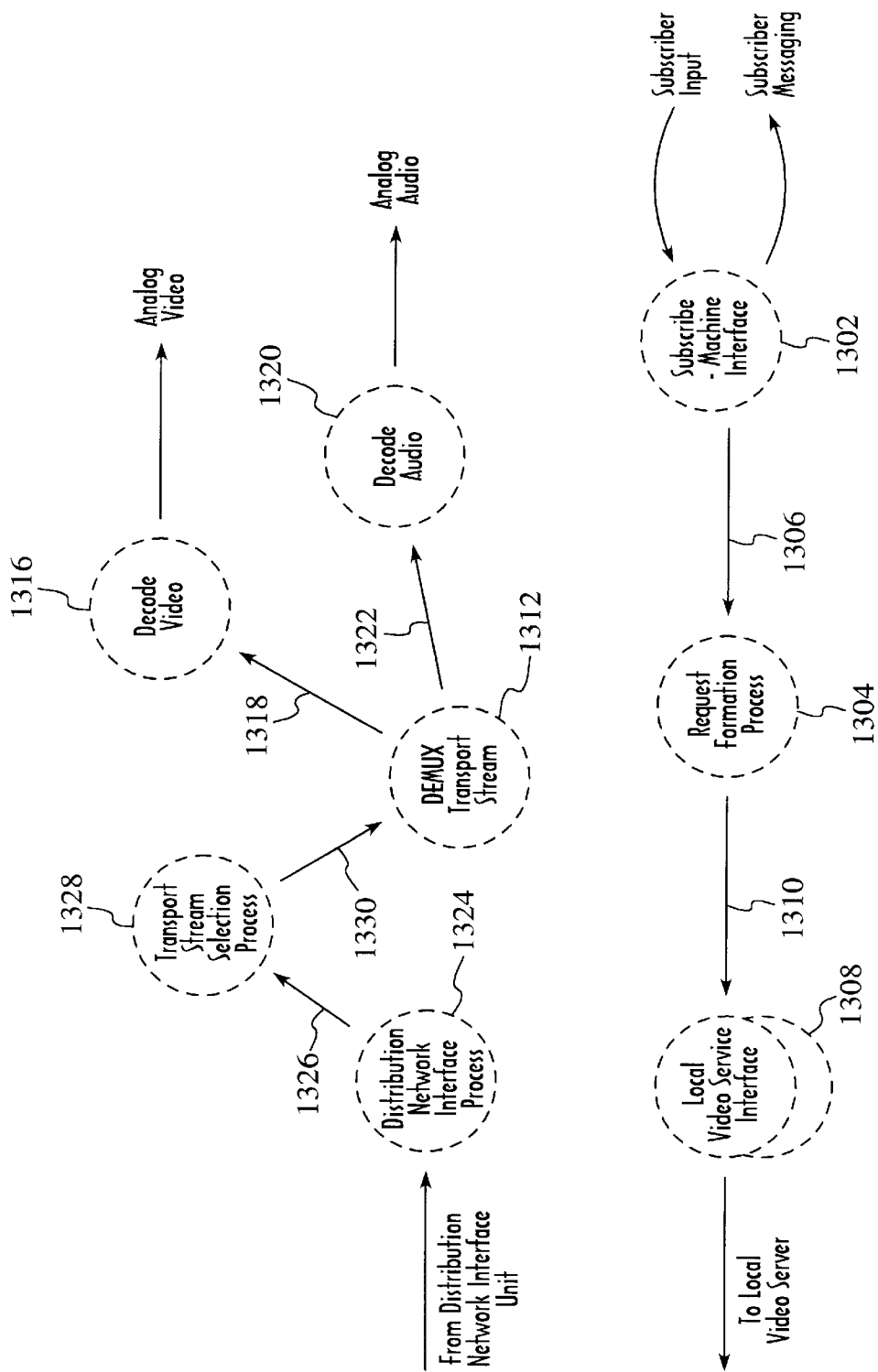
FIG. 13 is a process diagram of video processing at a set-top box in a hybrid configuration and a second configuration of the system of the present invention.

As discussed above, the output of the digital streamer unit(s) 3100 may be (a) modulated and carried by an analog distribution network to subscribers or (b) carried by a digital distribution network to subscribers. In either case, some of the processes formerly performed by the distribution network interface unit 206 must now be performed downstream, for example at the subscriber's premises by an advanced set top box. FIG. 13 illustrates the processes performed.

As shown in FIG. 13 a distribution network interface process 1324 (carried out by a field programmable gate array for example) receives the modulated digital transport streams from the analog distribution network or fully digital transport stream from the digital distribution network. In the former case, the transport streams are demodulated with a QAM demodulator for example. In either case, the transport streams are provided to a transport stream selection process (analogous to a tuning process) 1328 via path 1326. The transport stream selection process provides a selected one of the incoming transport streams to the transport stream demultiplexing process 1312 (which may be carried out with a commercially available transport stream demultiplexer) via line 1330. Based on the PIDs 2220 of the transport stream packets, the transport stream demultiplexing process 1312, inter alia, provides the transport packets carrying video data to the decode video process 1316 (which may be carried out with a commercially available MPEG-2 video decoder) and the transport packets carrying audio data to the decode audio process 1320 (which similarly may be carried out with a commercially available MPEG-2 audio decoder).

The subscriber may communicate requests to the local video server 202 (or the remote video server 222) as follows. A subscriber machine interface process 1302 (carried out by an infra-red remote control input for example) permits a subscriber to enter a request. That request is forwarded to a request formation process 1304, via path 1306, which generates a request in an appropriate data structure, recognizable by the local server 202, and having appropriate routing information. The request is the provided to one of the local video server interface processes 1308 via path 1310. The local video server interface processes 1308 formats the request for transmission over the back-channel communications path which may physically share the same distribution network as the video data, or which may be carried out on a physically distinct communications network. If a band (e.g., 0 to 50 MHz) of an analog distribution network is used for back-channel communications, the interface process 1308 may be a QPSK modulator for example. In this case, the request will be available at the cable head end, from which the request will have to be communicated to the local server 202.

Thus, the present system of the present invention is flexible in that it can be easily reconfigured as advanced set top boxes become more economical and ubiquitous and as digital distribution networks are built and become feasible for high bandwidth video traffic.

We claim:

1. A method for selectively supplying one of (a) a first media signal from a first media source, the first media signal having at least one break indication signal, and (b) a second media signal from a second media source, to a distribution network, the method comprising steps of:
   a) detecting the at least one break indication signal of the first media signal;
   b) querying a schedule database based on (i) a channel indicator corresponding to the first media source and (ii) a time, to retrieve a media file identification;
   c) retrieving, from the second media source, compressed media data corresponding to the media file identification;
   d) decoding the compressed media data to generate decompressed media data;
   e) generating the second media signal from the decompressed media data;
   f) providing the first media signal from the first media source to a first input of a switch;
   g) providing the second media signal to a second input of the switch; and
   h) selectively providing one of the first and second media signals to the distribution network by controlling the switch based on the at least one break indication signal.

2. The method of claim 1 further comprising a step of:
   synchronizing the second media signal with the first media signal before the second media signal is provided to the second input of the switch.

3. The method of claim 1 further comprising a step of:
   i) verifying that the second media signal has been provided to the distribution network.

4. The method of claim 1 wherein the break indication signal comprises cue tones.

5. The method of claim 1 wherein the first media signal is derived from a national network feed.

6. The method of claim 1 wherein the compressed media data includes files of MPEG-2 encoded audio and video.

7. The method of claim 1 wherein the compressed media data includes:
   i) a start break indication field;
   ii) a stop break indication field;
   iii) at least one start spot indication field and a corresponding stop spot indication field arranged between the start and stop break indication fields; and
   iv) at least one encoded audio file and at least one encoded video file, each arranged between the at least one start and corresponding stop spot indication fields.

8. The method of claim 7 wherein the at least one encoded audio and video files are MPEG-2 encoded.

9. The method of claim 7 wherein the start break indication field includes a break length field.

10. In a system having a compressed media server, a server interface unit, and a plurality of distribution network interface units, a method for selectively supplying one of (a) a first media signal from a first media source, the first media signal having at least one break indication signal, and (b) a second media signal derived from compressed media data from the compressed media server, to a distribution network via one of the plurality of distribution network interface units, the method comprising steps of:
   a) detecting, at one of the plurality of distribution network interface units, the at least one break indication signal;
   b) communicating a message, indicating a detection of the at least one break indication signal, from the one of the plurality of distribution network interface units to the compressed media server;
   c) retrieving, at the compressed media server, compressed media data based on the message;
   d) communicating, via the server interface unit, the compressed media data from the compressed media server to the one of the plurality of distribution network interface units;
   e) decoding, at the one of the plurality of distribution network interface units, the compressed media data to form decoded media data;
   f) generating, at the one of the plurality of distribution network interface units, the second media signal from the decoded media data;

g) providing, at the one of the plurality of distribution network interface units, the second media signal to a first input of a controllable switch;

h) providing, at the one of the plurality of distribution network interface units, the first media signal from the first media source to a second input of the controllable switch; and i) controlling the switch to selectively providing one of (a) the first media signal from the first media source and (b) the second media signal, to the distribution network based on the at least one break indication signal.

11. The method of claim 10 wherein the at least one break indication signal includes at least one cue tone.

12. The method of claim 11 further comprising a step of:

forming the message communicated from the one of the plurality of distribution network interface units to the compressed media server, the step of forming the message including sub-steps of:

i) providing the message with a first field defining data indicating that cue tone related data will follow;

ii) providing the message with a second field defining data indicating a type of cue tone corresponding to the at least one cue tone; and iii) providing the message with a third field defining data identifying the one of the plurality of distribution network interface units.

13. The method of claim 12 wherein the type of cue tone is selected from a group consisting of:

(a) pre-roll;

(b) transfer-to-ad; and (c) return.

14. The method of claim 11 wherein each of the plurality of distribution network interface units has a unique valid cue tone associated with it, the method further comprising a step of:

determining whether the detected cue tone is valid for the one of the plurality of distribution network interface units.

15. The method of claim 12 wherein the step of retrieving compressed media data includes sub-steps of:

a) querying a schedule database, based on (i) the data identifying the one of the plurality of distribution network interface units, defined by the third field of the message, and (ii) a time, to acquire a scheduled break; and b) retrieving compressed media data associated with the scheduled break.

16. The method of claim 12 wherein the step of retrieving compressed media data includes sub-steps of:

a) converting the data identifying the one of the plurality of distribution network interface units, defined by the third field of the message, to a channel identifier and a geographic region identifier;

b) querying a schedule database, based on (i) the channel identifier, (ii) the geographic region identifier, and (iii) a time, to acquire a scheduled break; and c) retrieving compressed media data associated with the scheduled break.

17. The method of claim 16 wherein the channel identifier is a network and the geographic region identifier is a zone.

18. The method of claim 10 wherein the step of retrieving compressed media data includes sub-steps of:

a) querying a schedule database to acquire a scheduled break; and b) retrieving compressed media data associated with the scheduled break.

19. The method of claim 18 wherein the sub-step of querying the schedule database uses a query based on (i) the one of the distribution network interface units and (ii) a time.

20. The method of claim 19 wherein the schedule database includes break records, each of the break records including:

i) a break start window time after which spots associated with the break may be played;

ii) a break stop window time after which spots associated with the break may not start to play; and iii) at least one spot record, each of the at least one spot record including a media file identifier and a start time.

21. The method of claim 20 wherein the step of querying the schedule database to acquire the scheduled break includes sub-steps of:

a) determining a group of at least one eligible break, each of the eligible breaks having a start window time before the time and an end window time after the time; and b) selecting the break from the group of at least one eligible break having a spot with an earliest start time.

22. The method of claim 20 wherein at least one of the break records further includes at least one of (a) an end-of-break policy field and (b) an error handling polity field.

23. The method of claim 20 wherein at least one of the break records further includes an end-of-break policy field, wherein, if the end-of-break policy field contains a first value, return cue tones are honored, and if the end-of-break policy field contains a second value, return cue tones are ignored.

24. The method of claim 20 wherein at least one of the break records further includes an error handling policy field, wherein, if the error handling policy field contains a first value, a filler file is played if compressed media data associated with a spot is unavailable, and if the error handling policy field contains a second value, a next spot is played if compressed media data associated with a spot is unavailable.

25. The method of claim 10 wherein the compressed media data retrieved includes:

i) a start break field defining data indicating that at least one spot containing compressed media will follow;

ii) a stop break field defining data indicating an end of the at least one spot;

iii) at least one start spot field defining data indicating that compressed media, corresponding to the at least one spot, will follow;

iv) compressed media following the at least one start spot; and v) at least one stop spot field, following the compressed media and defining data indicating an end of the compressed media, wherein the at least one start and stop spot fields are arranged between the start and stop break fields.

26. The method of claim 20 wherein the break start field includes break length indication data.

27. The method of claim 10 wherein the step of retrieving compressed media data includes sub-steps of:

i) routing the message to a media pump process associated with the one of the plurality of distribution network interface units; and ii) streaming the compressed media data to the one of the plurality of distribution network interface units.

28. The method of claim 27 wherein the sub-step of routing is based on the one of the plurality of distribution network interface units.

29. The method of claim 11 further comprising a step of:
 forming the message communicated from the one of the plurality of distribution network interface units to the compressed media server, the step of forming the message including sub-steps of:
  i) providing the message with a first field defining data indicating that cue tone related data will follow; and
  ii) providing the message with a second field defining data identifying the one of the plurality of distribution network interface units,
 wherein the step of retrieving compressed media data includes sub-steps of:
  i) routing, based on the data defined by the second field of the message, the message to a media pump process associated with the one of the plurality of distribution network interface units; and
  ii) streaming the compressed media data to the one of the plurality of distribution network interface units.

30. The method of claim 10 wherein the step of communicating the compressed media data from the compressed media server to the one of the plurality of distribution network interface units includes a sub-step of:
 i) buffering the compressed media data in one of a plurality of queues of a buffer at the server interface unit,
  wherein, each of the plurality of queues corresponds to a unique one of the plurality of distribution network interface units, and
  wherein the one of the plurality of queues corresponds to the one of the plurality of distribution network interface units.

31. The method of claim 30 wherein a rate at which the compressed media server provides the compressed media data is based on a queue state of the one of the plurality of queues.

32. The method of claim 31 wherein the compressed media data is communicated from the compressed media server to the server interface unit in compliance with a SCSI-2 protocol.

33. The method of claim 32 wherein the queue state is provided to the compressed media server in a SCSI-2 return code.

34. The method of claim 10 further comprising steps of:
 encapsulating, at the compressed media server, the compressed media data in an MPEG-2 compliant transport stream; and
 demultiplexing, at the one of the plurality of distribution network interface units, the transport stream to separate packets of compressed audio data from packets of compressed video data,
  wherein the step of decoding the compressed media data includes sub-steps of:
   i) decoding the compressed audio packets to form decoded audio data; and
   ii) decoding the compressed video packets to form decoded video data.

35. The method of claim 34 wherein the step of generating the second media signal includes a sub-step of formatting the decoded video data into a video standard to form the second media signal, and
 wherein a format of the first media signal from the first media source conforms with in the video standard.

36. The method of claim 35 wherein the video standard is NTSC.

37. The method of claim 10 further comprising a step of synchronizing the second media signal with the first media signal from the first media source.

38. The method of claim 37 further comprising steps of:
 encapsulating, at the compressed media server, the compressed media data in an MPEG-2 compliant transport stream; and
 demultiplexing, at the one of the plurality of distribution network interface units, the transport stream to separate packets of compressed audio data from packets of compressed video data,
  wherein the step of decoding the compressed media data includes sub-steps of:
   i) decoding the compressed audio packets to form decoded audio data; and
   ii) decoding the compressed video packets to form decoded video data.

39. The method of claim 38 wherein the step of generating the second media signal includes sub-steps of formatting the decoded video data into a video standard to form the second media signal, and
 wherein a format of the first media signal from the first media source conforms with the video standard.

40. The method of claim 39 wherein the video standard includes horizontal and vertical synchronization pulses, and wherein the second media signal is synchronized with the first media signal from the first media source based on at least one of the (a) horizontal synchronization pulses and (b) vertical synchronization pulses.

41. The method of claim 40 wherein the step of controlling the switch includes a sub-step of determining occurrences of a vertical blanking insertion period, and
 wherein the switch is controlled to switch states only during a determined occurrence of the vertical blanking insertion period.

42. The method of claim 10 further comprising a step of:
 j) verifying that the second media signal was output to the distribution network.

43. The method of claim 42 wherein the step of verifying that the second media signal was output to the distribution network includes sub-steps of:
 i) generating, at the one of the distribution network interface units, a verification message; and
 ii) communicating the verification message to the compressed media server.

44. The method of claim 43 wherein the verification message includes a verification header field, a spot identifier field, a status field, and a frame count field.

45. A system for selectively supplying one of (a) a first media signal from a first source, the first media signal having at least one break indication signal, and (b) a second media signal, to a distribution network, the system comprising:
 a) a plurality of distribution network interface units, each of the plurality of distribution network interface units including:
  i) a break detector, having an input receiving the first media signal from the first source, for detecting the at least one break indication signal, and having an output outputting a break detection signal;
  ii) a message generator, having an input receiving the break detection signal output by the break detector, for generating a message in response to the received break detection signal, and having an output for outputting the generated message;
  iii) a decoder, having an input for receiving compressed media data, for decoding compressed media data to provide decoded media data, and an output for outputting the decoded media data;
  iv) a generator, having an input provided with the decoded media data output by the decoder, for generating the second media signal, and having an output for outputting the second media signal;

v) a controllable switch having a first input for receiving the second media signal output by the generator, a second input provided with the first media signal, a control input, and an output coupled with the distribution network; and vi) a switch control unit for generating a switch control signal, and having an output, coupled with the control input of the controllable switch, for outputting the switch control signal;

b) a server interface unit;

c) a first communications path between the server interface unit and each of the plurality of network distribution interface units;

d) a compressed media server including:

i) a storage unit for storing compressed media data;

ii) a media retrieval unit having an input for receiving messages generated by the message generators of the plurality of distribution network interface units, for retrieving compressed media data from the storage unit based on messages accepted at its input, and having an output for communicating the retrieved compressed media data to the decoders of the plurality of distribution network interface units, based on the messages received at its input;

e) a second communications path between the compressed media server and the server interface unit, wherein, the retrieved compressed media data output by the media retrieval unit are communicated to the decoders of the plurality of distribution network interface units via the second communications path, the server interface unit, and the first communications path.

46. The system of claim 45 wherein the at least one break indication signal includes at least one cue tone, and wherein the break detector is a cue tone decoder.

47. The system of claim 46 wherein the message generated by the message generator includes:

A) a first field defining data indicating that cue tone related data will follow;

B) a second field defining data indicating a type of cue tone corresponding to the at least one cue tone; and C) a third field defining data identifying the one of the plurality of distribution network interface units that generated the message.

48. The system of claim 47 wherein the type of cue tone is selected from a group consisting of:

(1) pre-roll;

(2) transfer-to-ad; and (3) return.

49. The system of claim 47 wherein each of the plurality of distribution network interface units is assigned a unique valid cue tone, and further includes (vii) means for determining whether the detected cue tone is valid.

50. The system of claim 47 wherein the compressed media server further includes (iii) a schedule database, wherein the media retrieval unit queries the schedule database based on (i) the data which identifies the one of the plurality of distribution network interface units that generated the message, defined by the third field of the message, and (ii) a time, to acquire a scheduled break, and wherein the compressed media data retrieved by the media retrieval unit is associated with the scheduled break.

51. The system of claim 47 wherein the compressed media server further includes:

(iii) a schedule database; and (iv) a conversion table for converting the data defined by the third field of the message, to a channel identifier and a geographic location identifier, wherein, the media retrieval unit uses the conversion table to convert the data defined by the third field of a received message to a channel identifier and a geographic location identifier, wherein, the media retrieval unit queries the schedule database, based on the channel identifier, the geographic location identifier, and a time, to acquire a scheduled break, and wherein, the compressed media data retrieved from the storage unit by the media retrieval unit is associated with the scheduled break.

52. The system of claim 51 wherein the channel identifier is a network and the geographic identifier is a zone.

53. The system of claim 45 wherein the compressed media server further includes (iii) a schedule database, wherein the media retrieval unit queries the schedule database, based on (i) a time and (ii) a distribution network interface unit from which a message is received, to acquire a scheduled break, and wherein the compressed media data retrieved from the storage unit by the media retrieval unit is associated with the scheduled break.

54. The system of claim 53 wherein the schedule database stores break records, each of the break records including:

i) a break start window time after which spots associated with the break may be played;

ii) a break stop window time after which spots associated with the break may not start to play; and iii) a plurality of spot records, each spot record including a file identifier and a start time.

55. The system of claim 54 wherein, when the media retrieval unit queries the schedule database, it determines a group of at least one eligible break, each of the at least one eligible break having a start window time before the time and a end window time after the time, and wherein the media retrieval unit selects a break from the group of at least one eligible break having a spot with an earliest start time.

56. The system of claim 45 wherein the media retrieval unit includes:

A) a plurality of media pumps, each of the plurality of media pumps being associated with a unique one of the plurality of distribution network interface units, and each streaming the compressed media data to its associated distribution network interface unit; and B) a router for routing a message received by the media retrieval unit to a media pump process associated with the distribution network interface unit that generated the received message.

57. The system of claim 45 wherein the server interface unit includes a buffer, the buffer having a plurality of queues, each of the queues associated with a unique one of the plurality distribution network interface units, wherein compressed media data from the compressed media server is buffered in a queue.

58. The system of claim 57 wherein a rate at which the compressed media server provides the compressed media data is based on a queue state of the queue.

59. The system of claim 57 wherein the second communications path supports the SCSI-2 protocol and wherein the state of the queue is communicated from the server interface unit to the compressed media server in a SCSI-2 return code.

60. The method of claim 45 wherein the decoder of each of the plurality of distribution network interface units includes:

A) a transport stream demultiplexer having an input coupled with the input of the decoder, and an output; and B) an MPEG-2 video decoder having an input coupled with the output of the transport stream demultiplexer, for decoding packets of MPEG-2 encoded video data to generate decompressed video data, and having an output for outputting the decompressed video data, wherein the compressed media data is encapsulated into an MPEG-2 compliant transport stream.

61. The system of claim 60 wherein the generator of each of the plurality of distribution network interface units includes a video encoder having an input coupled with the output of the MPEG-2 video decoder, for formatting the decompressed video data into a video standard to form the second media signal, and having an output coupled with the first input of the controllable switch.

62. The system of claim 60 wherein a format of the first media signal conforms with the standard format.

63. The system of claim 62 wherein the standard format includes horizontal and vertical synchronization pulses.

64. The system of claim 62 wherein each of the plurality of distribution network interface units further include (vii) a synchronizer, having a first input coupled with an output of the video encoder, a second input provided with the first media signal, and having an output coupled with the first input of the controllable switch, wherein the synchronizer synchronizes the second media signal with the first media signal based on at least one of the horizontal and vertical synchronization pulses.

65. The system of claim 64 wherein the standard format is NTSC, and wherein each of the plurality of distribution network interface units further includes a vertical blanking interval detector, having an output coupled with the controllable switch such that the controllable switch can only change states during a detection of a vertical blanking interval by the vertical blanking interval detector.

66. The system of claim 45 wherein the media retrieval unit of the compressed media server is a processor executing stored instructions.

* * * * *